United States Patent
Velev et al.

(10) Patent No.: US 9,648,515 B2
(45) Date of Patent: May 9, 2017

(54) DEVICE TRIGGERING AND APN-BASED CONGESTION CONTROL

(71) Applicant: Panasonic Intellectual Property Corporation of America, Torrance, CA (US)

(72) Inventors: Genadi Velev, Langen (DE); Jens Bachmann, Langen (DE); Keigo Aso, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 84 days.

(21) Appl. No.: 14/364,606

(22) PCT Filed: Nov. 26, 2012

(86) PCT No.: PCT/EP2012/073630
§ 371 (c)(1),
(2) Date: Jun. 11, 2014

(87) PCT Pub. No.: WO2013/087403
PCT Pub. Date: Jun. 20, 2013

(65) Prior Publication Data
US 2014/0341041 A1    Nov. 20, 2014

(30) Foreign Application Priority Data

Dec. 13, 2011 (EP) ..................................... 11193341
Jan. 30, 2012 (EP) ..................................... 12153129

(51) Int. Cl.
*H04W 4/00* (2009.01)
*H04W 28/12* (2009.01)
(Continued)

(52) U.S. Cl.
CPC .......... *H04W 28/12* (2013.01); *H04Q 3/0045* (2013.01); *H04W 4/005* (2013.01); *H04W 76/02* (2013.01); *H04W 28/0289* (2013.01)

(58) Field of Classification Search
CPC .............................. H04W 28/12; H04W 76/02
(Continued)

(56) References Cited

U.S. PATENT DOCUMENTS

2003/0193910 A1    10/2003  Shoaib et al.
2011/0124356 A1*   5/2011   Feng ................... H04L 41/0816
                                              455/501

(Continued)

FOREIGN PATENT DOCUMENTS

| EP | 2 385 720 A1 | 11/2011 |
|---|---|---|
| WO | 2004/065838 A1 | 8/2004 |
| WO | 2008/005272 A2 | 1/2008 |

OTHER PUBLICATIONS

International Search Report for Application No. PCT/EP2012/073630 dated Jan. 16, 2013.
(Continued)

*Primary Examiner* — Farah Faroul
(74) *Attorney, Agent, or Firm* — Seed IP Law Group LLP

(57) ABSTRACT

The present invention relates to device triggering in case of a congestion control. A triggering server transmits a device trigger request to a terminal over a communication network including a serving network node. The network node evaluates whether the connection can be established from the terminal to the server, including determining whether the network is congested and/or whether a back-off timer is running and/or the remaining time of the back-off timer at the terminal. Then the network node transmits a delivery delay indication to a device triggering control server to provide it with the delivery delay indication indicating at
(Continued)

least one of impossibility of establishing the connection to the server after the trigger or a data transmission delay.

11 Claims, 15 Drawing Sheets

(51) Int. Cl.
  *H04Q 3/00* (2006.01)
  *H04W 76/02* (2009.01)
  *H04W 28/02* (2009.01)

(58) Field of Classification Search
  USPC .......................................... 370/235, 236, 252
  See application file for complete search history.

(56) References Cited

U.S. PATENT DOCUMENTS

| | | | | |
|---|---|---|---|---|
| 2011/0170530 A1* | 7/2011 | Akiyoshi | ............... | H04W 12/06 370/338 |
| 2011/0274040 A1* | 11/2011 | Pani | ...................... | H04W 4/005 370/328 |
| 2012/0033551 A1* | 2/2012 | Liao | ...................... | H04W 28/02 370/230 |
| 2012/0252481 A1* | 10/2012 | Anpat | ...................... | H04W 4/00 455/456.1 |
| 2012/0257571 A1* | 10/2012 | Liao | ...................... | H04W 4/005 370/328 |
| 2013/0044659 A1* | 2/2013 | Jokimies | ........... | H04W 52/0219 370/311 |
| 2013/0051326 A1* | 2/2013 | Jeyatharan | ............ | H04L 47/245 370/328 |
| 2013/0100895 A1* | 4/2013 | Aghili | ...................... | H04W 4/00 370/329 |
| 2013/0148492 A1* | 6/2013 | Liao | ...................... | H04W 4/005 370/218 |
| 2013/0165101 A1* | 6/2013 | Han | ...................... | H04W 76/046 455/418 |
| 2013/0291071 A1* | 10/2013 | Blom | ...................... | H04L 9/0833 726/4 |
| 2013/0343256 A1* | 12/2013 | Zakrzewski | ............ | H04W 8/26 370/312 |
| 2014/0056222 A1* | 2/2014 | Zhu | ...................... | H04W 60/00 370/328 |
| 2014/0089442 A1* | 3/2014 | Kim | ...................... | H04W 76/02 709/206 |
| 2014/0185522 A1* | 7/2014 | Xu | ...................... | H04W 4/005 370/328 |
| 2014/0219182 A1* | 8/2014 | Chandramouli | ...... | H04W 4/005 370/328 |
| 2015/0036492 A1* | 2/2015 | Jin | ...................... | H04W 76/027 370/230 |
| 2015/0334509 A1* | 11/2015 | Xu | ...................... | H04W 4/005 370/328 |

OTHER PUBLICATIONS

European Search Report for Application No. EP11193341 dated May 10, 2012.
"3rdGeneration Partnership Project; Technical Specification Group Services and System Aspects; System Improvements for Machine-Type Communications (Release 11)", 3GPP TR 23.888, Nov. 2011, v1.6.0.
"3rd Generation Partnership Project; Technical Specification Group Services and System Aspects; General Packet Radio Service (GPRS) enhancements for Evolved Universal Terrestrial Radio Access Network (E-UTRAN) access (Release 10)." 3GPP TS 23.401, Sep. 2011, v10.5.0.
Japanese Notice of Reasons for Rejection for Application No. 2014-546398, dated Apr. 26, 2016.

* cited by examiner (1) MT-SMS delivery to SGSN
(2) SGSN reports SM congesion
(3) SM-SC stores the MT-SMS and informs HSS about waiting flag
(4) NEW: HSS configures the SGSN to report when congestion is over
(5) NEW: SGSN determines SM congestion is over
(6) SGSN report to HHS end of congestion
(7) HSS triggers SM-SC to send MT-SMS
(8) MT-SMS delivery to SGSN
(9) Paging and MT-SMS delivery to UE

Fig. 12

(1) MT-SMS (DT request) delivery to SGSN
(2) SGSN performs internal check determining if MM or SM CC is applied
(3) SGSN informs SM-SC that MT-SMS cannot be delivered and possible MM/SM-BO time
(4) SM-SC evaluates whether to store the MT-SMS based on the SMS validity time and MM/SM-BO time informed from SGSN
(5.1) If MM/SM-BO time is larger than DT validity time, SM-SC reports to MTC-IWF or MTC server non-deliverable DT request (optionally the MM/SM-BO time to avoid immediate retransmission)
(5.2) If MM/SM-BO time is smaller that DT validity time, SM-SC stores the DT request. After expiration of the MM/SM-BO time, SM-SC delivers MT-SMS to SGSN
(6) Paging and MT-SMS delivery to UE

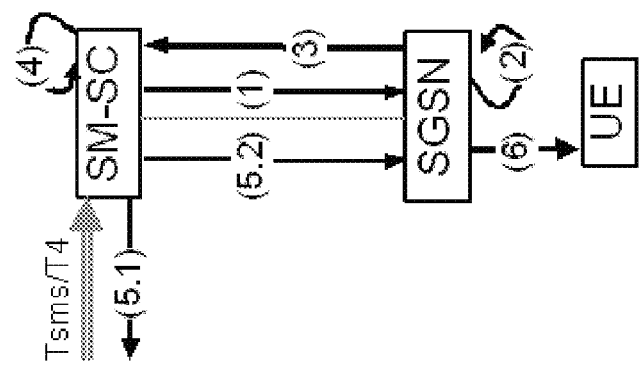

(1) DT request delivery to SGSN/MME over T5
(2) SGSN/MME performs internal check determining if MM or SM CC is applied
(3) SGSN/MME informs MTC-IWF that DT request cannot be delivered due to CC and possible MM/SM-BO time
(4) MTC-IWF evaluates whether to store the DT request based on the DT validity time and MM/SM-BO time informed from SGSN/MME
(5.1) If MM/SM-BO time is larger than DT validity time, MTC-IWF informs MTC server about non-deliverable DT request (and optionally the MM/SM-BO time to avoid immediate retransmission from MTC server)
(5.2) If MM/SM-BO time is smaller that DT validity time, MTC-IWF sends the DT request to SM-SC over T4. SM-SC stores the DT request
(6) After expiration of the MM/SM-BO time SM-SC delivers DT request to SGSN/MME
(7) Paging and MT-SMS delivery to UE

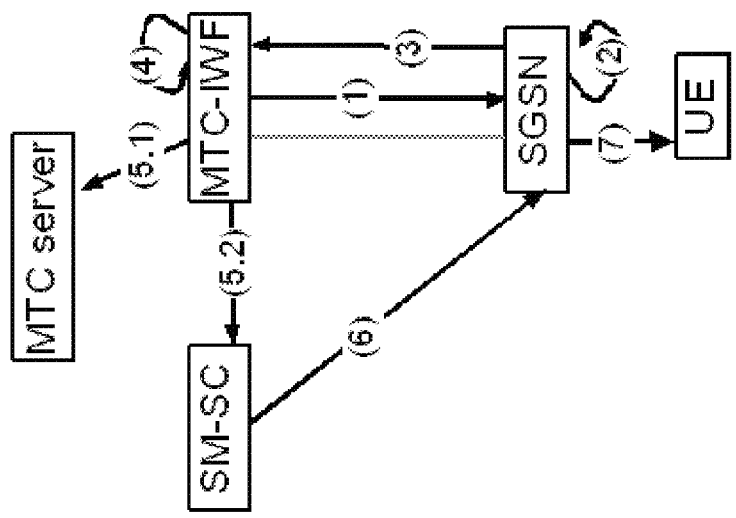

Fig. 13

DEVICE TRIGGERING AND APN-BASED CONGESTION CONTROL

The invention relates to triggering a terminal by a server in a communication system. In particular, the invention relates to providing an efficient triggering mechanism taking into account congestion control.

TECHNICAL BACKGROUND

The 3$^{rd}$ generation Partnership Project (3GPP) organization specifies the architecture of mobile cellular networks such as like Global System for Mobile Communications (GSM) and Universal Mobile Telecommunications System (UMTS). Third-generation mobile systems (3G), based on WCDMA radio-access technology, such as UMTS, are being deployed on a broad scale all around the world. A first step in enhancing or evolving this technology was the introduction of the High-Speed Downlink Packet Access (HSDPA) and of the enhanced uplink, also referred to as High Speed Uplink Packet Access (HSUPA). In a longer time perspective it is however necessary to be prepared for further increasing user demands and be competitive against new radio access technologies. To meet this challenge, 3GPP has initiated a study item leading to Evolved 3GPP Packet Switched Domain, which is also known under the name Evolved Packet System (EPS). The EPS combines an Evolved Packet Core (EPC) network that is able to connect a new generation of an access network technology called Evolved Universal Terrestrial Radio Access Network (E-UTRAN) as well as the pre-successor of the E-UTRAN called Universal Terrestrial Radio Access Network (UTRAN). Another broadly used term for E-UTRAN (and having the same meaning) is Long Term Evolution (LTE). LTE is designed to meet the subscriber and network operator needs for high speed data and media transport as well as high capacity voice support to the next decade.

An LTE network architecture including network entities and interfaces between them is exemplified in FIG. 1. As can be seen in FIG. 1, the LTE architecture supports interconnection of different radio access networks (RAN) such as UTRAN or GERAN (GSM EDGE Radio Access Network), which are connected to the EPC via the Serving GPRS Support Node (SGSN). Some of the entities and interfaces are described below for facilitating the understanding of the exemplary embodiments of the present invention.

In a 3GPP mobile network, the mobile terminal 110 (called User Equipment, UE, or device) is attached to the access network via the Node B (NB) in the UTRAN and via the evolved Node B (eNB) in the E-UTRAN access. The NB and eNB 120 entities are known as base station in other mobile networks. A common denotation for the NB and eNB used in this document is (e)NB. There are two data packet gateways located in the EPS for supporting the UE mobility—Serving Gateway (SGW) 130 and Packet Data Network Gateway 160 (PDN-GW or shortly PGW). The SGW terminates the interface towards the radio access networks, e.g. the UTRAN or the E-UTRAN. The mobility within one radio access network (UTRAN or E-UTRAN) is access specific. The mobility within the EPC is managed by the PGW. The mobility management in the EPC between the PGW and the SGWs can be based either on the Proxy MIPv6 (PMIP) protocol or on the GPRS Tunneling Protocol (GTP). The interface between the SGW and the PGW is called S5 and it can be based either on the GTP or the PMIPv6 protocol. The PGW further performs IP address allocation to the UE and packet filtering (e.g. deep packet inspection, packet screening) in order to map the UE's traffic to appropriate Quality of Service (QoS) level.

Assuming the E-UTRAN access, the eNB entity 120 may be connected through wired lines to one or more SGWs via the S1-U interface ("U" stays for "user plane") and to the Mobility Management Entity 140 (MME) via the S1-MMME interface. The S1-U interface is based on the GTP protocol and the S1-MME interface is based on the S1-AP protocol.

The SGSN 150 and MME 140 are also referred to as serving core network (CN) nodes. These network nodes maintain the context of the UE in the network, which means the security parameters, parameters used for the mobility management (e.g. in which are or cells the UE is camping, if the UE is reachable) and parameters used for the session management (SM) such as QoS parameters describing the communication sessions.

The SGW 130 routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME 140 is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signalling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME 140 is the termination point in the network for ciphering/integrity protection for NAS signalling and handles the security key management. Lawful interception of signalling is also supported by the MME. The MME also provides the control plane function for mobility between LTE and 2G/3G access networks with the S3 interface terminating at the MME 140 from the SGSN 150. The MME also terminates the S6a interface towards the Home Subscriber Server (HSS) for roaming user equipments.

The E-UTRAN comprises eNodeBs, providing the E-UTRA user plane by means of Packet Data Control Protocol (PDCP), Radio Link Control (RLC), Medium Access Control (MAC) and physical layer protocols (PHY) as well as control plane by means of Radio ResourceControl (RRC) protocol terminations towards the UE. The eNodeB (eNB) hosts the PHY, MAC, RLC and PDCP layers including the functionality of user-plane header-compression and encryption. The service the RLC layer provides in the control plane between UE and eNodeB is called Signaling Radio Bearer (SRB). In the user plane, the service provided by RLC layer between the UE and the eNodeB is called a Radio Bearer (RB) or Data Radio Bearer (DRB). The eNB also offers RRC functionality corresponding to the control plane. It performs many functions including radio resource management, admission control, scheduling, enforcement of negotiated uplink QoS, cell information broadcast, ciphering/deciphering of user and control plane data, and compression/decompression of downlink/uplink user plane packet headers. The eNodeBs are interconnected with each other by means of the X2 interface.

Amongst others, higher layer, i.e. Non Access Stratum (NAS), messages are carried by the RRC messages (e.g. using RRC Direct Information Transfer message) between the UE and the eNodeB. The Non Access Stratum is a functional layer running between the UE and the Core Network (CN) and located above the RRC. Furthermore, the NAS is the functional grouping of protocols aimed at Call Control (CC) for circuit switched voice and data, at Session Management (SM) for packet switched data and Mobility Management (MM) and at Short Message Services (SMS) for packet switched and circuit switched domains. The control messages the NAS layer generates are called NAS messages. Such messages are for example used to control Mobility Management, Session Management, SMS Transport and Call Management. NAS messages are transported transparently through the Access Stratum layers (layers 3-2-1, RRC, PDCP, RLC, MAC, PHY) that include the function and protocols to support the NAS transport. In order to send the initial non-access stratum message, the user equipment first establishes a Radio Resource Control (RRC) connection to the eNodeB over the air interface (Uu interface). During the RRC connection establishment the user equipment and eNodeB get synchronized and establish the Signalling Radio Bearers (SRB) that can be used for the transport of the non-access stratum messages.

The Access Stratum is the functional grouping of protocols specific to the access technique, in this case, the RRC, PDCP, RLC, MAC and PHY. It includes protocols for supporting transfer of radio-related information, for coordinating the use of radio resources between UE and access network, and for supporting access from the serving network to the resources provided by the access network. The Access Stratum offers services through Service Access Points (SAP) to the Non-Access Stratum (CN-related signaling and services), i.e. provides the Access Link between UE and core network, which consists of one or more independent and simultaneous UE-core network radio access bearer services, and only one signaling connection between the upper layer entities of UE and the core network.

When the UE is switched-off or not attached to the mobile network, the UE is in DEREGISTERED state. In DEREGISTERED state, no EMM context exists and the UE location is unknown to an MME and hence it is unreachable by an MME.

When a mobile terminal (or user equipment, UE) is attached to the network, the UE is in the so called REGISTERED state, i.e. EPS Mobility Management (EMM) context has been established and a default EPS bearer context has been activated in the network and in the UE. When the UE is REGISTERED to mobile network, the UE can be in two different connections management states: IDLE and CONNECTED state.

The UE is in IDLE state when there is no data for transmission and the radio resources are released, but the UE still has a valid IP configuration. A UE in IDLE state doesn't have a radio association (i.e. Radio Resource Connection, RRC) with the eNB, and therefore, there are no established signalling and data radio bearers. Further, there is no Non-Access Stratum (NAS) signalling connection between the UE and the network (e.g. to the MME) and also, there is no S1-U connection between the eNB and the SGW.

When the UE is in CONNECTED state and the network (usually the eNB) detects that the UE is not sending/receiving data for a certain period of time, the network (usually the eNB) decides to release the radio resources and the S1 connection. As a result, the UE transits from CONNECTED to IDLE state. Also the MME changes its internal state for the UE to IDLE and informs the SGW to release the S1-U connection to the eNB.

The above described IDLE and CONNECTED states are related to the NAS layer state diagram. On the other hand, in the AS layer the IDLE and CONNECTED states are also defined. The AS IDLE and CONNECTED states are similar but not completely analogical to NAS IDLE and CONNECTED states, i.e. if the RRC connection is established, the AS state is CONNECTED, otherwise if the RRC connection is released, the AS state is IDLE. Not always when the AS state is CONNECTED, the NAS state is also CONNECTED (e.g. for TAU procedure without active flag). The establishment of the RRC connection, and thus, the transition to AS CONNECTED state, is initiated by the UE, as only the UE can send "RRCConnectionRequest" message. The UE initiates the RRC connections establishment either due to the availability of uplink data or uplink signalling; or due to paging from the network in order to receive downlink data or downlink signalling.

Recently, 3GPP has started an activity on Network Improvements for Machine Type Communication (MTC). The service requirements have been described in 3GPP TS 22.368, v.11.3.0, October 2011, "Service requirements for Machine-Type Communications (MTC)", freely available on www.3gpp.org, while the study of possible architecture solutions can be found in 3GPP TS 23.888, v.1.5.0, October 2011, "System Improvements for Machine-Type Communications (MTC)", freely available on www.3gpp.org. The MTC terminals or MTC devices are characterized in that they are usually not operated by a human being. Rather, the communication peer is another machine such as a so called MTC server or another MTC terminal(s). As the MTC devices can be also mobile terminals as specified by the 3GPP, a more general notification like "UE" is also used throughout this invention, so that the MTC device, terminal or UE are used interchangeable.

The MTC has some particular features which differ from the usual human-to-human communication. 3GPP tries to identify these particular features in order to optimize the network operations. These specifics are called "MTC features". For instance, an MTC device typically sends or receives smaller amounts of data. Another feature of the MTC devices and 3GPP core network (CN) shall be the ability to allow an external server (MTC server) to trigger the MTC device to initiate a communication with the MTC server. This is enabled by a so-called "device triggering". For the current state of standardization the Device Triggering is specified for MTC Devices which are attached to the network, i.e. the devices are online. Thus, it is often referred to it as to "Online Device Triggering". The Device Triggering is initiated by the MTC server and can be performed by different means.

A first possibility is to use a usual Short Message Service (SMS). Accordingly, the MTC server generates an SMS message and sends it to the Short Message Serving Center (SM-SC). The SM-SC forwards the message within the CN to the MSC or SGSN 150 for delivery to the UE.

Network architecture according to the present state of standardization (cf. 3GPP TS 23.682 "Architecture Enhancements to facilitate communications with Packet Data Networks and Applications", v0.1.0, November 2011, freely available in www.3gpp.org), including entities which may be involved in MTC message triggering is exemplified in FIG. 2. In particular, the MTC server 210 may generate an SMS and send it to the SM-SC 270, which forwards the message to a network node 240 such as MSC or SGSN for delivery over RAN to the UE 260.

Another possibility is that the MTC server 210 sends the Device Trigger request to a dedicated entity in the 3GPP CN, called MTC Inter-Working Function (MTC-IWF). The MTC-IWF 220 may then apply different Device Trigger transport mechanisms. For instance, the device trigger may be transmitted over a T4 interface (cf. "indirect model" in FIG. 2). For that purpose the MTC-IWF 220 generates an SMS-conform information and sends it to the SM-SC 270 entity. The transport from the SM-SC 270 to UE 260 is then based on the usual SMS transmission. A signalling flow of Device Trigger transmission as an SMS can be found in 3GPP TS 23.682, Section A.3.

The device trigger may alternatively be transmitted over the T5 interface. For that purpose the MTC IWF 220 sends the Device Trigger request to the serving CN node over a direct interface (cf. "direct model" in FIG. 2). The serving CN node carries the Device Trigger request message to the UE over a general purpose NAS signalling transport.

The Device Trigger request sent from the MTC server can carry two types of information:
- information to be used by the network to deliver the Device Trigger, and
- information destined to the MTC Device and opaque (transparent) to the network.

The information to be used by the network to deliver the Device Trigger may include, for instance, External ID of the UE (used by the MTC server and MTC-IWF to identify the UE that shall be triggered), MTC server ID (used by the network to contact the MTC server, e.g. when delivering the Device Trigger Delivery report), priority/urgency of the Device Trigger, Validity time for the Device Trigger and/or others.

The information destined to the MTC Device and opaque (transparent) to the network may include, for instance, the identity of the application in the MTC device, target MTC server/application ID (used by the MTC device to contact the MTC server/application, e.g. the IP address and/or port or FQDN of the MTC server/application), particular QoS parameter, priority or urgency of the UL data, optionally MTC application specific information (of limited size, e.g. what information/parameters should be reported by the MTC device), optionally measurement time (i.e. how long shall the MTC device gather information before initiating the reporting), and/or others.

The unsuccessful transmission of the Device Trigger over T4 interface can be seen in section A.3.2 of 3GPP TS 23.682. It is similar to the unsuccessful transmission of SMS, where the SMS is stored in the SM-SC until the UE is reachable. FIG. 3 shows the signalling flow of the case when the Device Trigger is stored in the network (SM-SC) for later transmission. Steps 1 to 7 refer to the corresponding steps of FIG. A.2-1 in 3GPP TS 23.682. The storing of the Device Trigger is performed at step 14. Later, when there is a UE activity (step 16), the SM-SC is informed via the HSS (step 18) that the UE is reachable and the SM-SC initiates a new delivery of the Device trigger (step 19, 20).

The 3GPP specification foresees 2 different identifiers for the MTC Device during the Device Triggering procedure. The first identifier is called external identifier (ID) and is used outside the 3GPP network, e.g. between the MTC server/application and the network, to uniquely identify a UE registered in the network. An example for external ID can be MSISDN (Mobile Subscriber Integrated Services Digital Network Number) used nowadays to uniquely identify GSM, UMTS, and/or LTE subscription. The second identifier is called internal identifier (ID) and is used within the 3GPP network to identify the UE subscription, to perform routing of messages within the network, etc. An example of an internal ID is the IMSI (International Mobile Subscriber Identity).

In Release 10 (Rel-10) of the 3GPP standardisation the congestion control mechanism in the network was extended with the NAS level congestion control. The introduction of NAS level congestion control was a result of the studies performed in 3GPP for the impact of Machine Type Communication to the network. It was concluded that the numerous MTC devices acting in simultaneous manner could cause congestion or overload to the network. The NAS level Congestion Control can be divided in "APN based congestion control" and "General NAS level Mobility Management control". The APN based congestion control is applicable to UEs which are members of particular APN. The network can provide limitation of the maximum number of connections (bearers) or number of network accesses to the network for a particular APN. The General NAS level Mobility Management control is applicable when many UEs initiate network access attempts almost simultaneously which could cause a congestion in the serving CN node (MME/SGSN).

Both Session Management (SM) and Mobility Management (MM) are considered as sublayers of the NAS (Non-Access Stratum) layer in the UE and in the MME/SGSN. Usually the MME/SGSN and UE stores separate MM and SM contexts. Furthermore, the SM context is per PDP (Packet Data Protocol) or PDN (Packet Data Network) connection. If a UE has multiple PDP/PDN connections to different APNs, the UE would have 1 MM context and multiple SM contexts.

It is noted that in GPRS mobile networks, a separate packet data protocol (PDP) context is established in the SGSN for each separate tunnel (i.e. connection) for the UE. In EPS mobile networks, each packet data network (PDN) connection would result to a separate EPS bearer context in the MME. If generalized terminology for the mobile networks is used, i.e. GRPS and EPS networks, for simplicity it is easier to use the term PDP/PDN connection and PDP/PDN context (which would more precisely be denoted as PDP/EPS bearer context).

In the APN based Session Management congestion control, the SGSN/MME rejects Session Management (SM) requests from the UE when SM congestion associated with a given APN is detected. Optionally, the reject message can contain a Session Management back-off (SM BO) timer that then must be stored in the UE. If the UE has an SM-BO timer running, the UE shall not initiate any SM request to the MME/SGSN related to the given APN. With other words the UE is not able to establish new or modify existing PDP context or EPS bearers to the given APN during the SM-BO timer is running. The UE can still perform MM procedures, i.e. Tracking Area Update (TAU), Service Request etc. For easiness the general term SM request can be used to express all types of requests sent from the UE targeting the Session Management in SGSN/MME, such as PDN Connectivity, Bearer Resource Allocation or Bearer Resource Modification Requests, etc.

In the APN based Mobility Management congestion control, the MME/SGSN performs this control to UEs with a particular subscribed APN by rejecting Attach procedures with a Mobility Management back-off (MM-BO) timer.

In the general NAS level Mobility Management congestion control, MME/SGSN may reject Mobility Management signalling requests from UEs when the MME/SGSN experiences general overload conditions (e.g. no more processing power, the memory is occupied, or the maximum number of stored MM/SM contexts is about to be reached). The MME/SGSN can include a Mobility Management back-off (MM-BO) timer to the UE in the reject message.

For all cases of NAS-level congestion control, it is optional whether the network (SGSN/MME) sends an SM-BO timer (in case of APN-based SM CC) or MM-BO timer (in case of MM CC) in the corresponding reject message to the UE. Further, it is optional whether the SGSN/MME stores the sent SM-BO or MM-BO timer. For example, when the SGSN/MME rejects a new PDP context or PDN connection request, the SGSN/MME would not have PDP or PDN context for the UE and it would be difficult to store the SM-BO timer without having a corresponding context. However, if the UE already has a PDP/PDN context and the SGSN/MME rejects a Modification Request from the UE, the SGSN/MME would be able to store the SM-BO timer, as there is related context. More details to the congestion control may be found in Section 4.3.7.4.2 "NAS level congestion control" of 3GPP TS 23.401, v.10.5.0, September 2011, "General Packet Radio Service (GPRS) enhancements for Evolved Universal Terrestrial Radio Access Network (E-UTRAN)".

When NAS level congestion control is activated in the network, 3GPP TS 23.888 in Section 6.59 describes a solution how the Device Trigger requests sent from the MTC server can be limited. In this solution, the SGSN/MME (serving network node) activates over the T5 interface (between MTC-IWF and SGSN/MME) the overload control for limiting the sending rate of DT requests. However, this mechanism doesn't describe very precisely the impact of the APN-based SM congestion control, but rather is applicable for a general MM congestion control.

The APN-based SM congestion control (CC) is applied to the APN, to which a triggered UE is going to send UL data. When Device Trigger request is sent to a UE, the APN-based SM CC is applied to the UE signalling to establish or modify a PDP/PDN connection. There are basically two cases. The first case is when SM-BO timer is running in the UE at the time point of Device Triggering and the second case is when no SM-BO timer is running in the UE, however, when attempting to establish the PDP context, the UE obtains an SM reject message with an SM-BO timer.

When the UE receives the Device Trigger request including the network-opaque information, the UE processes (i.e. routes internally) the Trigger info to the correct Application. The UE determines that UL data has to be sent to a target APN. It is assumed that the target APN is under Session Management Congestion Control (SM CC). The UE may or may not be aware of the applied SM CC. The establishment of a connection to the target APN depends on the access network type (E-UTRA, UTRAN, GERAN) to which the UE is attached.

In the current E-UTRAN access, in order to transmit Device Trigger request to the UE, the EMM/RRC connection is established for downlink NAS message (carrying the Device Trigger request) and the U-plane bearers are established automatically. If there was a pre-established PDN connection (EPS bearer) to the target APN, UE could send UL data over U-plane without SM signalling to the MME/SGSN even if the target APN is congested. If there is no pre-established EPS bearer, UE cannot send UL data because the PDN connectivity request message for a new PDN connection or the EPS bearer modification message to modify an existing EPS bearer cannot be transmitted. It is noted that the SM congestion control is applied on the C-plane (control plane) signalling, and does not affect the U-plane (user plane). The UE is not able to send signalling to SGSN/MME (for instance, for the U-plane connection establishment or modification). However, for the already established U-plane connections the UE is able to send and receive data.

In GERAN/UTRAN access (also known as 2G/3G access), in order to transmit Device Trigger request to the UE, the MM/RRC connection is established for the downlink NAS message (which can carry e.g. MT-SMS or other type/format of Trigger request), but no U-plane bearers are established. The UE should establish or activate the PDP context separately using the NAS SM signalling request. If the SM-BO timer is running in the UE, the UE is not allowed to send an SM request, and thus, the UE cannot establish/activate the PDP context. Consequently, the UE is not able to send the UL data.

On the other hand, if the SM-BO timer is not running, the UE would send a NAS SM request message to establish a PDP context and the SGSN would reject this message if it is targeted to the congested APN. This is not efficient as paging is performed and radio resource connection (RRC) and NAS signalling connection are established for the device trigger request transmission and then released after the rejection oof the UE's NAS SM request. Therefore a solution is needed to avoid, where possible, the transmission of the device trigger request message.

In a further scenario related to the SM congestion control, the serving network node (SGSN/MME) may not be able to determine the following:

whether the received downlink message in the SGSN/MME (and addressed to the UE) is meant for Device Triggering (DT). This is especially applicable for the case where the DT request is carried in a Mobile Terminated SMS (MT-SMS). In this case, the SGSN/MME cannot determine whether the MT-SMS is a "normal" SMS or "DT-related" SMS that carries special information for triggering an MTC Application in the SMS body;

which is the target APN, i.e. to which APN the UE would establish/activate a user plane connection after receiving and processing the DT request. In this case the SGSN/MME cannot estimate whether the activated APN-based SM congestion control is applicable to the UE or not.

Accordingly, the congestion control could not be performed efficiently in this scenario.

It is assumed that in the case when the SGSN/MME applies MM congestion control, the SGSN/MME would not page the UE when the Device Trigger request has to be transmitted. The reason is that through the paging, additional MM signalling to from the SGSN/MME would be caused, which is not desirable. Furthermore, if an MM back-off timer is running in the UE when the UE receives paging for the Device Trigger, the UE would delete the MM back-off timer and omit the MM congestion control. So, the SGSN/MME would probably not page the UE and the SGSN/MME would signal back to the SM-SC or to the MTC-IWF, depending whether T4 or T5 interface is used, that the Device Trigger request is not delivered. The MTC-IWF would generate a Trigger Delivery report, which may contain a cause value that the non-delivery is due to MM congestion control, and send it to the MTC server. The network (SM-SC of MTC-IWF) inform the MTC server about the congestion situation and requests the MTC server to limit (or stop) the transmission of the Device Trigger requests for a particular group of devices. This situation may lead to different problems.

SUMMARY OF THE INVENTION

The problem underlying the present invention is based on the observation that in a communication system providing triggering procedure, in which a triggering device sends a trigger request to a triggered device and the triggered device is not able to respond to the trigger request due to a network congestion, the efficiency of the signaling may be reduced by transmitting multiple trigger requests and/or connection establishment requests. Moreover, the availability of information about the congestion may differ for different network entities.

The aim of the present invention is to facilitate an efficient congestion control by reducing the amount of signaling exchange necessary for device triggering procedure in the state of network congestion.

This is achieved by the features of the independent claims.

Advantageous embodiments are subject matter of the dependent claims.

The particular approach of the present invention is to obtain at the serving network node information about the capabilities of the terminal regarding the device triggering and to decide in accordance with these capabilities and the congestion situation whether to forward to the terminal a trigger request or not.

According to an aspect of the present invention, a method is provided for triggering a terminal in a communication network including a serving network node, the method being for executing at the serving network node. The method includes the steps of: determining information related to device triggering capabilities of the terminal from a message received from the terminal, the server or another network node; receiving a trigger request for triggering establishment of a connection from the terminal to the server, the trigger request being sent by the server over the communication network to the terminal; judging based on the information related to device triggering capabilities of the terminal and based on the current congestion state whether to transmit the trigger request to the terminal or not; and transmitting or not transmitting the trigger request to the terminal according to the result of the judging step.

The trigger request includes instruction for the terminal to establish communication and/or transmit information to the triggering device or to another predetermined entity. The triggering device (triggering server) may be located outside the network such as a cellular network including the terminal and the serving network node. The server may be an originating node which issues the trigger request. The trigger request may be transported to the terminal in different ways. One of the ways is short-message-service (SMS) transmitted to the terminal. In such case it is possible that the triggering server issues a trigger request which is encapsulated into an SMS at another server such as an SM-SC server. However, the present invention is not limited by a particular architecture and the terminal may receive the trigger request in other ways than via SMS.

The communication network here refers to any communication network, cellular or ad-hoc; wireless or wired. In general, the communication network may be also any heterogeneous network.

Preferably, the information related to device triggering capabilities of the terminal is at least one of: a priority or service quality of the terminal indicated by radio resource control protocol of a radio access network in which the terminal is located; whether the message is received over a predefined interface or a predefined network entity; a capability determined from a message received from a subscriber server; a port number determined from the message, wherein a predetermined port number is used for device triggering; a protocol discriminator determined from a header of the message carrying the trigger request, the protocol discriminator indicating the content type of the payload; terminal device triggering capability or status determined from a message received from the terminal; whether the message is a device triggering message determined from the trigger request message header.

It is noted that these are only examples of the information related to device triggering capabilities. In general, any information which may be use to estimate the terminal's device triggering capabilities may be used to do so. In particular, the above information may be combined in order to better estimate the terminal capabilities, and/or to estimate the terminal capabilities in different scenarios including different network architectures used for the device triggering functions.

Advantageously, the above method further comprising the steps of: determining an external network to which the terminal may establish connection; store the determined external network for the terminal in the serving network node; and determining according to the current congestion state whether said external network is under congestion or not.

External network may refer to a network out of the terminal's access network. For instance, the terminal's access network may be a 3GPP network such as GPRS, UMTS or LTE network. The external network may be a network out of the 3GPP network and its provider. In general, the external network may be an APN (access point name). In particular, the external network may be a network of a provider of software or services to the user, to which the user is connected over the "network". The device triggering may serve to automatic software updates, traffic or status information, etc. The external network may thus be, for instance, a proprietary network other than the internet.

Preferably, the determining and storing of the external network information/identity is performed upon receiving the trigger request message.

In particular, the external network to which the terminal is to establish connection when triggered may be determined by at least one of the following steps:

Determining the external networks to which the terminal is subscribed from a message received from a subscriber server. The subscriber server may be, for instance, a home subscriber server or home location register as employed in the well-known cellular systems. However, the present invention is not limited thereto any server storing the information related the subscription of the users to services provided by the service provider. It is envisaged that the subscriber server would also include information about the device triggering service, which may be provided to the serving network node.

Determining the external networks to which the terminal may establish connection after being triggered from a message received from the subscriber server. This approach may be more reliable in certain scenarios that the previous one. In particular, the device-triggering capabilities are related to the networks to which the terminal is not only subscribed, but also may establish connection after being triggered.

Determining the external networks to which the terminal may establish connection after being triggered from a message received from the terminal. The external networks to which the terminal may establish connection after being triggered may be known at the terminal and may be transmitted to the serving network node. It may not be necessary to define a new message for this purpose. The capability information may be transmitted within an already existing signaling message. However, a new message may also be alternatively defined for this purpose.

Determining whether the serving network node has a bearer context established for the terminal.

Determining whether the bearer context is for a bearer to a congested network.

Determining a maximum number of bearers allowed for the congested network and/or connection types allowed for the congested external network. Here the connection type may refer to an IPv4 or IPv6 connection (PDN). The number of connections in the congested network may be limited separately for different connection types.

Determining the external networks to which the terminal may establish connection based on the identity of the server which initiated the terminal triggering.

In accordance with an embodiment of the present invention, the method further comprising the step of transmitting to the server a message including a report regarding the delivery of the device trigger request and a time-period in which a trigger request should not be transmitted or retransmitted to the terminal. It is noted that the server here may be, for instance, an SMS originating server such as SMS-SC server. However, in other scenarios, the server may also be a server originating the trigger request logically, i.e. the device triggering (application) server.

Advantageously, when deciding to transmit the device trigger request to the terminal, the serving network node may further transmit to the terminal information indicating the congested external network. This approach enables preventing the terminal from trying to transmit data to the congested network. In addition, the serving network node may transmit to the terminal a back-off timer. A back-off timer defines a time period during which the terminal should not try to transmit data to the congested network.

Preferably, upon transmitting to the terminal the information indicating the congested external network and/or a back-off timer, in the serving network entity a timer is set during which the serving network entity does not transmit a delivery report regarding a device trigger response from the terminal.

According to an embodiment of the present invention, the serving network may further perform the step of receiving from the terminal an information indicating that the terminal is unable to establish data connection to an external network and the identity of the external network, and/or the remaining back-off timer, and/or the identity of a device trigger response which could not be transmitted. The "remaining back-off timer" refers to indicating the remaining time during which the terminal shall not (re)transmit data to the congested network. The identity of the device trigger response is any indication enabling the server to recognize the trigger request to which the message relates.

In accordance with another aspect of the present invention, a method is provided for triggering by a server a terminal in a communication network including a serving network node, the method being for executing at the terminal and comprising the steps of: determining terminal capabilities related to device triggering; and transmitting an information including the determined terminal capabilities to a serving network node.

Advantageously, the method further comprises the steps of receiving from the serving network node an information indicating the congested external network; storing the received information; and judging based on the stored information whether to transmit or not signaling or data to the external network.

The signaling may be a non-access-stratum (NAS) signaling. However, the present invention is not limited to that kind of signaling. The above terminal features enable the communication of the terminal with the serving network node allowing the serving network node to obtain the information about triggering capabilities of the terminal. Moreover, it enables terminal to avoid sending data to a congested network by informing the terminal about the congested networks.

In accordance with another aspect of the present invention, an apparatus is provided for triggering by a server a terminal in a communication network including a serving network node, the apparatus being the serving network node and comprising: a capability determining unit for determining information related to device triggering capabilities of the terminal from a message received from the terminal, the server or another network node; a receiving unit for receiving a trigger request for triggering establishment of a connection from the terminal to the server, the trigger request being sent by the server over the communication network to the terminal; a judging unit for judging based on the information related to device triggering capabilities of the terminal and based on the current congestion state whether to transmit the trigger request to the terminal or not; and a transmitting unit for transmitting or not transmitting the trigger request to the terminal according to the judgment of the judging unit.

The apparatus may advantageously further comprise: an APN determining unit for determining an external network to which the terminal may establish connection when receiving the trigger request message; a storage for storing the external network determined by the APN determining unit for the terminal in the serving network node; and a congestion detection unit for determining according to the current congestion state whether said external network is under congestion or not.

The APN determining unit is preferably configured to determine an external network to which the terminal is to establish connection when triggered by at least one of: determining the external networks to which the terminal is subscribed from a message received from a subscriber server; determining the external networks to which the terminal may establish connection after being triggered from a message received from the subscriber server; determining the external networks to which the terminal may establish connection after being triggered from a message received from the terminal; determining whether the serving network node has a bearer context established for the terminal and whether the bearer context is for a bearer to a congested network and/or determining a maximum number of bearers allowed for the congested network and/or connection types allowed for the congested external network; determining the external networks to which the terminal may establish connection based on the identity of the server which initiated the terminal triggering.

The transmitting unit may be further configured to transmit to the server a message including a report regarding the delivery of the device trigger request and a time-period in which the server should not transmit or retransmit a trigger request to the terminal.

The transmitting unit may be configured to transmit to the terminal an information indicating the congested external network and/or a back-off timer.

The apparatus may further comprises a back-off unit for, upon transmitting to the terminal the information indicating the congested external network and/or a back-off timer, setting in the serving network node a timer during which the serving network entity does not transmit a delivery report regarding a device trigger response from the terminal and/or The receiving unit may be further configured to receive from the terminal an information indicating that the terminal is unable to establish data connection to an external network and the identity of the corresponding external network, and/or the remaining back-off timer, and/or the identity of a device trigger response which could not be transmitted.

According to another aspect of the invention, an apparatus (terminal) is provided for triggering by a server a terminal in a communication network including a serving network node, the apparatus being the terminal and comprising: a capability determining unit for determining terminal capabilities related to device triggering; and a transmitting unit for transmitting an information including the determined terminal capabilities to a serving network node.

The terminal may further comprise a receiving unit for receiving from the serving network node information indicating the congested external network; a storage for storing the received information; and a judging unit for judging based on the stored information whether to transmit or not non access stratum signaling or data to the external network.

In accordance with another aspect of the present invention, a computer program product comprising a computer-readable medium having a computer-readable program code embodied thereon is provided, the program code being adapted to carry out the present invention.

In accordance with still another aspect of the invention an integrated circuit is provided embodying any apparatus as described above.

The above and other objects and features of the present invention will become more apparent from the following description and preferred embodiments given in conjunction with the accompanying drawings in which:

FIG. 12 is a block diagram illustrating an improved communication related to storing of Device Trigger (over MT-SMS) when MM/SM CC is activated;

FIG. 13 is a block diagram illustrating an improved communication storing of Device Trigger (over T5) when MM/SM CC is activated;

DETAILED DESCRIPTION

In this document, the term such as "mobile node" designates a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

Figure 1:
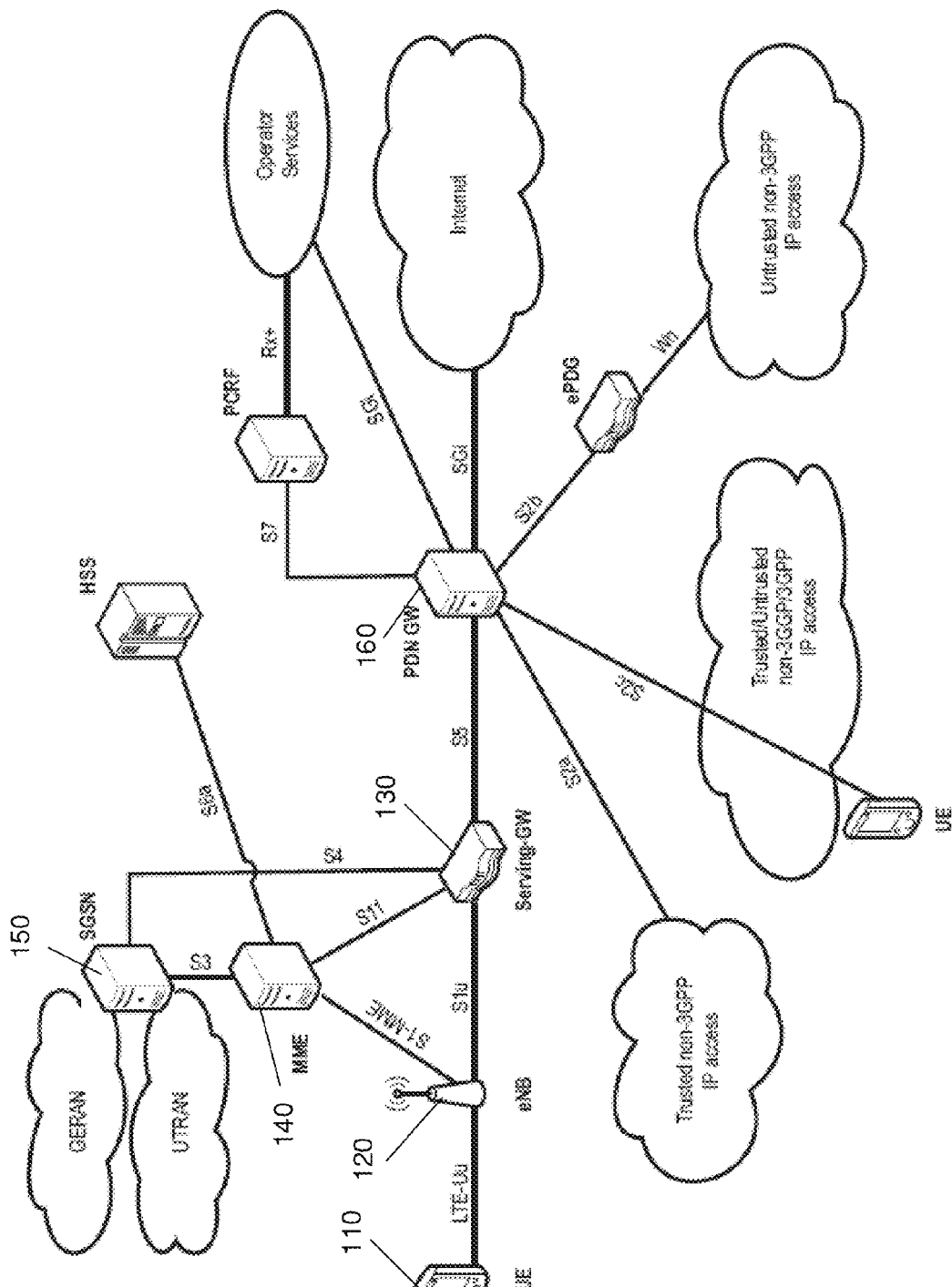
FIG. 1 is a schematic drawing showing the general structure of a sub-frame on a downlink component carrier defined for 3GPP LTE.
Figure 2:
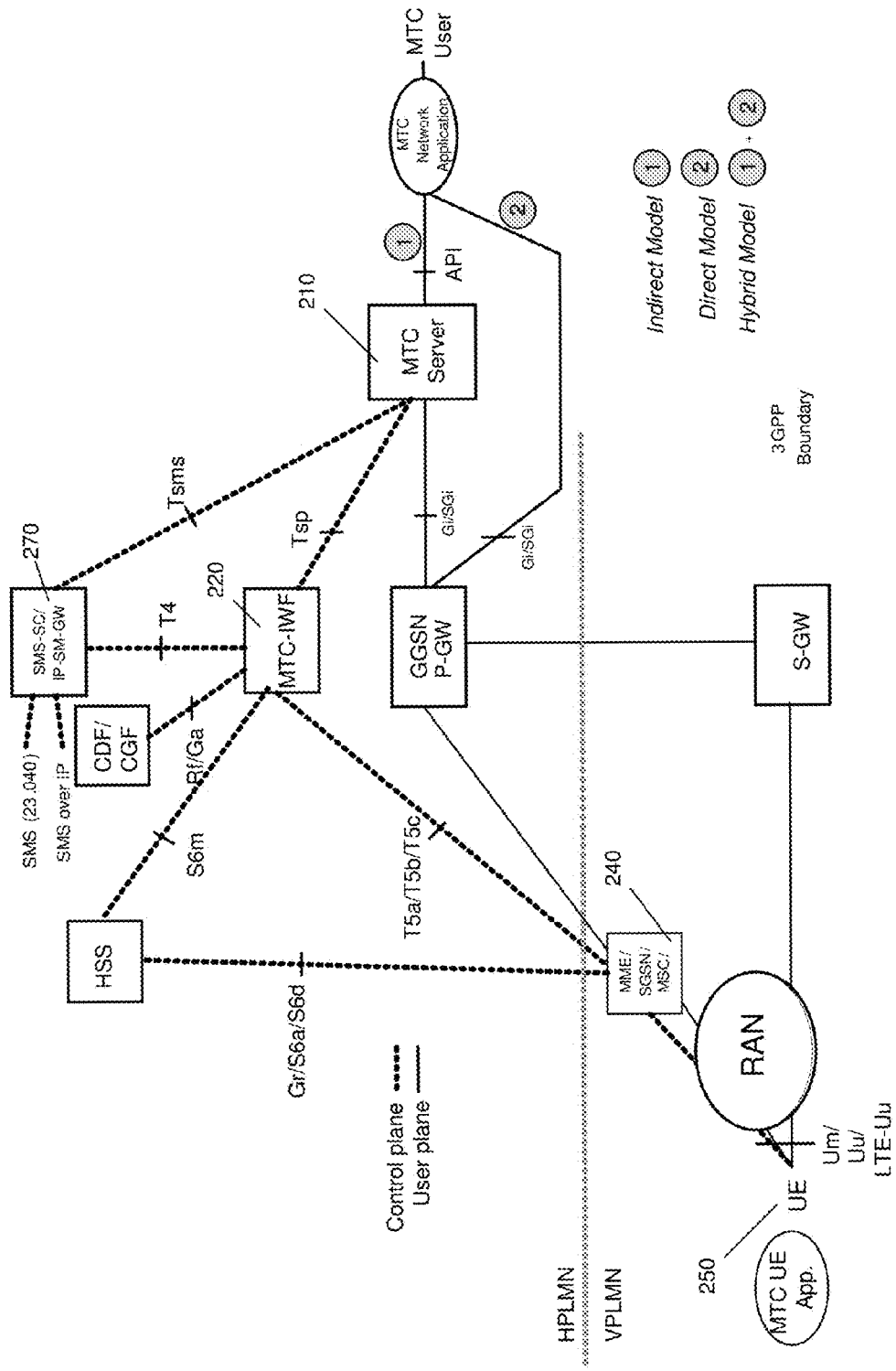
FIG. 2 is a block diagram illustrating current 3GPP architecture for machine-type communication.
Figure 3:
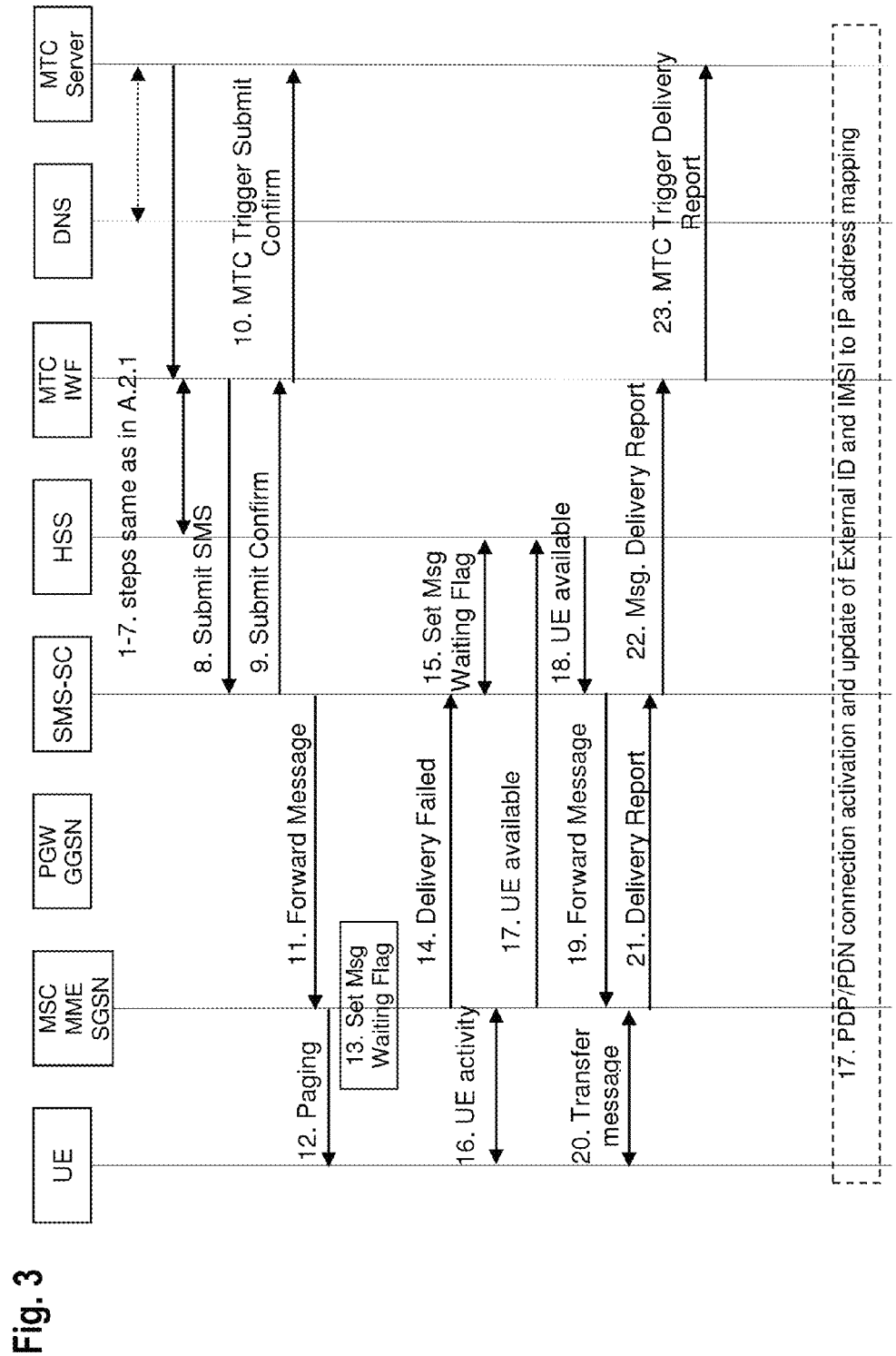
FIG. 3 is a message flow diagram illustrating an example of a successful delayed device trigger delivery flow corresponding to 3GPP architecture for machine-type communication of FIG. 2.

The term "server" or "triggering server" here refers to an entity which may be within the network or in an external network or an external node. It may be, for instance a server for automatically collecting data from a (MTC) terminal or a plurality of terminals and capable of sending to the terminal triggering requests. A triggering request is a message or an indicator communicated to the terminal and indicating that the terminal should set-up a connection to the network and/or to the server in order to provide it with data such as measured data, the data to be transmitted to the server or just signaling data for indicating its identity or for indicating that the actual data will be, will not be sent or will be send with a delay—as provided by the present invention. It is noted that the server may also be implemented by another terminal. For instance, a first terminal may be configured to trigger a second terminal. Such a configuration may be advantageous, for instance, when a (possibly user operated) terminal collects data from another MTC terminal. As described in the background section above, the terminal may be an LTE, UMTS, or GSM/GPRS/EDGE terminal. The triggering request may be transmitted via different means, three examples of which have been described with reference to FIG. 2. However, the present invention is not limited thereto any other networks and/or mechanisms within the network may be employed as well.

Small amount of data which is typically provided by an MTC terminal may be understood as a small chunk of data, which could be a small IP packet, an SMS or some other application specific data. The amount of data may be considered to be small enough, for instance, when it fits into an SMS. Accordingly, the small data amount would be smaller than 140 bytes, which is the current payload size of an SMS. Therefore, in the sense of the present invention, a small amount of data may also be understood as an SMS. However, the present invention is not limited thereto and the data provided by the terminal after triggering may also contain larger pieces of information.

The term "subscribed" may be understood as that, when a user equipment is subscribed to the network, the network at least knows enough to trigger the user equipment to connect to the network. In particular, this could be an identification of the user equipment, such as the IMSI. Furthermore, in order to allow an efficient "search" for the user equipment, the network may know an approximate location of the user equipment. In case the user equipment is in IDLE mode, the network may have stored context data in the core network, including the IMSI, possible tracking area(s), bearer contexts (EPS,), so as to enable paging of the user equipment.

Regarding the distinguishing between the user plane and the control plane, data bearers are associated with and part of the user plane. They are established to transport user data. In contrast, the control plane and signalling bearers are, in general, for the transport of the control signalling.

The present invention relates to a device triggering procedure that enables to indicate to the triggering initiator that the uplink data to be transmitted in response to the trigger from the terminal device to the triggering initiator will be delayed or not delivered.

It is noted that in general, the triggering initiator device which sends the trigger request does not necessarily corresponds to the device to which the triggered terminal transmits the data. It is recognized that the triggering device and the receiving device may be different entities, differing in location and/or implementation. However, in the following examples, it will be assumed, that the triggering entity such as triggering server (or MTC server) also receives the data from the terminal sent in response to the trigger request.

The trigger initiator is the entity which is the origin of the trigger request. It is further noted that the trigger request originated at the triggering initiator may be transmitted in various ways over the network or a plurality of networks. For instance, the trigger request may be sent to the terminal transparently (opaque) with respect to the network. This means that the network does not make any use of the trigger indicator and only transmits it as a "user data" from the trigger initiator to the triggered device (terminal). Alternatively, the trigger request may be transmitted at least partly as a control signalling, and interpreted and/or processed by any network node, which may further take necessary steps to inform the terminal that it has been triggered.

The triggering server is advantageously an MTC server, which automatically collects data from the triggered device. Automatically in this sense means: without direct input of the user. For instance, an application at the MTC server controls transmitting of the trigger request every predefined time period. While the application may be configured by a human user, the respective trigger requests are generated and transmitted automatically by the application.

The present invention provides an approach for triggering a device from a triggering server in a situation in which a congestion control mechanism is activated in the network so that the triggered device is not able to establish a connection to the network and/or to send the uplink data to the triggering server.

In this scenario, current LTE network architecture may result in some problems, possibly leading to reduced resource usage efficiency. However, the problems are not necessarily limited to LTE architecture. They may also occur in any communication system providing triggering procedure in which a triggering device sends a trigger request to a triggered device and the triggered device is not able to respond to the trigger request due to network congestion.

In the Background Section above, the mechanism of the current LTE system under development have been briefly introduced in order to illustrate problems occurring in the existing technology. In particular, when the device trigger request is sent from the MTC server, the network forwards the request to the SGSN/MME, at which the UE is registered. The SGSN/MME then pages the UE and after establishing the NAS MM connection, the SGSN/MME delivers the device trigger request to the UE.

In case of the GERAN/UTRAN access, if an APN-based congestion control is applied to an APN, to which the UE is going to send UL data, the UE is not allowed to establish or activate PDP context to that APN. Hence, no user plane bearers to this APN can be established and the UE is not able to transmit the UL data, although the MT-SMS carrying the Device Trigger request was successfully received by the terminal and the successful reception was reported to the MTC server. Thus, in this scenario, the network would report to the MTC server that the Device Trigger request was successfully delivered and the MTC server would expect to receive the UE's data report, i.e. the uplink (UL) data or a connection initiation from the UE to the MTC server.

If the MTC server does not receive data from the UE after Device Trigger is acknowledged, the MTC server may trigger the UE again. However, even after the second Device Trigger, the UE may still be unable to report the data, for instance, due to an SM-BO timer still running in the UE. Thus, one of the problems underling the present invention is to avoid the unnecessary multiple triggering from the MTC server to the UE.

A similar problem may occur when the UE is attached to the EPS system, i.e. connected to the network via the E-UTRAN access. The difference with respect to the GERAN/UTRAN access is that for existing PDN connections or EPS bearers which do not require a Bearer Modification procedure, the UE is able to send the UL data. However, if the Device Trigger would result in new or a modified EPS bearer, the UE is not able to perform establishment of a new bearer or modification of the existing bearers. Hence, the UE is not able to send UL data or establish a connection to the MTC server.

In general, the UE is not able to perform the establishment of a new bearer or the modification of an existing bearer, i.e. any session management procedure, and consequently, the UE is also not able to send the UL data to the MTC server, as long as the SM-BO timer is running.

Furthermore, during the device triggering procedure, the network may not be able to determine to which external network the terminal will send the uplink data. The external network is identified under so-called Access Point Name (APN) in the 3GPP terminology. Consequently, the network may also not know whether congestion control is activated for that APN. Hence, the network may not be able to determine whether the congestion control is applicable to the resulting uplink data to be sent by the triggered device to the trigger initiator. In general, when the terminal does not have connection to a particular external network, it may not be possible to determine to which network the terminal shall establish the connection.

A further problem that this invention targets to solve is that the serving network node (SGSN/MME) cannot differentiate between "normal" and "DT-related" MT-SMS when the device triggering is performed over SMS. The SGSN/MME would not know whether to apply any specific treatment to the received MT-SMS. One possible option is that the SGSN/MME would reject all MT-SMSs to all UEs subscribed to the SM congested APN. Furthermore, if a UE is subscribed to multiple APNs, but SM CC is applied to only one APN, all DT requests will be blocked by the network (MTC-IWF or SGSN/MME) applying prior-art "Overload Control via MTC-IWF" mechanism as described in 3GPP TS 23.888, Section 6.59. Here, the term "normal" MT-SMS refers to an MT-SMS for the purpose different from the device triggering (DT), such as MT-SMS with user data rather than an automatically generated trigger request.

In order to solve some of the above summarized problems, the present invention envisages the SGSN/MME being able to generate the Device Trigger delivery report to the MTC server (that may include the "UL data delivery indication" or some other indication as will also be described below) based on internal processing of the Device Trigger request message. This internal processing is preferably to be based on information about the APN-based SM CC, the UE capabilities, subscribed or DT-related APNs, stored PDP/PDN context or other data or explicit signalling from UE or network entities. In particular, it is envisaged to provide the serving network node entity (mobile management entity) with information supporting the internal processing of the device trigger request messages. Such information may be information enabling distinguishing between device-triggering SMS from the SMS for other purposes and/or enabling identification of the APN to which the terminal would try to establish connection after receiving the trigger request message.

According to the provided information and internal processing, the serving network node may decide not to deliver the DT request message (for instance, SMS) to the terminal, and to issue an indication to the sending entity (MTC-IWF or SM-SC or MTC server) for indicating that the DT request message is not delivered to the terminal (UE). Optionally, a timer can be indicated informing the MTC server about the time during which a retransmission of the DT request is undesirable and/or during which a new DT request message should not be transmitted. Details to this embodiment of the invention will be provided below.

The present invention further provides a solution, according to which an indication is sent to the server. In particular, in terms of 3GPP systems, an indication is sent to the MTC server in case of APN-based Session Management Congestion Control (SM CC) in the network. The indicator preferably indicates whether the uplink data resulting from the device triggering will be delivered and/or delayed. The resulting data may be, for instance, measurement data, which the terminal collects and transmits when being triggered. Alternatively, the data may be a terminal identification enabling uniquely identifying the terminal (e.g. an IP address) from extern or internally, i.e. within the network. The indication, which may be called "UL data delivery indication", is sent in addition or instead of the usual trigger delivery report to the MTC server. The UL data delivery indication is determined either at the terminal or in the network, for instance, at a serving core network (CN) node such as the SGSN or the MME, based on the duration of the SM-BO timer and/or the estimated validity of the UL data.

In the case that the device (terminal) or the network node (SGSN/MME) knows the duration of the activated congestion control, the device or the network can decide whether the UP data would be valid after the reducing/suppressing the congestion. In particular, the terminal or the network may have knowledge of a back-off timer running at the terminal as the trigger request arrives. The back-off time is a time during the terminal will refrain from trying to establish connection to the network or transmit the data to the server. When the duration of back-off state is known, the terminal or the network node may indicate that the uplink data shall not be delivered, shall be delivered, and/or may indicate the estimated delivery delay to the server.

For the case, when there is no BO timer running in the device when the device trigger request is received, an embodiment of the present invention envisages another solution. In particular, the terminal or the network (e.g. the SGSN/MME or MTC-IWF) may be able to determine the target APN of the UL data and if congestion control is to be applied after the device initiates signalling for user plane (U-plane) connection establishment or modification. Based on such determination, the device or the network (e.g. SGSN/MME or MTC-IWF) sends an indication to the MTC server about the delivery or delay of the UL data.

After receiving the UL data delivery indication while the SM-BO is running, according to an embodiment of the present invention, the MTC server may decide for at least one of the following actions:

retransmit Device Trigger request after the SM-BO time expires or send a new Device Trigger immediately. which would result in the UE to sending the UL data to a different (non-congested) APN or send a new Device Trigger immediately with a higher priority, which would indicate to the network to not apply the session management congestion control to the connection establishment resulting from the device triggering or wait for receiving the delayed UL data.

The UL data delivery indication can be sent to the MTC server either from the network (e.g. SGSN/MME or MTC-IWF) or from the UE. As the UE is not able to establish U-plane connection, the UE may send the indication to the MTC server as a message (e.g. small data) over the C-plane.

In summary, in accordance with the particular approach of the present invention, namely to inform the server in case of network congestion that the data will be delivered later or not at all, the present invention provides a method to be executed at a terminal, a method to be executed at a network node and a method to be executed at the triggering server as well as the corresponding apparatuses: a terminal, a network node, and a triggering server.

In order to solve the problems described above, namely avoiding the retransmission of the Device Trigger request, it is proposed that the MTC server is informed about the delivery/non-delivery/delay of the UL data resulting from the Device Triggering. Based on the received indication and the internal state, the MTC server decides which option to perform.

In order to facilitate providing the indication to the triggering server, a terminal or a network node may perform evaluating whether the connection can be established from the terminal to the server or not including determining whether the network is congested and/or whether a back-off timer is running and/or the remaining time of the back-off timer at the terminal; and transmitting a delivery delay message to the server for indicating at least one of impossibility of establishing the connection to the server after the trigger and/or an impossibility of transmitting the data and/or a data transmission delay.

On the other hand, the triggering server may receive the delivery delay indicator provided by the terminal or by the network node and perform the processing the delivery delay indicator to determine whether to retransmit the trigger request at later point, or to retransmit the trigger request with higher priority or a different APN or to omit transmission of the trigger request for the same network to another terminal.

The delivery delay indication may indicate that the uplink data from the terminal will be delivered with a delay. Accordingly, the indicator may have a value "UL data will be delivered with a delay". Optionally, the cause of the delay may be signaled as an information element "cause". The cause (reason) for the delay may be, for instance, the network congestion and/or the unavailability of the data to be reported. Still optionally, an estimation of the delay time of the uplink data may be provided as an information element "UL data delay time". This delay may be determined, for instance, based on a running back-off timer such as the SM-BO timer, for example as the remaining value of the running SM-BO timer.

In response to the delivery delay indicator, the MTC server may decide the next step depending on the urgency (or validity) of the expected UL data. For example:

The MTC server may evaluate whether the delayed data will be valid after the indicated delay time. If the UL data will be valid in the MTC server after the indicated delay time, the MTC server does not need to perform any actions and may wait for the delayed UL data. On the other hand, it may occur that the UL data will not be valid in the MTC server after the indicated delay time. The latter case is possible when for example the UE or the network indicated that the UL data will be delivered with a delay, however, the MTC estimates that the UL data will not be useful or valid for utilization in the MTC server when delivered with the indicated delay. Then the MTC server may:

If the TMC server can use an alternative APN, to which the UL data resulting from the new Device Triggering will be delivered, or optionally a higher priority for the Device Triggering procedure, the MTC server sends a new Device Trigger request before the delay time expires, Else, the MTC server waits for the delay time to expire and sends a new Device Trigger request then.

The delivery delay indicator may alternatively indicate that the data will not be delivered. Optionally, similarly to the previous case, the "cause" of the UL data non-delivery may be signalled, which may be a network congestion or non-availability of the data at the terminal. Moreover, still optionally, the "congestion duration" may be included in the indicator, based, for instance, on the SM-BO timer. The MTC server decides the next step depending on the urgency (or validity) of the expected UL data. For example, similarly to the previous case:

If the MTC server can use an alternative APN, to which the UL data resulting from the new Device Triggering will be delivered, or optionally a higher priority for the Device Triggering procedure, the MTC server sends a new Device Trigger request before the delay time expires, Else, the MTC server waits for the delay time to expire and sends a new Device Trigger request.

In general, the method performed by the triggering server would correspondingly perform the processing step by evaluating the received indicator and/or a possibility of the terminal to use another network which would not be congested. The server's processing unit may be configured to perform such evaluation.

In order to indicate the delay, (remaining) SM-BO timer value may be signalled. It is noted that according to the current stage of the LTE, the presence of the SM-BO timer in the SM reject message transmitted to the UE from the network is optional. Therefore it is possible that the UE's signalling to establish or modify a PDP/PDN connection after the Device Triggering request is rejected without providing the SM-BO timer. In such a case also the serving CN node (SGSN/MME) may not know the duration of SM CC, so that the delay cannot be indicated to the MTC server. As a result the indication to the MTC server would contain information about the non-delivery of the UL data or about the impossibility to establish a connection to the MTC server.

The determining of the indication to be sent to the MTC server is performed either in the network (by the SGSN or MME) or in the UE. The reason is that the Device Triggering procedure is assumed to be performed over the control plane. However, if the Device Triggering procedure is performed over the user plane, it shall be possible for user plane network entities to determine, generate and send the indication to the MTC server.

After the MTC server receives the UL data delivery/validity (SM-BO timer) indication the MTC server can decide to send a new Device Trigger request indicating a different APN to the UE. This APN can be used as back-up APN for sending the data. For that purpose, the MTC server can use a different External ID for the UE. The advantage of using a different External ID is that the External ID can directly or indirectly encode the APN that will be used by the UE to send the UL data as will be described later.

Additionally, the MTC server may use the UL data delivery/validity (SM-BO timer) indicator as an indication to start applying one of the following policies:

omit the sending of further Device Trigger requests for the same UE or for all UEs belonging to the particular APN or for a part of the UEs of the same group or APN; or to reduce the rate of sending of Device Trigger requests to UEs belonging to the particular group or APN.

These policies may be selectively applied to some UE's according to their priority or urgency of the data, etc. The MTC server may not be aware about the APN, to which the UEs establish/activate a data connection. So, the group of UEs may be formed by the members of a certain MTC application or the members of a particular subscription.

The time span for applying one of the above policies could be the "data transmission delay" (or SM-BO timer) optionally included in the UL data delivery/validity (SM-BO timer) indicator. It is noted that the optionality here may be understood as optionality given by the standard, i.e. that the UE or the network node may decide whether they indicate or not the data delivery delay to the MTC or that the UE or the network only send the data delivery delay under predefined conditions (for instance when the SM-BO is known and/or running). However, the delivery delay may also be mandatory indicated when the system is configured in such a way that the terminal and/or the network would always be capable of providing the estimate of the delay.

Alternatively or in addition, a new Device Trigger request may be sent with a higher priority than the original, first (or previous) device trigger request. This could mean that the MTC service provider may pay higher price for the Device Trigger request delivery and/or for the resulting UL data. However, even if the UE would use higher priority for the PDP/PDN connection request, the request would still be targeted to the same APN. As the APN-based SM CC does not allow to send any SM request message to the congested target APN, this solution alone may not work for the current releases of the 3GPP system. However, it may still be employable for future releases or for systems, which take into account priorities in their congestion control mechanisms. It should be noted that the priority of the Device Trigger request may be used in the following ways:

for the delivery mechanism in the network, e.g. when the network is (mobility management) congested to a certain degree and decide whether to deliver or not the trigger request; or by the UE, e.g. when the priority is included in the opaque (network-transparent) data portion of the Device Trigger request. In this case the UE would process the trigger information from the MTC server and may generate the request for PDP/PDN connection with a higher priority.

However, the high priority of the repeated Device Trigger request may also be used in the SGSN/MME or in the network in general in the following ways illustrated also in FIGS. 5 to 7:

If there is no SM-BO timer running in the UE, after the Device Triggering request (cf. "Device Trigger Delivery" in FIGS. 5 to 7), the UE sends a PDP/PDN connection request (cf. "New PDP/PDN Request"). Then the network (for instance, SGSN/MME) should have stored the high priority indication of the Device Trigger request and may apply the high priority so that the network would not reject the PDP/PDN connection request from the UE.

If there is an SM-BO timer running in the UE, after the Device Triggering request, the UE performs the internal processing as described below with reference to FIG. 9. The UE then decides to send an UL data delivery/validity (SM-BO timer) indication to the SGSN/MME (cf. "1) UL data validity+2) SM-BO" in FIG. 9). Then the SGSN/MME can apply the Device Trigger request's high priority in order to decide to delete the SM-BO timer in the UE (cf. "SM DL msg (delete SM-BO)" in FIG. 9).

In the following an embodiment is described, in which the Device Trigger request is stored in the network.

There are two main reasons why the SGSN/MME would page and deliver the Device Trigger request to the UE although there could be an SM congestion control active. This can happen because the SGSN/MME may not know about the APN-based SM CC when a Device Trigger request arrives in the SGSN/MME. One reason is that the SGSN/MME may not store the SM-BO timer when the SM request from the UE has been rejected with the SM-BO timer (cf. "PDP/bearer Reject (SM-BO)" in FIG. 7). The other reason is that the APN, to which the UE would send the UL data after receiving the Device Trigger, may not be known in the SGSN/MME.

To solve the problem of availability of the SM-CC status information, the network (SGSN/MME) can resolve the APN, to which the UE sends UL data after receiving the Device Trigger.

One example of how to resolve the APN is based on pre-configuration. UE's external identifier (ID) used in the Device Trigger transmitted from the MTC server is structured as <domain><local ID>.

The term <domain> is used by MTC server to find out the UE's HPLMN and MTC-IWF. The term <local ID> is used by the MTC-IWF to find out the UE's subscription and internal ID (e.g. IMSI). The term <local ID> can be structured in such a way that the network/MTC-IWF can find out based on the pre-configuration the APN (called below "target APN"), to which the UE would send UL data after receiving the Device Trigger request.

After determining the target APN, the network (e.g. SGSN/MME) determines whether the target APN is under congestion control. Several actions can be performed by the network as listed below in order to determine the congestion control status of the APN:

In case that MM congestion control is activated for the resolved target APN, the SGSN/MME should not start the paging procedure to the UE, but instead report about the MME congestion to the SM-SC or MIT-IWF and also report about the undelivered Device Trigger request. The MTC-IWF/SM-SC informs then the MTC server about the undelivered Device Trigger request and optionally about the cause, e.g. MM congestion, and optionally about the remaining MM congestion duration (e.g. MM back-off timer).

In case that SM congestion control is activated for the resolved target APN and the UE is camping under an E-UTRAN access, i.e. connected to an MME, the MME can perform internal check of the stored SM context of the target UE.

If the MME stores an EPS bearer context to the resolved target APN, this could mean that the EPS bearer would be automatically established without SM signaling from the UE. Then, the MME can initiate the paging procedure and transmit the Device Trigger to the UE. Usually, the U-plane bearer would be established during the Service Request procedure and the UE would be able to transmit the UL data to the MTC server.

If the MME does not store an EPS bearer context to the resolved target APN, this means that the UE would initiate a PDN connectivity request procedure (i.e. SM signaling) to the target APN. The MME should not initiate the paging procedure for Device Trigger request transmission. Instead the MME may inform the SM-SC (in case MT-SMS is used over T4 or Tsms interfaces) or the MTC-IWF (in case T5 interface is used) that there is congestion in the network and the Device Trigger is NOT delivered. The MME may also inform the reason/cause why the Device Trigger request is not delivered, such as that the SM CC is applied to the target APN. The MTC-IWF may forward this indication/information the MTC server.

In case that SM congestion control is activated for the resolved target APN and the UE is camping under a GERAN/UTRAN access, i.e. connected to an SGSN, the SGSN does not transmit the Device Trigger request. The further actions are identical to the action performed in the case above in which the MME does not store an EPS bearer context.

Figure 4:
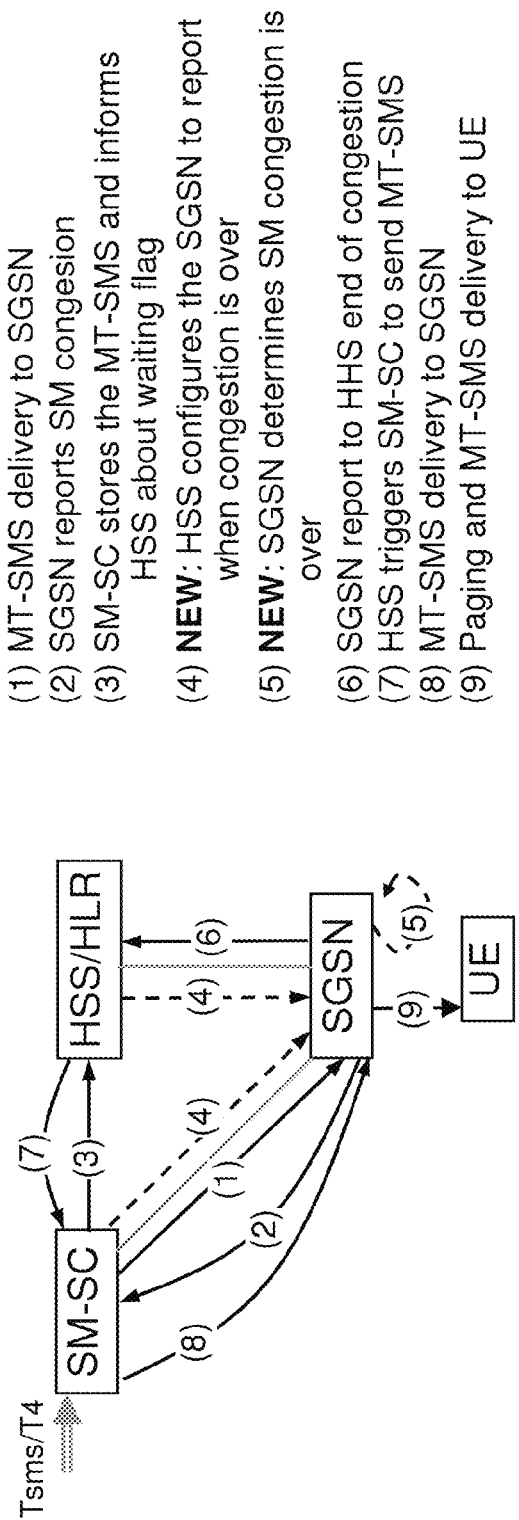
FIG. 4 is a block diagram illustrating communication between selected entities of a network in case of congestion, and in particular, to storing a device trigger.

FIG. 4 shows an example of a signaling flow in case the SGSN/MME can resolve the APN-based SM CC when receiving the Device Trigger request in the form of an MT-SMS. The individual steps of the communication are marked by reference numerals (1) to (9). The SM-SC receives over the T4/Tsms interface from the MTC server the trigger request to be transmitted to the terminal. In the first step (1) the SM-SC delivers a corresponding mobile-terminated (MT) SMS to the SGSN. The MT-SMS includes the trigger request. It is assumed that the APN is congested. Thus, in the second step (2), the SGSN (serving network node) reports to the SM-SC that the network is congested, in particular, that the session management or connection establishment cannot be performed. In response thereto, the SM-SC stores (3) the MT-SMS and informs the HSS about the stored MT-SMS. The SM-SC can use a flag (e.g. waiting flag) to inform the HSS that whenever the UE becomes reachable (i.e. the SM CC is over) the SM-SC should be informed in order to deliver the stored MT-SMS. In order to enable a more efficient signaling in the case of congestion, steps (4) and (5) are added to the existing technology as follows. In step (4), the HSS/HLR configures the SGSN to report when the congestion is over. Accordingly, the SGSN monitors (5) whether there still is a congestion and reports back to HHS in step (6) as soon as the congestion is over, i.e. as soon as SGSN detects that the congestion is over. The HHS/HLR triggers (7) then the SM-SC to transmit the MT-SMS and the SM-SC delivers (8) the MT-SMS to the SGSN. The SGSN then pages (9) the terminal.

In summary, the above approach enables in a congestion state configuring a serving network node of a congested network (such as SGSN or MME) to check in a loop whether the congestion terminated. As soon as the congestion is determined as terminated at the network node, the network node reports the end of the congestion. The configuration is advantageously performed by a network entity which can resolve the terminal location and the reporting may also be performed to this entity. This may be, as in the example above a home location register or a similar entity. Optimizations may be possible in future systems where the serving network node (SGSN/MME) may directly indicate to the SM-SC about the expiration of the congestion control. In FIG. 4, the uninterrupted signaling lines show the procedures for delayed MT-SMS delivery due to unreachable UE. The interrupted signaling lines (steps 4 and 5) show the new functionality provided when the SM CC is assumed as a cause to store the Device Trigger request (instead the usual cause of unreachable UE).

There are still several possible difficulties with the proposed solution of storing the Device Trigger request in the network. For instance, the network may not be able to resolve the APN, to which the UE will establish connection. In particular, the network does not need to maintain a mapping table between the External ID and/or an MTC Application ID (internal ID) and the corresponding APN.

The storing of the Device Trigger in the network (e.g. in the SM-SC network node) may cause rather much signaling in the core network, including HSS interactions (see FIG. 4). Considering a possibly high amount of UEs in the network, the increased signaling may itself increase a probability of congestion and/or lead to congestion.

As already discussed above, the SGSN may not know if the SM congestion control is active for the target APN. The SM CC may be activated by the SGW/PGW/GGSN during a PDP context/EPS bearer request reject (cf. "PDP/bearer Reject (SM-BO)" in FIG. 5), which may have happened a while ago, so that the SGSN may have passed the SM-BO timer to UE, but the SGSN itself does not need to store any PDP context (and also no SM-BO timer). Alternatively, the SGSN/MME may not know at the time of the Device Triggering request reception that the target APN is congested because the SGSN/MME may not store related information. In summary: The SGSN may not know that the APN SM-CC is applied when the Device Trigger request is received, which is possible for the first rejected UE's (E)SM request. EPS Session Management (ESM) information request is sent from the network to the terminal. The terminal responds with an ESM information response. These messages belong to network initiated procedures related to EPS bearer context and serve for network-initiated (EPS) context activation.

Moreover, the SGSN does not necessarily know whether the UE will send/report the UL data immediately, because the UE may need some time to gather the UL data after receiving the Device Trigger request. As explained in the Background section above, the information in the Device Trigger request that is targeted to the UE is opaque/transparent to the network. In summary: It is not optimal to store the Device Trigger request in the network (e.g. SM-SC) and to re-transmit it later, as the UE may anyway need a longer time until the UL data are available and may thus transmit the uplink data later. It is to be noted that the network does not know the specific processing in the UE, i.e. whether the UE would send the UP data or establish the PDP/PDN connection immediately or whether the UE need time for measurements/collecting the data to be reported to the MTC server. This information or specific processing is only available in the UE after receiving the Device Trigger request or particularly the opaque (network-transparent) portion of the Device Trigger request.

Summarizing, the SGSN/MME is not aware of the APN-based SM CC and also not about the delay in the UE necessary to gather/measure the data before sending them to the MTC server. In the following, exemplary embodiments of the present invention are provided, which enable overcoming also these problems. An embodiment described in the following enables resolution of an APN-based SM CC after transmission of the Device Trigger request to the UE in the case in which no SM-BO timer is running in the UE at the time point when the Device Trigger request is received.

According to an embodiment, a method is provided to be executed by a serving network node (such as MME/SGSN) in a communication network over which a triggering server transmits a device triggering request to a terminal, the method comprising the steps of: receiving a device trigger request from a message server (or, in general, possibly over the message server, from the triggering terminal) for triggering the terminal; determining that a network used for delivery of the device trigger request and/or the requested data is under congestion control and reporting the congestion state to the message server; checking whether the congestion terminated; upon determining that the congestion terminated, reporting the termination to a node in the communication network.

In particular, the reporting may be performed towards the home subscriber server, which may than trigger the message server to transmit the device trigger request to the serving network node. However, the serving network node may also directly report to the message server as will be discussed later.

The message server may upon receiving a congestion indicator from the serving network node inform the home subscriber server (HLR/HSS) that a network is under congestion. The home subscriber server may set an internal flag indicating that it is waiting for the congestion to terminate. Upon terminating the congestion, the home subscriber server may receive a message from the serving network node informing about the congestion termination. Upon receiving this message, the home subscriber server may instruct the message server to transmit the device trigger message stored.

In the following, a possible optimization to avoid some of the above listed problems will be provided. First, it is assumed that the SGSN/MME knows about the activated APN-based SM CC. Independently on whether the SGSN/MME stores an SM-BO timer per UE (and per APN), the SGSN/MME applies the APN-based SM CC unless a timer expires or further instructions to stop the SM CC arrive from other network entities. Accordingly, the situation, in which the SGSN may not know that the APN SM CC is applied when Device Trigger (DT) request is received, is applicable only to the first rejected UE's (E)SM request, but afterwards it can be assumed that this problem does not exist.

The problem with storing of the DT in the network described above, leads to increased signaling messages amount in the core network including HSS as described above with reference to FIG. 4. This problem can be resolved by an optimization in the signaling exchange between the SGSN/MME and SM-SC. In particular, when the SGSN/MME rejects a DT message over T5 or MT-SMS, the SGSN/MME includes the MM/SM-BO timer to MTC-IWF or SM-SC. MTC-IWF (using T4) or SM-SC decide whether to store the MT-SMS for later DT, comparing DT validity time and MM/SM-BO timer as follows:

if DT validity time>MM/SM-BO timer, then store the DT/MT-SMS if DT validity time<MM/SM-BO timer, then report back to the MTC server the non-deliverable DT request and/or the MM/SM-BO timer (as already described above)

To better explain the optimizations proposed above, two examples are provided below. The first example is illustrated in FIG. 12, where the DT request is send in form of an MT-SMS over the T4 or Tsms interface to the SM-SC. FIG. 12 denotes SGSN as a serving network node, but in general this entity can be also MME or other serving node. Furthermore, FIG. 12 shows for simplicity a direct interface between the SM-SC and the serving node (SGSN). However, there could be other network entities in-between. The particular steps for transmission and storing or not of the MT-SMS are described are briefly described in the figure.

In the first step (1), the MT-SMS is delivered to the serving network node (SGSN/MME). The serving network node then performs in step (2) an internal check for determining whether MM or SM congestion control is applied. Step (2) also performs processing of the MT-SMS in the SGSN/MME before transmission. As according to the current state-of-the-art the SGSN/MME probably cannot resolve whether the MT-SMS is used for "normal" purposes or as DT request, the SGSN/MME chooses a conservative approach and may assume that the MT-SMS is used as a DT request if the UE is subscribed or configured for DT services. However, in the future, it may be MT-SMS message may include information, preferably in the MT-SMS header which is transparent to the SGSN/MME, indicating to the SGSN/MME that the MT-SMS is used for DT purpose. Further, the SGSN/MME may not be able to resolve the target APN. This is realistic because the MTC application relevant information is contained in the SMS body which is transparent to the SGSN/MME. Here again the SGSN/MME can choose a conservative approach and decide to reject the MT-SMS if at least one of the UE's subscribed APNs is congested, especially if MM congestion control is applied.

In step (3), the serving node informs a server responsible for generating the message for the terminal (such as SM-SC) that the MT-SMS cannot be delivered. The serving network node (MME/SGSN) may further attach to this message the MM/SM-BO timer. Providing the server with the MM/SM-BO timer has the advantage that the server may then decide about the further steps to be taken. Preferably, the server compares the received MM/SM-BO time with the validity time of the MT-SMS. In particular, if the (remaining) back-off time (SM-BO or MM-BO) is longer than the validity of the MT-SMS message, the message-generating server (SM-SC) informs the MTC server (the triggering server, the server by which the Device Trigger is originated) that the DT is undeliverable. The message-generating server may also attach the MM-BO and/or the SM-BO and send it to the MTC server in order to avoid the MTC server retransmitting the DT immediately (cf. step (5.1)).

If, on the other hand, the (remaining) back-off time (SM-BO or MM-BO) is shorter than the validity of the MT-SMS message, the message-generating server (SM-SC) stores the MT-SMS and may retransmit it later (cf. step (5.2)). For instance, the message-generating server (entity) may retransmit the stored MT-SMS to the serving network node as soon as the back-off timer (SM or MM) expires.

After receiving the (re)transmitted MT-SMS, the serving network node may page the terminal and deliver to the terminal the MT-SMS.

It is noted that the above approach may be applied to only the MM congestion or may be applied to only the SM congestion. However, it may be also applied to both MM and SM congestion control.

One further example is shown in FIG. 13 where the DT request is delivered to the SGSN/MME over the T5 interface (cf. step (1)). The SGSN/MME applies at step (2) similar processing to the DT request as described above for FIG. 12. The difference is however, that the serving network node (SGSN/MME) can be more certain about the purpose of the received downlink (DL) message, i.e. the SGSN/MME may conclude that this is a DT request message because it is received over the T5 interface. With other words, the reception of the DL message over the T5 interface is an indication that the message is used for the DT purposes. Regarding the target APN, the SGSN/MME (similar to FIG. 12) may not be able to resolve the target APN, as the relevant information is contained in the network opaque information in the DT request message body. Therefore, the SGSN/MME advantageously chooses a conservative approach and decides to reject the DT request if one of the UE' subscribed APNs is currently under MM or SM congestion control.

The serving network node informs the MTC-IWF (cf. step (3)) that the DT request cannot be delivered due to congestion control. The serving network node may further attach to thi information the back-off timer. The MTC-IWF compares (cf. step (4)) the received back-off time with the validity time of the DT message. In particular, if the (remaining) back-off time (SM-BO or MM-BO) is longer than the validity of the DT message, the MTC-IWF informs the MTC server that the DT request is undeliverable. The MTC-IWF may also attach the MM-BO and/or the SM-BO and send it to the MTC server in order to avoid the MTC server retransmitting the DT request immediately (cf. step (5.1)).

If, on the other hand, the (remaining) back-off time (SM-BO or MM-BO) is shorter than the validity of the MT-SMS message, the MTC-IWF transmits the DT request to the SM-SC over T4 interface. The SM-SC stores the DT request. The SM-SC transmits the DT request to the terminal after expiry of the back-off time. The back-off timer may be signalled to the SM-SC from the MTC-IWF or the SM-SC may be instructed from the MTC-IWF in another way to retransmit the DT request after the expiry of the timer.

Further processing option in the SGSN/MME for determining the target APN are explained below.

It is important to note that the examples shown in FIG. 4, 12 and FIG. 13 are applicable when the SGSN/MME applies both MM and SM congestion control. The MM CC can be also of both types, general MM and APN-based CC.

According to an embodiment, a method is provided, for being performed at a control server in a communication network including also a serving network node, over which a triggering server transmits a trigger request to a terminal. The method comprises a step of receiving from the triggering server a device triggering request for triggering of the terminal; encapsulating the trigger request into a device triggering message; transmitting the device triggering message to the serving network node; receiving from the serving network node information that the device triggering message cannot be delivered and a back-off timer; evaluating whether the back-off time is longer than the validity of the device triggering message; when the back-off timer is longer, transmitting to the triggering server an indication that the device trigger request cannot be delivered and possibly the back-off timer for suppressing immediate retransmissions of the device trigger request. Here, the control server may be a message server, i.e. a communication network entity which prepares the message in which the DT request is encapsulated and provided to the terminal. This entity may be, for instance, the SM-SC. However, as described above, the control server may also be a DT-control-server such as MTC-IWF, a communication network entity, which provides an interface between the server generating the device trigger message and the triggering server particularly for the DT functionality.

The triggering server is the server which originates the device trigger request. This may be the MTC server, which may be located outside the communication network. The device trigger message may be an SMS.

Advantageously, when the back-off timer is shorter, the message server may further perform, upon or after expiry of the back-off timer, the step of transmitting the device trigger message to the serving network node (over the serving network node to the terminal).

Alternatively, when the back-off timer is shorter than the device trigger request validity time, the DT-control-server may further perform upon or after expiry of the back-off timer, the step of transmitting the device trigger request to the message servers for storing and transmitting to the serving network node when the congestion terminates and/or when the back-off timer expires. Further alternative is that the DT-control-server may immediately transmit the device trigger request including the back-off timer to the message servers for storing and transmitting to the serving network node, whereas the message server stores the device trigger request after or upon expiry of the back-off timer. Please note that the back-off timer has the meaning of a time during which the triggering server or message server should suppress the (re-)transmission of the device trigger request.

The above three embodiments have in common that a communication network entity, in the communication network over which a triggering server transmits a trigger request to a terminal, obtains from a serving network node in the communication network an indication that the trigger request cannot be delivered to the terminal due to congestion. Then the network entity waits until the congestion terminates and, after terminating, transmits the device trigger request to the terminal. The congestion termination may be determined either by obtaining information from the serving network node, or by evaluating the back-off time received from the serving network node with the device trigger request validity time.

In order to avoid the above shortcomings, in this embodiment the serving core network node (e.g. SGSN/MME) delivers the Device Trigger request to the UE, even if the serving CN node can detect that a SM CC is running for the target APN. The delivery of the Device Trigger request to the UE avoids
  unnecessary storing of Device Trigger in the network and unnecessary delaying the UE in case the UE should start a measurement or another
UE-internal data gathering/collecting procedure. Accordingly, independently of whether the serving CN node can determine the target APN and independently of whether the serving CN node can determine whether the APN-based SM CC is applied, the serving CN node always transmits the Device trigger request to the UE.

Figure 5:
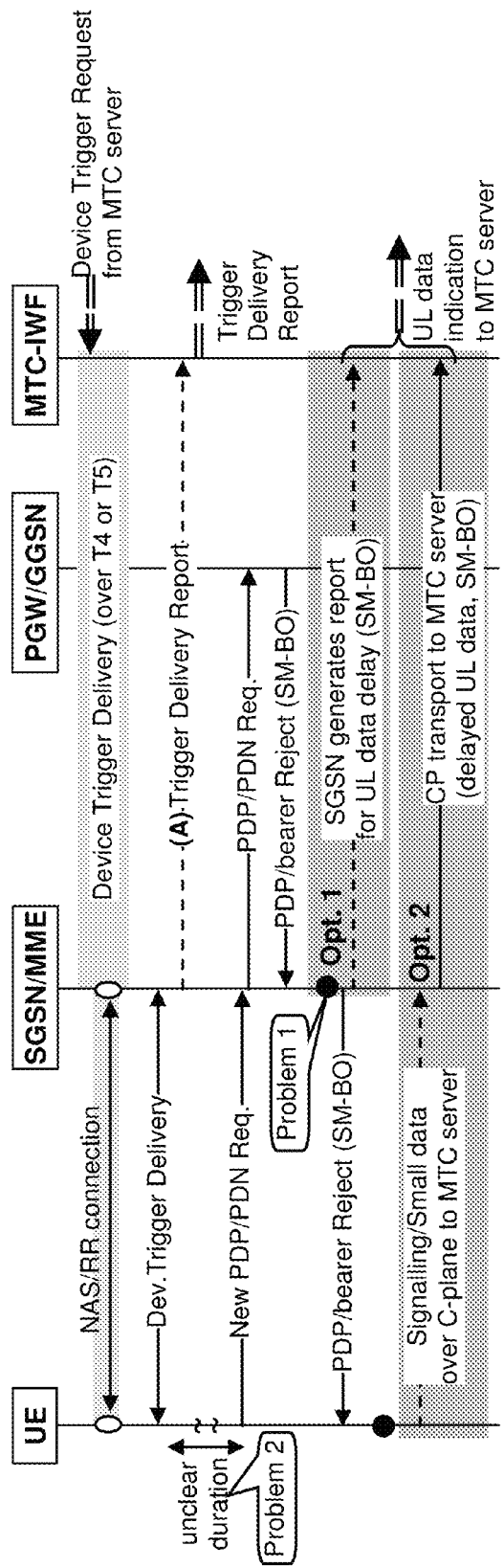
FIG. 5 is a message flow diagram illustrating an example of possible options and problems for the case when no back-off timer is running at the terminal when receiving the trigger request.

The delivery of the Device Trigger request to the UE during the SM CC in accordance with this embodiment may result in two distinct procedures:
  the Trigger Delivery report for reporting the result of the Device Triggering to the MTC server (cf. "Trigger Delivery Report" in FIG. 5, already envisaged by the 3GPP) and
  the UL data indication (called also delivery delay indication in this document) for reporting the possible impact of the SM CC to the sending of the UL data to the MTC server as provided by the present invention (cf. "Opt. 1" and "Opt. 2" in FIG. 5).

Both procedures may be performed independently of each other, for instance such that the UL data indication procedure may be performed later, or they may be performed in parallel. If both procedures are performed in parallel, they can still be independent, for instance distinct messages may be sent from the UE/network node to the MTC server. Alternatively, the two procedures may be merged in a single procedure, for instance by providing a single message carrying the information (data) related to both procedures. The different possibilities of providing the UL data indication and/or he Trigger Delivery Report are shown in various embodiments illustrated in FIGS. 5 to 9, which will be described in detail in the following.

FIG. 5 illustrates the signaling flow for the case in which the Device Trigger request is always sent to the UE and in which a procedure to indicate the result of the UL data delivery to the MTC server. In particular, FIG. 5 shows that the MTC server generates a trigger request and transmits it to the terminal. The transmission may be performed over T4 or T5 interface as described in the Background section. This corresponds to the "Device Trigger Delivery (over T4 or T5)" and "NAS/RR connection". Furthermore, FIG. 5 shows that after receiving the Device Trigger request, the UE may need some time (cf. "unclear duration" in FIG. 5), for instance to perform measurements, before generating and reporting the UL data to the MTC server. The duration of the time needed in the UE to generate the UL data (e.g. the duration of the measurements) is, in general, unknown to the network. The SGSN/MME usually in step (A) generates and transmits the "Trigger Delivery Report" to the MTC-IWF and further to the MTC server. The Trigger Delivery Report would indicate "success", as the Device Trigger was indeed delivered successfully to the terminal. As a result, the MTC server would expect that the UE initiates a communication, for instance, to report the UL data.

FIG. 5 shows two possible options to inform the MTC server about the UL data delivery/delay indication. Both options are shown in grey-shaded boxes. In the first option (cf. "Opt. 1"), the SGSN/MME, i.e. a network node, generates and sends the indication ("UL data indication" message) to the MTC server.

In the second option (cf. "Opt. 2"), the UE generates and sends the indication to the MTC server. As can be seen in FIG. 5, before sending the indication to the MTC server the UE has received the reject message containing the SM-BO timer ("PDP/bearer Reject (SM-BO)").

The first option provides advantages of providing an efficient mechanism for avoiding increased signaling amount in case of network congestion. However, this first option may still be connected with the following difficulties.

The speech bubble showing "Problem 1" in FIG. 5 shows that the SGSN/MME may not be able to generate the indication for the "UL data delivery". This may not be possible since the SGSN/MME does not necessarily know the MTC server address and/or since the SGSN/MME, after sending the Trigger Delivery report, does not store information about the interactions of the Device Trigger protocol. The latter is based on a current assumption in 3GPP that the Device Trigger mechanism is stateless, i.e. the network nodes along the path for Device Trigger request delivery does not store states about the Delivery Trigger, especially if the Device Trigger is delivered successfully (which is the case in the assumed scenario). The meaning of "state" is a set of stored parameters like 'UE ID' (to which the message was delivered), 'time stamp' of delivery, 'destination ID' or 'source ID' of the message, 'used interface' (T4 or T5, alternatively if SMS infrastructure or T5 was used), etc. It is noted that the problems discussed here are illustrates by means of the current 3GPP assumptions. However, the present invention is not limited thereto and thus, in some scenarios and networks the first option may provide a very efficient means for reducing the signaling load in case of congestion.

The speech bubble showing "Problem 2" in FIG. 5 shows that the SGSN/MME can delay the Trigger Delivery report (A) to the MTC server in order to receive a feedback from the UE in order to be able to include the UL data delay indication. However, it is unclear how long the delay may be, as it is unclear when the UE initiates the PDP/PDN request procedure, i.e. when the data to be transmitted are ready.

As a result, the MTC server may still retransmit the Device Trigger request if the MTC server does not receive the Trigger Delivery report on time. Furthermore, the undetermined waiting in the SGSN/MME for "New PDP/PDN Request" may be disadvantageous as a protocol design.

To solve Problem 1, in accordance with an embodiment of the present invention, the serving CN node (SGSN/MME) stores a "state" about the successfully delivered Device Trigger request for some (predefined or predetermined) time. This state can be referred to as 'Device Trigger context' and can be stored as an additional element/part of the UE's NAS context. For example, the Device Trigger context can be stored as part of the UE's MM context. Alternatively the Device Trigger context can be stored in the corresponding UE's SM context in case that the SGSN/MME can resolve the target APN and the SGSN/MME has a context for this APN. The stored parameters related to the Device Trigger context could be, for instance, a UE ID and/or a source node ID of the source node that generated the message (e.g. the MTC-IWF ID), and/or a priority of the Device Trigger request. The duration for storing could be either implementation specific, or could be equal to the Device Trigger Validity time, or it may be dynamic until the UE initiates an MM/SM procedure as a response to the Device Triggering request. Later, as shown in Option 1 in FIG. 5, if the SGSN/MME generates an "UL data indication", the SGSN/MME shall include the UE ID and the destination node ID (e.g. MTC-IWF if triggering over T5 interface was used, or SM-SC ID if triggering over T4 or Tsms was used) in the signaling message. This is illustrated in FIG. 5 in Opt. 1 as "SGSN generates report for UL data delay (SM-BO)".

Summarizing, the network node may further include a step of storing a state of a trigger request including at least the terminal ID and/or the ID of the device which sent the triggering request message and/or other transaction ID, and generating and transmitting a delivery delay message wherein the message includes the terminal ID and/or the ID of the device which sent the triggering request message.

In the case of Device Triggering over the T5 interface, the SGSN/MME generates an "UL data indication" message to the MTC-IWF. The MTC-IWF determines based on the UE ID (usually the UE Internal ID) the UE External ID and the MTC server, to which the "UL data indication" message should be sent. The MTC-IWF may also re-format the "UL data indication" message before forwarding the message to the MTC server in order to adapt the message to the protocol structure used over the Tsp interface. For this option, the protocols over T5 and Tsp should be extended to be able to carry the "UL data indication" indication within a message. This may be an existing message, or a new message may be defined in the respective protocols.

In case of Device Triggering over T4 or Tsms interfaces, the SGSN/MME has received the Device Trigger request in form of an MT-SMS from the SM-SC. In this case, the SGSN/MME has stored the ID of the SM-SC in the stored Device Trigger status/context. Accordingly, when the SGSN/MME generates the "UL data indication" message, the SGSN/MME sends the message to the SM-SC. The format of the "UL data indication" message generated from the SGSN/MME is advantageously compatible with the MO-SMS format. The SM-SC is then preferably able to receive and forward the "UL data indication" message to the correct MTC-IWF (if T4 was used for Device Triggering) or to the correct MTC server (if Tsms was used for Device Triggering).

From the above solution it follows that the SGSN/MME would always generate and send an "UL data indication" to the MTC server (via MTC-IWF or SM-SC) when the SM request from the UE is rejected. Two issues are further considered for this solution:

The first issue is that the SM request from the UE (cf. "PDP/PDN Req." in FIG. 5) does not necessarily have to be related to the Device Triggering procedure. For example, another application in the UE may initiate a communication while the triggered MTC application is still gathering/measuring data. In this case, the SGSN/MME may falsely report non-delivery of the UL data in the "UL data indication". To avoid this situation, the SGSN/MME should verify that the rejected SM request from the UE is initiated due to the Device Triggering. To perform this, the SGSN/MME may additionally store the target APN in the "Device Trigger context" and compare it with the APN, to which the UE sends the SM request. Only if the APN matches, the SGSN/MME should generate and send the "UL data indication" to the MTC server.

Another issue can be that after the UE receives the SM reject message from the network, the UE may decide to deliver the UL data via an existing connection. For instance, in case of E-UTRAN, when the UE is attached to an MME, if the UE's SM requests PDP/PDN connection modification while the actual connection already existed. Alternatively, the UE may decide to send the UL data over the C-plane signaling (e.g. as a Small Data message, as will be described below). In such situation, the SGSN/MME would report non-delivery of the UL data to the MTC server, but the UE would still deliver the UL data to the MTC server via alternative means. In order to avoid this situation, the SGSN/MME may indicate to the UE that a non-delivery UL data indication was sent to the MTC server, so that the UE does not send the UL data. However, this may not be optimal, as the UE in this case is able to send the UL data via alternative means. Thus, an alternative solution is that the UL data indication from the SGSN/MME comprises a conditional flag/indication to the MTC server, for indicating that the UE may deliver the UL data via alternative ways but not via the expected "first choice" way. For example, if the MTC server expected to receive the UL as IP packets, but the UE would send the UL data formatted as an SMS. Of course, the MTC server would be configured correspondingly to be able to parse and utilize the UL data in both delivery ways.

In accordance with another embodiment of the present invention, in order to solve both problems described with reference to FIG. 5, extended functions may be implemented where if the serving CN node can detect that APN-based SM CC is applied to any APN (i.e. independently from the fact whether the SM CC is applied to the target APN or to any other APN), the serving CN node can include an additional indication to the UE to initiate an immediate SM procedure for activating the U-plane connection. The indication from the SGSN/MME to the UE can be e.g. the "Trigger Request Validity time" (usually a parameter transported from the MTC server to the 3GPP CN, but not used for a UE). Optionally, other indications from the SGSN/MME to the UE are possible, e.g. during the Device Trigger Delivery procedure, a special flag can be used in the NAS message carrying the Device Trigger. This additional indication is shown in bold letters ("indic. SM CC") in the step for Trigger Delivery procedure in FIG. 6 ("Dev. Trigger Delivery"). Having this solution, the SGSN/MME does not need to store the Device Trigger context as performed in the previously described embodiment in Option 1 of FIG. 5. However, for the solution described here with reference FIG. 5, extensions to the NAS protocol are needed as well as changes to the UE and the SGSN/MME in order to implement the special indication to the UE.

Summarizing, the method to be performed at the network node may further include a step of transmitting from the network node to the terminal a congestion indicator including at least one of: a command for the terminal to immediately set-up a user plane connection to the network, and/or a device trigger validity time for indicating how long the network tries to deliver same device trigger request to the terminal. Correspondingly, the method to be performed at the terminal may further include a step of receiving from the network node at the terminal such congestion indicator. Similarly, the transmitting unit of the network node according to an embodiment of the present invention may be configured to transmit the congestion indicator to the terminal, while receiving unit of the terminal may be configured to receive the congestion indicator. Moreover, the terminal may be further adapted to initiate immediately communication with the network including connection establishment (cf. "New PDP/PDN Req." in FIG. 6) as soon as the congestion indicator (cf. "indic. SM CC") is received from the network node.

It is noted the congestion indicator to the terminal, shall trigger the UE to initiated the connection establishment to the same APN (target APN or external network) to which the UL data corresponding to the Device Triggering would be sent. This is needed in order to verify whether the target APN is congested. Therefore, the UE internal processing shall provide a functionality to relate the congestion indicator from the SGSN/MME to the Device Trigger information received from the MTC server. Especially in case of multiple application running in the UE, it shall be provided that the SM request sent from the UE shall correspond the SM request that results from the UE's application to which the Device Trigger is received.

The UE may perform the SM procedure even in case that the UL data will be available later. The additional indication for immediate SM procedure initiation is beneficial in order to determine whether the APN-based SM CC will be activated for this particular UE. In the case in which the SM CC is activated, the "PDP/bearer Reject (SM-BO)" message is transmitted to the UE from the SGSN/MME as shown in FIG. 6.

It is noted that if the serving CN node cannot detect that APN-based SM CC is applied (e.g. because the serving CN node does not store the SM-BO timer for any particular APN), the serving CN node does not include the indication to the UE to initiate an immediate SM procedure and the signaling flow of FIG. 5 may be applied.

This embodiment assumes that there is no SM-BO timer running in the UE at the time of receiving the congestion indicator, so that the UE initiates the PDP/PDN connection establishment request. If the network rejects the request from the UE with a SM-BO timer as illustrated in FIG. 6, the UE may store the SM-BO timer and apply the usual procedures for APN-based SM CC as specified in 3GPP TS 23.401.

Figure 6:
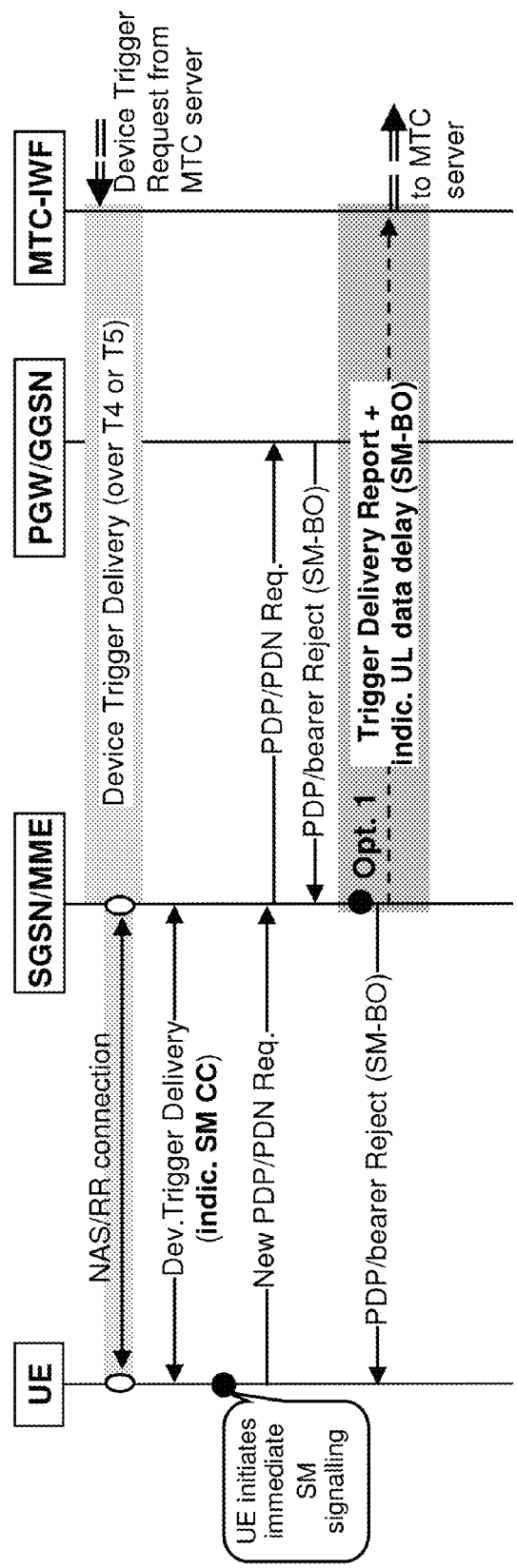
FIG. 6 is a message flow diagram illustrating an example of delivery delay indication initiated by the network when no back-off timer is running at the terminal when receiving the trigger request.
Figure 7:
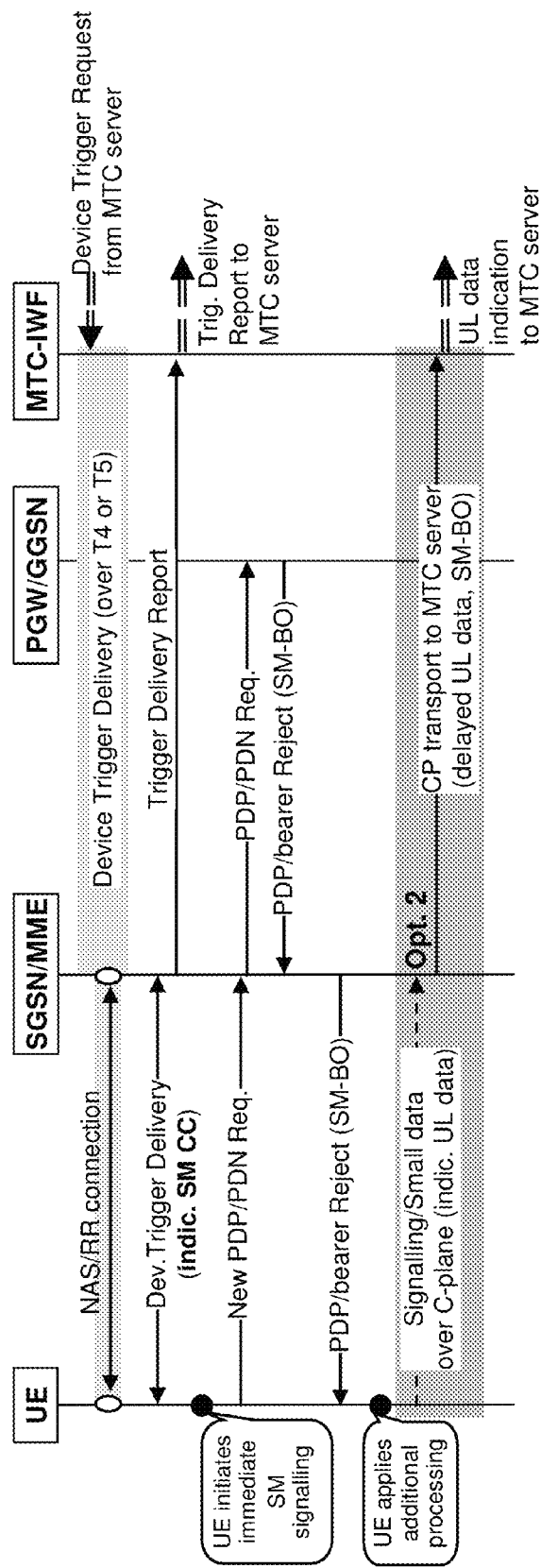
FIG. 7 is a message flow diagram illustrating an example of delivery delay indication initiated by the terminal when no back-off timer is running at the terminal when receiving the trigger request.

There are two options depending of which entity generates the "UL data delivery indication" to the MTC server as shown in FIG. 6 and FIG. 7.

Option 1 is shown in FIG. 6. Accordingly, the SGSN/MME (in general, a network node) generates the indication to the MTC server. In this case, the SGSN/MME can know that the SM CC would be applied to the UE's SM request and that consequently, the UL data may remain unsent. If the SM-BO timer is signaled in the rejecting message, the SGSN/MME can also use the SM-BO timer value as indication of the delay for the corresponding UL data. Thus, the SGSN/MME can indicate the "UL data non-delivery" and optionally the possible (estimated) delay to the MTC server. However, the SGSN/MME cannot determine whether the UL data will be valid or not since the SGSN/MME has no information about availability of the data at the UE and/or of the trigger data validity time. In this embodiment, the SGSN/MME sends the "Trigger Delivery report" and the "UL data indication" together in one step ("Trigger Delivery Report+indic. UL data delay (SM-BO)" in FIG. 6). The SGSN/MME waits for the "New PDP/PDN Req.", i.e. the request for the PDP/PDN connection which may be, for instance, PDP context request or PDN connectivity request, from UE. The SGSN/MME may forward this request to the U-plane entities in the CN in order to establish or modify the PDP/PDN connection. Depending on whether a request for PDP/PDN connection establishment/modification is rejected, the SGSN/MME can verify whether APN-based SM CC is applicable to the particular UE as a result of the Device Trigger procedure. A similar problem as described with reference to Option 1 in FIG. 5 may occur here as well, i.e. the SGSN/MME may falsely determine SM CC congestion as active and send a "non-delivery UL data indication" to the MTC server if the SM request from the UE is not related to the target APN from the Device Triggering request. This may be avoided with the solution already described above, namely, in that the SGNS/MME compares the APN to which the SM request from the UE is sent with the target APN of the Device Triggering request.

According to still another option (embodiment), the serving CN node (SGSN/MME) sends the "UL data delivery" indication to the MTC-IWF. This is especially beneficial when the T5 interface is used for Device Triggering. The MTC-IWF shall be able to receive and store the "UL data delivery" indication. The MTC-IWF may decide to either store the indication (i.e. not forwarding to the MTC server) or to forward the indication to the MTC server after re-formatting it, or to perform both (i.e. storing and forwarding). If the MTC-IWF decides to store the indication, the MTC-IWF can reject a consecutive Device Trigger request to the UE (or to other UEs with the same target APN) instead of forwarding it to the UE via the network. In this case the Device Triggering would be a stateful protocol as the MTC-IWF stores a state for the particular Device Triggering. If the MTC-IWF decides to forward the indication (the MTC-IWF may of course in parallel store the indication) the MTC-IWF generates the corresponding message over the Tsp interface tot eh MTC server.

Option 2 is shown in detail in FIG. 7. Accordingly, the UE generates the indication to the MTC server. As mentioned above on Option 1 in FIG. 6, the SGSN/MME can report only the UL data delay to the MTC server. However, the SGSN/MME cannot determine the validity of the uplink data to be sent ("UL data delivery/validity"). As it is shown in FIG. 7, on the UE side after receiving the PDP/bearer Reject (SM-BO) message, additional processing is applied in accordance with another embodiment of the invention to determine the UL data delivery/validity based on the SM-BO timer. This shall be described below in more detail. The determining of the "UL data delivery/delay" can be reliably performed only in the UE because only the UE knows the time for measurement needed before UL data report is sent to the MTC server. This is the advantage of Option 2 compared to Option 1. In accordance with the embodiment of FIG. 7, the UE sends to the MTC server the "UL data delivery/delay" indication ("Signalling/Small data over C-plane (indic. UL data)") that may contain the SM-BO timer as a message that is carried over the C-plane (e.g. Small Data message, or Mobile Originated SMS, MO-SMS).

In summary, the step of transmission of the delivery delay indicator may be performed over the control plane to the network node, from which it may be further transporter also in a control plane.

The UE is preferably configurable to inform the network about its capabilities to generate and send to the MTC server the "UL data delivery/delay" indication, so that the SGSN may send the Trigger Delivery report to the MTC server without reporting the "UL data delay" indication. Furthermore, if the SGSN/MME knows that the "UL data delivery/delay" indication will be sent from the UE, the MME can send the Trigger Delivery report to the MTC server earlier, immediately after the Device Trigger Delivery procedure. This is also shown in FIG. 7. In particular, the "Trigger Delivery Report" is sent by the SGSN/MME after the trigger delivery to the UE and before the connection establishment ("New PDP/PDN Req.") and the data delivery delay indicator transmission from the UE to the MTC server.

The use of Option 1 or Option 2 may be negotiated between the UE and the SGSN/MME. This negotiation may be advantageous in order to ensure the consistence in the procedures. For example, during the Attach or Tracking Area Update (TAU) procedure, the UE and the network can negotiate the supported and the preferred options. However, it is noted that the present invention does not require supporting (providing) both options. An MTC system may be configured to only support one of the options fixedly without providing the alternative. The negotiation of the capabilities to support different options to inform the MTC server about the delay delivery indication may be applicable for all embodiments of the present invention, i.e. not only to the embodiment described with reference to FIG. 7.

In summary, the network node and/or the terminal may further perform the step of generating a message including an indicator for indicating whether the terminal or the network node shall provide the server with the delay delivery indication. The terminal and/or the network, respectively, may further perform the step of generating a message including a positive and/or negative confirmation for the indication whether the terminal or the network node shall provide the server with the delay delivery indication.

In the following, another embodiment of the present invention is described, supporting a UE-based resolution of APN-based SM CC after transmission of Device Trigger to UE assuming that the SM-BO timer is running in the UE when receiving the Device Trigger.

In contrast to the embodiments described above with reference to FIGS. 5 to 7, in this embodiment the SM-BO timer is running in the UE when the Device Trigger request is received. Accordingly, the UE is aware about the applied APN-based SM CC. It is noted that this embodiment is combinable with any previous embodiments.

In this embodiment, it is further assumed that the SGSN/MME does not know about the SM-BO timer in the UE. The SGSN may know about the applied SM CC, but the SGSN/MME does not necessarily store the SM-BO timer per UE and per APN as described in 3GPP TS 32.401, Section 4.3.7.4.2.2 (in case of EPS and MME). If the SGSN/MME stored the SM-BO timer, the mechanism/solution described above with reference to FIG. 4 or Option 1 described with reference to FIG. 6 could be applied.

In this embodiment, if the SGSN/MME knows about an applied SM CC in general, the SGSN/MME may inform the UE during the Device Trigger delivery about the Device Trigger Validity time. The parameter "Device Trigger Validity time" has already been briefly described above. The Device Trigger Validity time is currently (i.e. in the current 3GPP concept) used by the network to determine how long the network should try to deliver the Device Trigger request to the UE, or if the first delivery attempt was not successful (e.g. due to unreachable UE), how long does the network store the Device Trigger.

In this embodiment, the Device Trigger Validity time is provided to the UE. The advantage of informing the UE about the Device Trigger Validity time is that the UE can use this parameter as an indication for determining how time-tolerant the delivery of the UL data to the MTC server would be. In particular, the UE may use the Device Trigger Validity time to determine how long could be the delay of the UL data to the MTC server so that it is still valid as a response to the particular trigger request transmitted by the MTC server and received by the UE.

Summarizing, a validity time indication may be transmitted from the network node to the terminal. The validity time may indicate the time period during which the currently transmitted device trigger request is valid. This may correspond to the time during which the network tries to deliver the current device trigger request and/or to the time the network stores the device trigger request if not possible to deliver it during the first delivery attempt.

The above assumption may be slightly inaccurate, as the UL data may be valid shorter than the Device Trigger Validity time. For instance, after the UE receives the Device Triggering, the UL data should be delivered immediately. However, the Device Trigger itself can be delay tolerant. Therefore, after receiving the UL data (delivery/delay) indication, the MTC server may decide the next action, such as to retransmit the Device Trigger request message after the SM-BO time expires or to send a new Device Trigger request message immediately etc. The MTC server may also decide to take an action different from an action that would reflect the value of the indication sent by the UE or SGSN/MME. For example, the UL data indication from the UE or SGSN/MME may inform the MTC server that the UL data will be delivered/valid and sent with the delay SM-BO timer. However, the MTC server may still decide to re-send the Device Trigger request immediately (e.g. including an indication to a different APN, but, in general, also to the same APN). Therefore, the Device Trigger Validity time is used just as an indication in the UE in case that the "time for measurements" parameter is not available.

Figure 8:
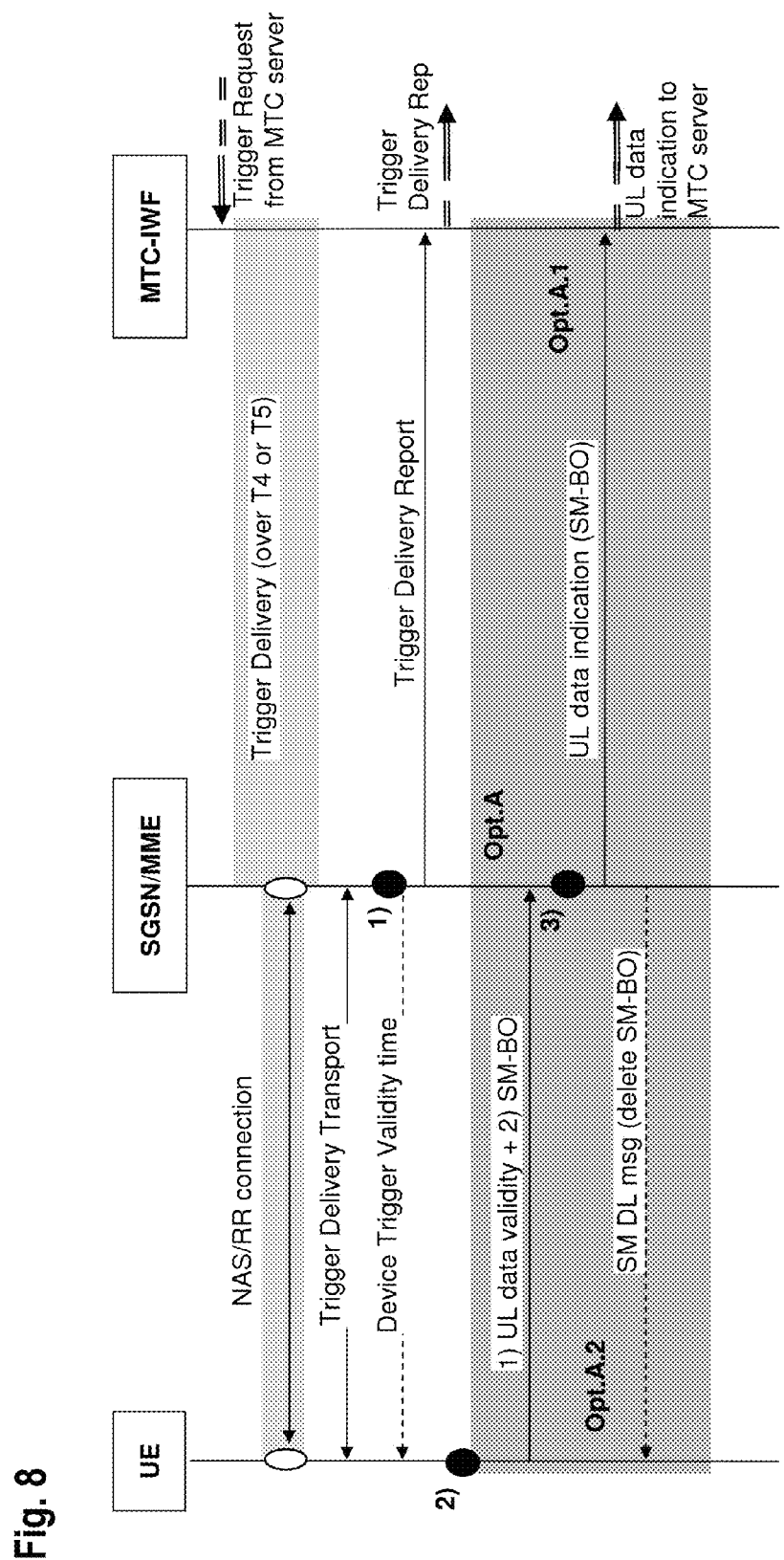
FIG. 8 is a message flow diagram illustrating an example of delivery delay indication initiated by the terminal, sent to a network node and then to a server when a back-off timer is running at the terminal.

FIG. 8 shows an exemplary signaling flow for this embodiment. Point "1)" shows that during or shortly after the Device Trigger delivery procedure, the SGSN/MME indicates the Device Trigger Validity time to the UE ("Device Trigger Validity time"). The paragraph above describes that the SGSN/MME may take into account the presence of the SM CC when deciding whether to indicate the Device Trigger Validity time to the UE. It is assumed that the SGSN/MME is informed by other network entities (such as MTC-IWF or SMS-SC) about the Device Trigger Validity time. Accordingly, the SGSN/MME may indicate the Device Trigger Validity time to the UE in different ways:

transmitting the parameter as a separate downlink NAS message, or including the parameter as a separate Information Element in the NAS message carrying the Device Trigger request message, or including the parameter in the "opaque data" of the Device Trigger request.

The first two alternatives can be performed by the SGSN/MME as the downlink NAS message or Information Element in the NAS message is generated in the SGSN/MME itself. The last alternative may be performed by the SGSN/MME if there is additional functionality in the SGSN/MME to parse and process the opaque portion of the device trigger request. Therefore, the last alternative of including the Device Trigger Validity time in the "opaque data" of Device Trigger request may be performed by different entities, for instance:

SGSN/MME: this entity may only be involved in case that the SGSN/MME is allowed to modify or reformat the "opaque data". This is an unusual and possibly an undesired approach as the "opaque data" should be transparent to the network. However, it still may be employed and would work. or MTC-IWF: the MTC-IWF after receiving the Device Trigger request from the MTC server may modify the "opaque data", which is again depending of the capability of the MTC-IWF to parse the "opaque data"; or MTC server: as the MTC server generates the "opaque data" in the Device Trigger request, it is the entity which may without problems implement the signaling. However, the name and meaning of the indication if included in the "opaque data" in the Device Trigger request should be different from the "Device Trigger Validity time". One possible option is to indicate the "UL data validity time". Another option is to indicate the "Device Trigger validity in the UE" if the UL data cannot be sent immediately. The uplink data validity time may indicate the time during which the data received by the MTC server from the UE are considered as a valid response to the trigger request.

After the successful Device Trigger delivery to the UE, the SGSN/MME may send a Trigger Delivery report to the MTC-IWF and further to the MTC server.

The point "2)" of FIG. 8 shows that an internal processing is performed in the UE at this point. After receiving the Device Triggering request, this processing determines the APN to which the UL data would be send (independently of whether the data would be sent immediately or after some "measurement" time) and if the APN is under Congestion Control, i.e. whether an SM-BO timer for that APN is running. If this is the case, the UE further performs an internal processing to determine (estimate) the validity of the UL data. In the following, it is assumed that the SM-BO timer is running at the UE.

After determining the UL data delivery/validity during the UE internal processing 2), the UE may decide to perform one of the options A ("Opt. A") or B ("Opt. B") as shown in FIGS. 8 and 9, respectively. The decision which option to perform can be based on the configuration in the UE and/or network and can be negotiated during the Attach or TAU procedure. However, one of the options may be predefined in the communication system and the other need not necessarily be supported.

If the UE decides to perform Option A shown in FIG. 8, the UE sends the determined UL data delivery/validity indication 1) and/or the remaining SM-BO timer value 2) to the SGSN/MME ("1) UL data validity+2) SM-BO"). Point "3)" shows that the SGSN/MME may perform its own internal processing when receiving the indication from the UE. The internal processing may include that the SGSN/MME decides based on the congestion situation and/or the priority of the Device Trigger request, whether to forward/send the UL data delivery/validity indication to the MTC server or whether to initiate a procedure to delete the SM-BO timer in the UE. For example, if the congestion situation has been relaxed, or the Device Trigger request has a higher priority, the SGSN/MME may decide to perform alternative A.2, i.e. the SGNS/MME sends a Session Management Downlink message (indicated by "SM DL msg") to the UE with the instruction to delete the SM-BO.

For example, in the context of a 3GPP system, such a message could be ACTIVATE DEFAULT EPS BEARER CONTEXT REQUEST or ACTIVATE DEDICATED EPS BEARER CONTEXT REQUEST or MODIFY EPS BEARER CONTEXT REQUEST message.

After receiving the "SM DL msg" the UE preferably deletes/stops the SM-BO timer. Afterwards, the UE can continue with performing the SM procedure (including transmission of the "PDP/PDN Req." as illustrated in FIGS. 5 to 7).

In alternative A.2, the SGSN/MME decides to forward the UL data delivery/validity indication and/or the SM-BO timer to the MTC server.

In summary, in accordance with this embodiment, the terminal may transmit to the network node an uplink data validity indicator, which may but does not necessarily include the SM-Bo timer, and which indicates whether the data to be transmitted in response to the trigger request would be valid or not. The network node may forward the uplink data validity indicator further to the server. In the case in which the congestion terminates, the network node may generate upon termination of the congestion a message including an indicator for instructing the terminal to delete its running back-off timer. Accordingly, the terminal may be capable of receiving and parsing the message to obtain the uplink data validity indicator for instructing the terminal to delete its running back-off timer. Accordingly, the terminal may delete the running back-off timer.

In order to support the above described functionality, the network node may include a determining means for determining whether there is a congestion in the network over which the terminal communicates with the server. The network's transmission unit may further include means for generating the message and transmitting it to the terminal. The terminal may include a receiving section capable of receiving the message and a back-off timer control unit for deleting the back-off timer, i.e., for terminating the timer function.

If the UE decides to perform Option B or the option B is defined as supported by the UE, the UE generates a signaling that is sent to the MTC server directly or via an intermediate entity. This signaling can be performed, for instance, in the form of:
- small data as described in 3GPP TS22.368 or 23.888, or
- direct user plane transmission to the MTC server, or
- control plane transmission to a network entity which is able to forward the indication further to the MTC server, or
- Mobile Originated SMS (MO-SMS).

The UE may prepare the signaling to the MTC server to be carried over the control plane (C-plane) in the network, as a new U-plane connection cannot be used. However, an option would be to send the UL data delivery/validity (SM-BO timer) indication over an existing U-plane connection/bearer.

It should be noted that the points 1), 2) and 3) in FIG. 8 show new functions or new internal processing in the UE and SGSN/MME corresponding to the present embodiment.

The internal processing which may be performed under point 2) in the UE in order to determine the UL data delivery/validity indication is described in the following in more detail.

One possible solution is based on an application specific mechanism. Accordingly, an application in the UE decides how long the UL data would be valid (i.e., how long the UP data can be used or utilized) in the MTC server. This solution is not standardization (i.e. 3GPP) relevant and is dependent on the MTC implementation in the UE and, possibly, in the MTC server.

Another possible solution is based on processing in the UE considering the parameters from the communication layers, i.e. related to the standardization. Those parameters may include:
- time for measurements before UL data reporting or
- Validity time of the Device Trigger Request (Device Trigger Validity time).

The Device Trigger Validity time delivery from the network to the UE was described above. The "time for measurements" before the UL data reporting is a parameter that can be either stored in the UE or included in the "opaque data" (i.e. the information destined fro the MTC server to the MTC device (terminal) in the Device Trigger request).

The following exemplary logic may applied in the UE in order to determine the UL data validity:

```
If "time for measurements" is available,
    then [UL data validity = "time for measurements"],
    else [UL data validity = "Device Trigger validity time"]
If UL data validity > SM-BO timer,
    then the UL data will NOT be outdated => UE may/need not
    indicate anything
    elseif UL data validity < SM-BO timer,
    Then the UL data will be outdated => UE shall indicate this to
    the SGSN or to the MTC server.
```

Summarizing, the terminal may further perform a step of determining, after the trigger request has been received, a data validity time as either a time period necessary for gathering the data to be transmitted over the network to the server or as a device trigger validity time indicating how long the network tries to deliver same device trigger request to the terminal. The time period necessary for gathering the data may be a time period necessary to perform measurements and/or to process them for being reported to the server. In case a back-off timer is running at the terminal and the data validity time is smaller than the remaining back-off time, the terminal may indicate to the server the delivery delay indicator indicating that the data will be outdated and/or that no data shall be sent in response to the trigger request. In general, the transmission of the validity indication to the server, it may be transmitted directly to the server, i.e. transparently to the entire network(s) between the terminal and the server. Alternatively, the validity indication may be sent over network entities such as a network node (a network node serving the terminal in the network over which the terminal is connected to the server).

An evaluation step may be performed either at the terminal or at a network node and may include evaluating of the back-off timer running at the terminal side and/or evaluating validity period of the data to be transmitted by the terminal in order to determine whether the data shall be transmitted from the terminal to the server and/or to determine delay of the transmission of the data from the terminal to the server. The validity indication may then be transmitted by the terminal or the network node according to the result of the evaluation step.

If the UE determines that the UL data will NOT be outdated, the UE may but need not send the UL data delivery/validity indication to the SGSN/MME (Option A) or directly to the MTC server (Option B). However, if the UE determines that the UL data will be outdated, the UE should send the UL data delivery/validity to the SGSN/MME (Option A) or to the MTC server (Option B).

Once the UE has determined that the UL data delivery/validity (SM-BO timer) indication shall be sent to the SGSN/MME (i.e. Option A in FIG. 8), the UE can use one of the following signaling options depending on the Device Trigger delivery mechanisms.

If an MT-SMS is used for Device Trigger delivery, the UE may use extended SM-CP/SM-RP protocols (Short Message Control Protocol/Short Message Relay Protocol) signaling. From the standardization point of view, this mechanism has drawbacks as rather large implementation changes in the UE and SGSN/MME may be needed. Therefore, another option would be to send the UL data delivery/validity (and possibly the SM-BO timer) indication to the SGSN over the NAS signaling, e.g. in a predetermined NAS information message, as a new Information Element. For example, the ESM information request procedure can be used, which is initiated by the network during the Device Trigger delivery procedure, so that the UE can indicate in the INFORMA- TION RESPONSE message to the SGSN/MME about the UL data delivery/validity (SM-BO timer).

If general, the NAS is used for Device Trigger delivery: a special indication in the NAS signaling to SGSN can be used. One example is already shown above, in which the ESM information request procedure is used.

If U-plane is used for Device Trigger delivery, as the U-plane connection/bearer is already setup for the Device Trigger delivery, the same connection can be used to send the UL data. However, if the UL data should be sent over another PDP/PDN connection or over a new dedicated bearer, which is not possible due to the applied SM CC, the UL data delivery/validity (SM-BO timer) indication can be sent over the existing U-plane connection/bearer. This is rather applicable to Option B (cf. FIG. 9) where the UE sends the UL data delivery/validity (SM-BO timer) indication directly to the MTC server. Another alternative could be to send it over the NAS signaling as described above.

The UE can also generate and sent the UL data delivery/validity (and/or the SM-BO timer) indication independent on the Device Trigger delivery mechanism. The UE can implement a pre-defined mechanism for formatting and transmitting the UL data delivery/validity (SM-BO timer) indication. For example there could be a mechanism where the UE is pre-configured with a default MTC-IWF. The UE can send the UL data delivery/validity (SM-BO timer) indication to the MTC-IWF and the MTC-IWF re-formats and forwards the UL data delivery/validity (SM-BO timer) indication to the MTC server over the pre-defined Tsp protocol.

The above description of the determining of the UL data validity is based on the availability of the SM-BO timer. However, if the SM-BO timer is not sent to the UE in the SM reject message, the UE is not able to determine the UL data validity. In yet another option, if the UE receives the SM-BO timer, but the UE does not know the "time for measurements" parameter or the Device Trigger validity time, the UE again cannot determine the UL data validity. In such cases, the UE can indicate to the MTC server the non-delivery of the UL data. If the SM-BO timer is available, the UE can indicate the SM-BO timer to the MTC server. Thus, the meaning of the indication from the UE to the MTC server would be something like "the UL data will be delayed, and if SM-BO timer is included, by remaining SM-BO timer value". The evaluation in the MTC server and further actions from the MTC server can be dependent on the implementation in the MTC server.

According to an embodiment described below, a solution for the problem of the serving network node (such as SGSN or MME), which cannot differentiate between "normal" and "DT-related" MT-SMS when the device triggering is performed over SMS, is provided.

The SGSN/MME in general does not know whether to apply any specific treatment to the received MT-SMS. A special treatment for MT-SMS used for device triggering may be necessary because the MT-SMS used for device triggering may cause the UE initiating a communication to the MTC server and thus, establishing a new connection/bearer (or PDP/PDN context) in the 3GPP network. In case of SM CC, the SGSN/MME may wish to limit the new PDP/PDN context establishments and therefore, may wish to limit/block the MT-SMS used for the device triggering.

Several possible solutions can be considered:
The SGSN/MME may reject all MT-SMSs to UEs which are subscribed to an APN that is currently under SM CC.

The SGSN/MME may take into account the priority of the SMS when deciding whether to transmit (forward) the SMS to the UE. That the SMS priority is an available parameter, typically transmitted in the SMS header and visible to the SGSN/MME.

A combination of the both solution above can be possible as well.

If the device triggering is performed over the T5 interface, i.e. if a DT request arrives at the SGSN/MME over the T5 interface, this fact can be considered as an indication to the SGSN/MME that the UE is using (or subscribed to or capable of using) the DT service.

However, if the device triggering is performed over SMS, the SGSN/MME cannot know if the UE is using (or subscribed to or capable of using) a DT service.

Therefore the present invention provides a new functionality/capability for the network node (i.e. in the case of embodiment into UMTS/LTE for the SGSN/MME) to establish and store an information that a given UE is configured/subscribed/capable of DT functionality. One special case of this capability is that the SGSN/MME is able to determine that the received DT request message is related to device triggering functionality. This is especially challenging when the DT request message is send as an MT-SMS to the SGSN/MME. The establishment/creation of this information can be performed in several ways (which may be combined), examples of which are provided below.

A first possibility of serving network node to register information related to device triggering configuration of the terminal is to evaluate the priority or quality of service assigned to the terminal. For instance, when a UE is configured for "low-priority" services, or the UE accesses the RAN with a "delay tolerant" indication (which, in general, has an equivalent meaning as "low priority") inserted in the RRC protocol, the SGSN/MME stores this information in the UE related context. Currently, in LTE, this information is relevant to the UE/device configuration and not only for a given application. The SGSN/MME can use the "low priority" or "delay tolerant" information and decide that the UE is configured for MTC applications, and thus, the UE may use Device Triggering function. Thus, the SGSN/MME may conclude that the received MT-SMS is used for Device Triggering and the SGSN/MME may decide not to transmit the MT-SMS to the UE (terminal). In other words, the serving network node determines for a particular terminal (communication device) the priority or quality of service and stores the determined information in association with the terminal. In the case that an external (session management) network (APN) is congested to which the terminal would establish connection, the serving network node uses the stored information to decide whether to forward a device trigger request to the terminal or not. In particular, if the priority (or service quality) of the terminal is low, the device trigger request (and/or other messages) is not delivered by the serving network node to the terminal. If the priority (or service) quality of the terminal is high, the device trigger request (and/or other messages) is delivered by the serving network node to the terminal. The term "low priority" refers to services which are marked as such. The term "low service quality" relates to services which do not have strong quality requirements, i.e. requirements on delivery delay and/or error rate.

The shortcoming of this solution is that in LTE not all UEs configured with "low priority" are using an MTC application. For example the network operator may configure some devices/UEs, which are using only low-priority applications (e.g. accessing Internet without multimedia service), to be "low priority" UEs, although these devices does not implement MTC applications. Therefore the network would falsely conclude that these "low priority" UEs, which do not implement MTC application, are using the device triggering service.

Furthermore, not all UEs using MTC applications are actually configured/capable for device triggering service. For example the specification 3GPP TS22.368 describes many MTC use cases where e.g. only the UEs are able to initiate communication, i.e. the network does not trigger these UEs. In this sense it is considered that device triggering is a function or capability that may or may not be implemented or configured in the UEs. So, using this approach (i.e. to take into consideration the "low priority" configuration in the) may lead to misinterpretation in the SGSN/MME that the UE is configured/capable for device triggering.

A second possibility of serving network node to register information related to device triggering configuration of the terminal is to evaluate whether a trigger request for the terminal is received from over an interface or from an entity which is only used for the device triggering traffic. For instance, the T5 interface and the MTC-IWF in LTE correspond to such an interface and entity. If a trigger request is received from the MTC-IWF for the terminal, the terminal is stored in the serving network node as a terminal supporting device triggering. Otherwise, the terminal is stored in the serving network node as a terminal not supporting device triggering. Then, the serving network node uses the information stored for the terminal to decide whether to forward or not a message (an SMS) to the terminal. In particular, if the terminal is stored as supporting device triggering, the message is not forwarded. If the terminal is stored as not supporting device triggering, the message is forwarded.

In the context of 3GPP systems (GPRS/UMTS/LTE), when an SGSN/MME has received a DT request over the T5 interface for a given UE, this may be used as an indication that the UE is using (or subscribed or capable) the DT service. Therefore, the SGSN/MME may establish/create and store information in the UE's context that this UE is configured/capable for DT services. However, the shortcoming of this solution is that some UEs may be only triggered via SMS, i.e. no DT request is ever arriving over the T5 interface for those UEs. Additionally, some network operators may not implement T5 interface or not use it for roaming UEs. It is noted that both, the first possibility and the second—this possibility—may be combined to determine (estimate) whether a terminal supports device triggering or not.

A third possibility of serving network node to register information related to device triggering configuration of the terminal is to obtain the information from a home subscriber server which stores the subscriber data. In particular, there is a possibility for the SGSN/MME to learn about the UE configuration/capability to use DT services is the subscription information transferred to the SGSN/MME from the HSS/HLR, e.g. over the S6a interface.

A fourth possibility of serving network node to register information related to device triggering configuration of the terminal is to evaluate a port number. The port number may be determined as the port in a transport layer protocol message (Transport Control Protocol, TCP or User Datagram Protocol, UDP) or in an MT-SMS. The meaning of the port number (purpose of the port) may be obtained from the terminal or from a home subscriber server. The serving network node may then compare the port in the message received with the port numbers used for device triggering and transmit the message to the terminal, if the port number of the message does not correspond to a port number used for device triggering. On the other hand, in especially in case of NAS SM CC the serving network node may decide not to transmit the message to the terminal otherwise. In the wording of LTE systems, another possibility for the SGSN/MME to determine information about the UE configuration/capability to use DT services is based on a special port number used in the MT-SMS or possibly in the TCP/UDP message when triggering over T5 is employed. The term "port number" indicates an application or functionality to which the information contained in the payload of a protocol message is forwarded. For example an SMS port number would mean to which application the payload of the SMS is forwarded, e.g. to a Universal Subscriber Identity Module (USIM) or to a Wireless Application Protocol (WAP) applications. Similarly, a special port number can be specified in the UE to forward the information contained in the MT-SMS to a device triggering service layer or dispatcher function. The SGSN/MME can be configured with that special port number(s) and inspect the DT request message. The SGSN/MME may learn about the special port number(s) from the UE or from the subscription information from HSS/HLR. A shortcoming of this solution may be that the SGSN/MME may not be able to inspect the DT request message for the used port number. It may be considered that the port number information is transparent to the SGSN/MME.

It is noted that alternatively or in addition to the port number, a payload type may be used to determine the terminal capability regarding the device triggering function. In particular, protocols typically have a kind of "payload type" field included in the header for indicating a type of the payload. This field is called protocol descriptor or discriminator. For instance, in the IP protocol, it may be signalled whether TCP or UDP protocol payload is included. The IPv6 header has a field called "next header" which indicates the type of the next protocol header. Similarly, a NAS message header may include a payload type descriptor which would signal the payload type such as a device-triggering specific protocol.

Figure 14:
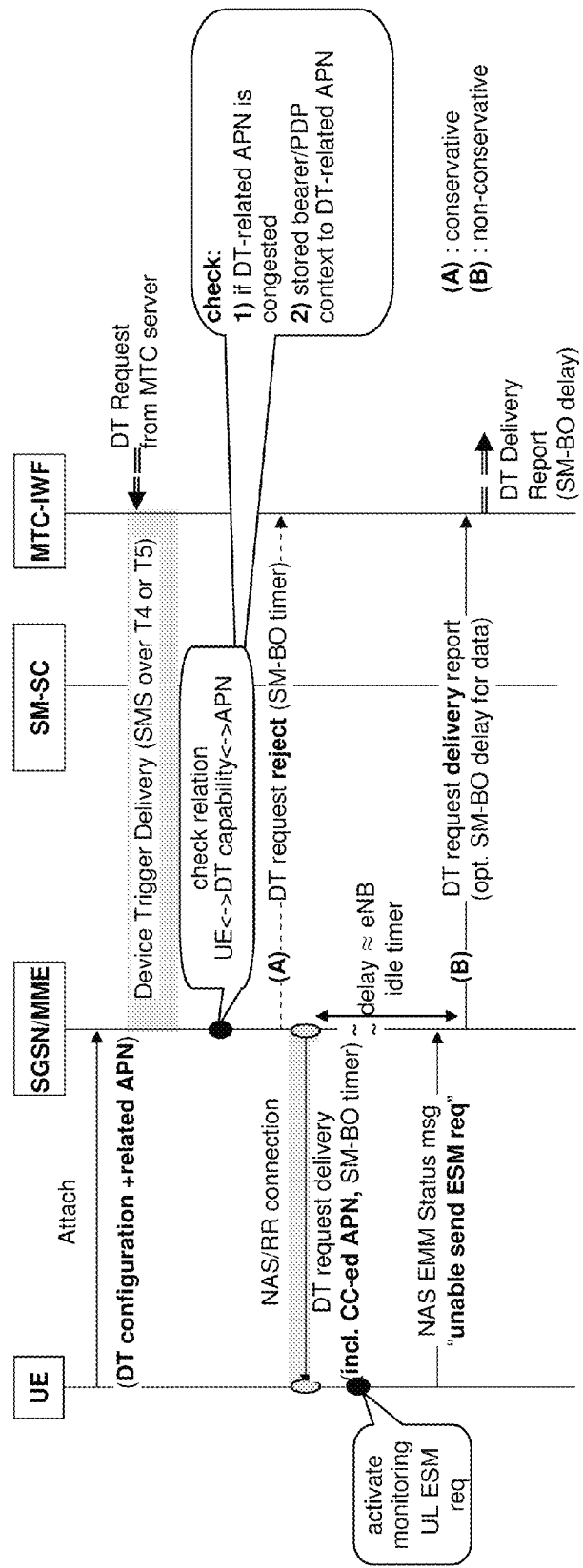
FIG. 14 is a message flow diagram illustrating approached applied in accordance with an embodiment of the present invention by the SGSN/MME to decide whether to transmit the DT request to the UE.

A fifth possibility of the serving network node to register information related to device triggering configuration of the terminal is to receive the information explicitly from the terminal. In particular, the terminal may signal to the serving network node for instance whether it supports device triggering, whether the device triggering is currently configured/active, whether it currently dispatches device trigger requests, or any parameters which may be set for device triggering functionality. In the wording of 3GPP systems, the UE may explicitly indicate to the SGSN/MME information about its DT configuration/capability. This explicit signalling can be performed during the Attach or TAU/RAU procedures (Tracking Area Update or Routing Area Update). This explicit signalling is shown in FIG. 14 (cf. "DT configuration related APN"). The UE may determine its DT capability based on its internal configuration activated during power-on or other initialization procedure. Alternatively or in addition, the terminal may determine its DT status upon any change of the DT activity/configuration. Also, the UE may have a special function for internal routing/dispatching of DT request messages. The availability of this function can be indicated to the NAS layer which transfers the DT configuration/capability information to the SGSN/MME.

A sixth possibility of the serving network node to register information related to device triggering configuration of the terminal is to extract the information from the header of the MT-SMS in which the device trigger request is sent. In particular, the trigger request messages (SMS) may include in the header indicator signalling that the message is a device trigger message. The serving network node may then extract the information from the header and when the message is a device trigger message, it may decide not to transmit the message to the terminal. On the other hand when the message is not a device trigger message (but rather, for instance, a message with normal user data, which would not cause the terminal to respond and thus to establish context/connection to the network), it may decide to transmit the message to the terminal. It is noted that this decision performed by the serving network node is beneficial in the state of network congestion to reduce the signalling traffic. In the wording of 3GPP systems, in case that DT request message is encapsulated in MT-SMS, the SMS (message) generating entity (usually the SM-SC entity) indicates in the SMS that this SMS is used for DT purposes. This indication may be a part of the MT-SMS header that is visible to the SGSN/MME. The SM-SC entity knows about the DT purpose of the MT-SMS because the SMS was received either over the T4 interface or from an MTC server or application. For instance, the message (SMS) originating entity may specify a particular SMS priority that is used for DT purposes (advantageously only for DT purposes). Another example would be to specify such in indication in the MAP or DIAMETER or other protocols which carry the MT-SMS from the SM-SC via a GMSC to the MSC/SGSN/MME. Yet another option would be to specify an indication in the Short Message Transfer Protocol (SM-TP) which the SGSN/MME should be able to inspect and determine the purpose of the MT-SMS. Further information regarding the MT-SMS treatment in case of MM CC is provided below.

One or several of the above mentioned mechanisms in combination can be used to determine the DT configuration/capability of the UE at the serving network node (MME/SGSN), to store it and to use it for deciding in the congestion state whether to forward a message received for a terminal to the terminal. In particular, the messages which are judged to (possibly) be device triggering messages are not transmitted to the terminal while the other messages are transmitted to the terminal.

In order to perform an efficient judgement on whether to transmit or not the message to the terminal, it is advantageous when the serving network node has an information regarding the APN to which the terminal would try to establish connection after triggering and/or whether this APN suffers from congestion or not.

Another embodiment of the present invention addresses this problem, i.e. a problem of the resolution of the target APN. It is particularly advantageous to combine this embodiment with the other embodiments of the present invention. For instance, the detection of the terminal DT capabilities or configuration together with the information about the state of congestion (whether the network is congested or not) of the APN, to which the terminal would try to establish connection when triggered, provides enough information to enable the serving network node to stop all messages causing triggering and to rely messages not necessarily causing triggering of the device (terminal).

As already mentioned in the other parts of the invention description, it may not be possible to the serving network node (SGSN/MME) to determine the target APN. The solution for resolving the target APN described above is applicable if the ExtID is available to the SGSN/MME and the special configuration for the ExtID is used. This is partially possible in case of device triggering over T5 interface. However, when using MT-SMS for devices trigging it may not be possible to carry the ExtID in the header of the MT-SMS and therefore the ExtID would not be visible to the SGSN/MME. Furthermore, assuming that legacy MT-SMS will be used for device triggering also in the future, it is necessary to seek for a solution how the SGSN/MME can process the DT request (in form of an MT-SMS or other general signalling format over T5 interface) in order to decide whether to transmit or not the DT request to the UE in case of congestion control in the SGSN/MME, and particularly in case of SM CC.

One possible approach to determine whether to apply special treatment to the DT request message in case of CC is that the SGSN/MME take into account the UE's subscribed APN(s). The subscribed APN(s) are part of the subscription information that is transferred from the HSS/HLR to the SGSN/MME during the attach procedure. Therefore, the SGSN/MME always knows the UE's subscribed APN(s). If the UE is subscribed to a single APN, then the processing in the SGSN/MME can be simple. When the SGSN/MME receives the DT request message, the SGSN/MME processes the message to discovers to which UE the message should be delivered. Then the SGSN/MME can check the subscribed APN. If the subscribed APN is under MM or SM CC, the SGSN/MME may not transmit the message, as it is assumed that the UE would generate MM or SM signalling to the network.

In other words, the serving network node receives information from a home subscription server, the information including subscription of the terminal to one or more external networks. The serving network node may than evaluate whether one or more of the subscribed networks are in congestion state or not. When one or more of these networks are in congestion state, the serving network node may decide not to forward the device triggering messages to the terminal. Other than device triggering messages may be decided to be delivered to the terminal.

In this embodiment, the congestion control may be the SM or the Mobility Management (MM) CC. The reason to particularly address the MM CC is that the Offline Device Triggering, which is going to be specified in 3GPP in the future, may include a DT request (or a similar message for triggering the device) that is sent to the SGSN/MME for devices (terminals) that are not attached to the 3GPP network. With other words, the DT request message is a message destined to the UEs to request them to attach to the network. This may be performed by broadcasting a corresponding signalling information after obtaining of which the UE attaches to the network. In such a case, if the SGNS/MME applies APN-based MM CC, the SGSN/MME may block the DT request message to the UEs, as the reception of the DT request message would cause NAS MM signalling to the network, which is obviously not desired during the APN-based MM CC.

The case of a UE subscribed to a single APN was discussed in the above description. However, if a UE is subscribed to multiple APNs, but SM CC is applied to only one APN, all DT requests will be blocked by the network (MTC-IWF or SGSN/MME) when applying prior-art "Overload Control via MTC-IWF" mechanism as described in 3GPP TS 23.888, section 6.59. Therefore, a solution would be beneficial to block only those DT request messages that would trigger the UE to initiate signalling to the congested APN.

To fulfill this requirement, in accordance with an embodiment of the invention, the SGSN/MME knows the APN(s), to which the UE would activate connections or send data after receiving the DT request message (called for simplicity "DT-related APN(s)"). This information can be stored in the SGSN/MME in the UE context along with the other information, e.g. subscribed APNs. With other words, the SGSN/MME can differentiate between subscribed APNs and DT-related APNs. The latter are subset of the subscribed APNs and the UE use data connection to these APNs particularly after receiving DT request message.

One possibility for the SGSN/MME to know about the information about the DT-related APN(s) is from the subscription information from the HSS/HLR. This means that the HSS/HLR stores and signals to the SGSN/MME information about the DT-related APNs along with the information about the subscribed APNs.

Another possibility for the SGSN/MME to learn about the DT-related APNs is from an explicit signalling from the UE. For example during the Attach or TAU/RAU procedure the UE signals the DT-related APN(s) to the SGSN/MME. The UE is able to know this information, as the UE is able to insert an APN in the Session Management (SM) request message when an MTC application triggered by a DT request initiates a new connection establishment. Therefore the UE may have knowledge which MTC applications are activated by DT request and which APNs are used by those MTC applications. One example which signalling procedure can be used by the UE to inform the MME can be the usage of NAS EMM STATUS message. More information about the NAS EMM STATUS message can be found in 3GPP TS 24.301 Section 8.2.14.

In other words, the serving network node may rely its decision on whether to forward or not forward a message to the terminal on the state of congestion in the external networks to which the terminal may connect after being triggered. This approach is more exact and efficient as relying on any external networks to which the terminal is subscribed. The information about the external networks to which the terminal is to connect after being triggered may be obtained (extracted) from the home subscription server or from the terminal.

In summary, according to a preferred embodiment of the present invention, the SGSN/MME (serving network node) should maintain information about the association between a UE (terminal), its DT capability/configuration and the DT-related APN. When the SGSN/MME receives a DT request message and an APN-based CC is activated in the SGSN/MME, the SGSN/MME performs check to find out whether the target UE is DT configured and which are the DT-related APN(s). Only if the APN-based CC activated in the SGSN/MME is related to the UE's DT-related APN, the SGSN/MME may decide to reject/block the DT request message. It is noted that the decision to reject means that the device trigger request is removed, the source node of the device trigger request is informed about the removal and the serving network node does not try to transmit it later. Blocking may be performed temporarily: the device trigger request message is stored in the serving network node and transmitted later, possibly at the time when the congestion state indicates no congestion.

As described above, in the case when the terminal can only connect to a single APN for the DT purposes, the decision may be performed efficiently. In the following, the case of multiple DT-related APNs or inability in the SGSN/MME to know the DT-related APNs will be described.

The above described solution is advantageously applicable under the assumption that the UE has a single DT-related APN (and may have multiple subscribed APNs). However, in case of multiple DT-related APN or in case that the SGSN/MME doesn't know about the DT-related APNs, different mechanisms may be beneficial to determine by the serving network node whether to transmit or block the DT request. One such mechanism may be to take the decision based on the stored EPS bearer context or PDP context (as already used for simplicity PDN/PDP context). When the SGSN/MME receives the DT request (either in form of MT-SMS from SM-SC or other kind of signaling over T5 interface from MTC-IWF), the SGSN/MME checks the subscribed APNs, if available the DT-related APNs and the stored PDN/PDP context. The following processing may be applied:

1. If no of the UE's subscribed APNs or DT-related APNs (if the latter available in the SGSN/MME) is congested, the SGSN/MME concludes to transmit the DT request message to the UE, since a possible later NAS signaling (EMM or ESM requests) from the terminal to the network and vice versa would not impact the activated APN-based CC in the network.
2. If one of the subscribed APNs or the DT-related APNs (if the latter is available in the SGSN/MME) is congested and if there are NO PDN/PDP contexts for the congested (DT-related) APN, the SGSN/MME can conclude that the UE will most probably send an ESM request to the network in order to establish the data connection to the MTC server/application. Based on this conclusion, the SGSN/MME may reject the DT request message. The SGSN/MME may also reject the DT request if there are multiple subscribed or DT-related APNs and the SGSN/MME maintains PDN/PDP context to a subset of the subscribed or DT-related APNs, as the SGSN/MME is not 100% sure to which APN the DT request is sent and there is still the probability that the UE sends (E)SM request to the contested APN. In the DT delivery report back to the MTC-IWF entity and further to the MTC server, the SGSN/MME may include besides the reject/unsuccessful cause additionally a time for which the MTC server/application should NOT attempt to retransmit or transmit a DT request message for this UE. Thus, when the serving network node decides not to deliver the trigger request to the terminal, the serving network node may further transmit to the server (triggering server or the source of the device trigger request) a report message indicating a cause of the unsuccessful delivery and (possibly optionally) including a time period during which the server should not transmit or retransmit the device trigger messages to the terminal. In accordance with another aspect of the present invention, the triggering server may be configured to determine the congested external networks based on the received report message and the terminal for which it was received. Accordingly, it may decide to apply similar means, i.e. restriction on transmitting the trigger requests, to other terminals subscribed to the same external network (s). In other words, optionally, the MTC server/application can apply the restriction of sending further DR request message to other UE that are registered or attached to this mobile network.
3. If one of the subscribed APNs or the DT-related APNs (if the latter available in the SGSN/MME) is congested and if there is PDN/PDP context for the subscribed or DT-related APN, the SGSN/MME may conclude that the UE would NOT send ESM request to the network after receiving the DT request message. Based on this conclusion, the SGSN/MME may decide to send the DT request message to the UE. In order to take a more accurate decision, the SGSN/MME may further take into account information about the 3.a) PDN types that are allowed for the congested APN. Usually the UE request a PDN type when establishing a new PDN connection (i.e. default bearer). The PDN type is a connection type, which may be, for instance IPv4, IPv6 or both IPv4v6, which gives an indication to the network what type of IP address to assign to the UE for the requested PDN connection; and 3.b) maximum number of allowed EPS bearers for the congested APN. For example, this information may be a part of the subscription and may be obtained from the subscription repository (HSS/HLE).

For example, if the UE's subscription indicates that the UE is allowed to have only 1 EPS bearer to the APN, which happens to be currently congested, and the SGSN/MME has already stored PDN/PDP (i.e. bearer) context for that APN, the SGSN/MME can conclude that the UE will not establish a new EPS bearer or PDP context for this APN, i.e. the IE would not send (E)SM request message. So, the SGSN/MME can transmit the DT request message.

The point 2 from above can be characterized as "conservative" approach because the SGSN/MME acts in conservative way and rejects or blocks the DT request even if there is probability that the UE may not send any (E)SM request after receiving the DT request message. On the other hand, the case described in point 3 from above can be denoted as "non-conservative" approach because the SGSN/MME does not reject the DT request even if there is probability that the UE may send (E)SM request after receiving the DT request message.

FIG. 14 illustrates an example of the corresponding message exchange. The "non-conservative" approach includes the steps of signalling the DT request from SGSN/MME to the UE, the processing in the UE, a possible signalling from the UE to the SGSN/MME and the signalling from SGSN/MME to the MTC-IWF.

A problem with the described "non-conservative" approach above may occur when the SGSN/MME transmits the DT request message to the UE and the UE needs to establish a new bearer or modify an existing bearer. Then the UE would send an ESM request to the network (SGSN/MME) and possibly to the congested APN, in which case the (E)SM request from the UE would be rejected. This problem may also occur if there are multiple DT-related APNs in the SGSN/MME but only one of them is currently congested. If the SGSN/MME stores PDN/PDP context for some of the DT-related APN the SGSN/MME may though decide to transmit the DT request message because the probability of establishing new data connection (bearer) is low. However, if the UE though needs a new connection, the UE sends ESM request message. In such a case the SGSN/MME would reject the ESM request message.

In order to avoid the sending of the ESM request message for the congested APN, it is advantageous that the SGSN/MME informs the UE about the currently congested APN (and optionally also about the SM-BO timer) during the NAS signalling procedure for the DT request transmission. The SGSN/MME informs the currently congested APN only in case that the congested APN is one of the UE's subscribed APNs. This is shown in FIG. 14 by the signalling from the SGSN/MME to the UE for transmission of the DT request message. The bold text in the brackets in the DT request delivery message from the serving network node to the terminal shows the inclusion of the congested APN ("CC-ed APN") and possibly the SM-BO timer. FIG. 14 also shows that the UE stores this received information (the CC-ed APN(s) and possibly the SM-BO timer) and activates monitoring of the uplink (UL) ESM request messages similar to the case where the UE receives an ESM reject with the BO timer from the SGSN/MME. For example, the SGSN/MME can inform the UE about the congested APN and SM-BO timer using some existing NAS procedure, e.g. EMM INFORMATION message (unidirectional from MME to UE) or EMM STATUS message. Further, if an EPS bearer context for the congested APN exists, the SGSN/MME may use ESM NOTIFICATION message. New informational elements or parameters may need to be specified for those messages in the protocol specifications. More information about the format of these messages can be found in 3GPP TS 24.301, ver. 10.5.0, December 2011, freely available on www.3gpp.org. However, the present invention is not limited by re-using the messages existing in UMTS/LTE. New procedures between the SGNS/MME and UE can be specified.

It is noted that this embodiment has an advantage with respect to transmitting the SM-BO timer after rejecting the terminal's request for establishing (data) connection. In particular, with the present embodiment, the terminal does not try to establish connection so that the amount of signalling messages to the congested network is reduced. Rather, the serving network node transmits to the terminal information about external networks congested. In particular, the serving network node transmits information about the networks relevant to the terminal, i.e. to the networks, to which the terminal may try to establish connection. The information may also include a back-off timer. The transmission of the information to the terminal may be performed upon transmission a (device triggering) message for the terminal and after judging that the terminal could/would try to establish connection to a congested network.

When the UE's application/service layer requests a new connection establishment to the stored congested APN during the SM-BO timer is running, the UE shall not send any ESM request message. The UE may use a NAS procedure to inform the SGSN/MME that the UE is unable to establish a required new data connection (bearer or PDP context). For example, the UE can use the NAS EMM Status message (as defined, for instance in 3GPP TS 24.301, Section 5.7). In the NAS EMM STATUS message, the UE may inform the SGSN/MME about the congested APN, optionally about the remaining SM-BO timer and about the DT request message ID. The DT request message ID may be needed in the SGSN/MME to establish a relation between the information contained in the NAS EMM message and the DT request message. In this way the SGSN/MME would be able to generate and transmit the DT delivery report to the MTC-IWF indicating that the DT request message was delivered successfully but data connection or the possible reply the MTC application may be delayed due to the inability of the UE to establish data connection or IP bearer due to an APN congestion.

The "non-conservative" approach looks similar to the solution described in FIG. 6, option 1 (Opt.1). The difference is that in FIG. 6, option 1, the UE is not informed about the congested APN during the Device Trigger delivery, but rather the UE is informed that there is SM CC in the network. Therefore the UE may send (E)SM request message to the SGSN/MME and the SGSN/MME rejects the message. A mix between FIG. 6, opt.1 and FIG. 14 solution is possible. For example, the upper part of FIG. 14 can be applied, i.e. the processing in the SGSN/MME for determining the target APN, and if the SGSN/MME decides to apply the "non-conservative" approach, however, without indicating the congested APN during the transmission of the DT request message, then the UE may initiate (E)SM request to the congested APN as shown in FIG. 6, opt.1. Then, the SGSN/MME would reject the (E)SM request to the congested APN and the SGSN/MME generates a DT delivery report to the MTC-IWF which forwarded to the MTC server/application. It is noted that the serving network node may have means for deciding which of the approaches described above to apply, for instance whether to apply the "conservative" approach (denoted as option A in FIG. 14) or whether to apply the "non-conservative" approach (denoted as option B in FIG. 14). However, the present invention is not limited thereto and, in general, only one of the approaches may be applicable/configured in the serving network node.

One further detail shown in FIG. 14 is the delay activated in the SGSN/MME between the transmission of the DT request to the UE and before sending the DT delivery report to the MTC-IWF. Both FIG. 14 and FIG. 6 show that the DT delivery report goes to the MTC-IWF, however it is also possible that the DT delivery report is sent to an SMS core network entity, e.g. SM-SC, in case that MT-SMS is used for device triggering. As shown in FIG. 14, the delay activated in SGSN/MME may have the same or a similar value to the timer used in the eNB to activate the transition from CONNECTED to IDLE sate when the UE does not send/receive any packets over the radio link. It could be assumed that the SGSN/MME doesn't need to activate a delay (i.e. timer) but wait until the eNB sends a S1-AP request for IDLE mode transition. This is also possible option. However, in case that the UE has other active connection(s) and stay longer time in the ACTIVE/CONNECTED state, the eNB would not trigger the SGSN/MME for IDLE mode transition. Therefore it is beneficial that the SGSN/MME activates an own delay timer (that may have a similar value as the inactivity timer in the eNB).

One further aspect related to both FIG. 6 and FIG. 14 may be considered. Depending on the MTC service layer protocol (i.e. from UE perspective this is an application layer above the NAS layer and the 3GPP standardized protocols) implementation, it is well possible that the UE's application needs to acknowledge the reception of the DT request message to the MTC server or the application. This is a normal protocol design with request<->Acknowledge exchange. Such exchange is especially required when the DT request message triggers some measurements and not immediate data reporting from the UE because the MTC server would like to be sure that the UE started collecting data, e.g. the measurements. The DT request reception acknowledgement (alternatively it can be called "reception confirmation") can be sent back to the MTC server or application either via the U-plane as a data packet or via the C-plane using the same protocol as for the DT request message delivery (e.g. over SMS or T5 protocol). The DT request reception confirmation can be independent from the DT delivery report sent e.g. from the SGSN/MME back to the MTC-IWF and forwarded to the MTC server. Accordingly, the terminal which received a device trigger request originated by the triggering server may confirm receipt of the request by transmitting to the triggering server (e.g. over a plurality of network nodes and/or an external network) a request reception confirming message.

Figure 15:
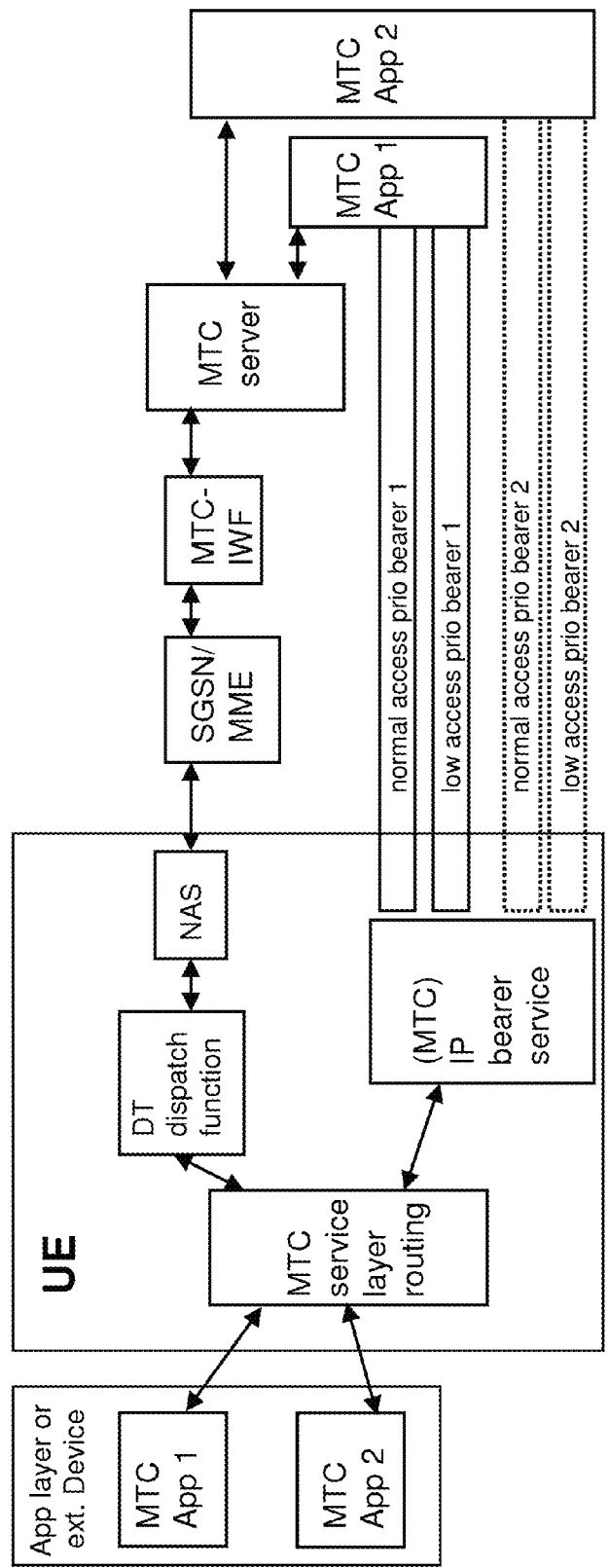
FIG. 15 is a block diagram illustrating a functional model for device triggering and data connection establishment.

A description of the possible specifics for both C-plane and U-plane transmission of the DT request reception confirmation is shown in FIG. 15 and explained below:

The right hand side of the figure shows an example where 2 different MTC applications ("MTC App 1" and "MTC App 2") may request from the MTC server to trigger a UE to initiate a communication with the corresponding MTC application. The MTC server generates the DT request message and sends it over Tsp interface to the MTC-IWF. The MTC-IWF selects a delivery over T4 or T5 interface and forwards correspondingly the DT message. The DT message arrives as the network serving node (SGSN/MME) and the SGSN/MME forwards the message to the NAS layer in the UE.

The DT request message is most probably processed by a kind of dispatch function after the processing in the NAS layer. In case that the DR request is encapsulated in MT-SM, the MT-SMS payload (containing the DT info) would be forwarded (by e.g. SMS dispatch function) to a MTC specific function which could be the DT dispatch function or directly to a MTC service layer internal routing function. With other words between the NAS layer and the MTC related function there might be SMS-specific functions which are not depicted in FIG. 15. Please note that the boxes within the UE show an exemplary structure of the functions or layers in the UE, however, the exact details are implementation dependent. If the DT request is carried over a T5 interface and the format is different from SMS, then the NAS layer in the UE forwards the DT request to the DT dispatch function or to a MTC specific service layer function that should identify the correct application and forward/route the message further. The data connections (or bearers) between the (MTC) IP bearer service and the MTC App 1 are depicted with continues line which means that the PDN/PDP context for those connections/bearers exist in the UE and SGSN/MME. On the other hand the data connections/bearers between the (MTC) IP bearer service and the MTC App 2 are depicted with interrupted line which means that the PDN/PDP context for those connections/bearers does not exist.

The DT request reception confirmation can be send over the C-plane back to the MTC server. This could be performed either 1. as an MO-SMS generated in the MTC App or in the MTC service layer routing function and forwarded to the UE's SMS protocol stack and afterwards to the NAS layer in the UE or
2. as other signalling protocol message and forwarded to the NAS layer in the UE for transmission to the network.

Figure 9:
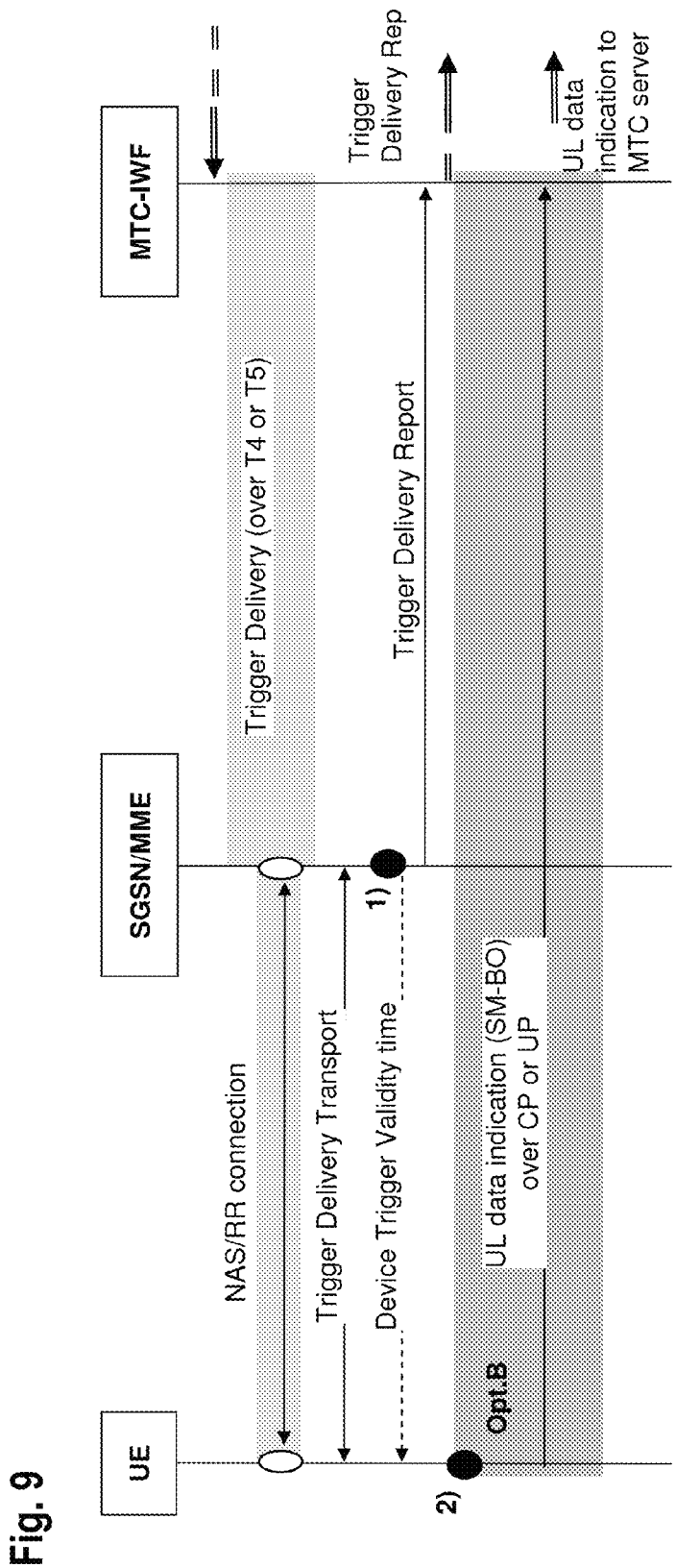
FIG. 9 is a message flow diagram illustrating an example of delivery delay indication initiated by the terminal, sent directly to a server when a back-off timer is running at the terminal.

If APN based SM congestion control is activated in the UE (i.e. if the UE has a SM-BO timer running as shown in FIG. 9), the UE may perform a special check in the NAS layer in order to determine whether the activated SM-BO timer is related to the APN to which a potential data connection (bearer 1 or bearer 2) has to be established. If this is the case, the UE (the NAS layer or the MTC App layer or the MTC service layer) includes the corresponding information, i.e. the uplink data cannot be delivered immediately due to activated congestion control, in the DT request reception confirmation to the MTC server. In such a way the DT request reception confirmation would carry the information to the MTC server that the DT request message was successfully accepted and a data connection cannot be established due to the activated SM-BO timer. This is similar to FIG. 9 option B.

The DT request reception confirmation can be send over the U-plane back to the MTC server. In the case that PDN/PDP context is already established (as shown for bearers 1 in FIG. 15) the UE would be able to transmit the DT request reception confirmation. If however the PDN/PDP context is not established (as shown for bearers 2) and the APN for bearers 2 is under congestion control, the UE will not be able to transmit the DT request reception confirmation message.

In general, if the MTC server or application expects the reception of DT request reception confirmation and such confirmation is not received, the MTC server or application would retransmit the DT request message. In such a case, one of the entities MTS App, MTC server, MTC-IWF or SGSN/MME should implement a function to determine the situation and to not retransmit a possible new DT request message to the UE. For example such functionalities may include a solution for APN based congestion detection in the UE already described in one of the embodiments in this invention. Another possible solution is that the UE after determining that the IP bearer cannot be establish to transmit data or DT request reception confirmation, if the NAS connection is still established or active, the UE can inform the SGSN/MME about the APN-base SM CC. Similar approach is described already in FIG. 14, where the UE uses the NAS EMM status message to inform the SGSN/MME about the congestion situation.

Alternatively to solve the problem of retransmitted DT request message, the network (e.g. SGSN/MME) may decide to terminate the SM-BO timer running in the UE and transmitted the DT request message to the UE when the DT request is retransmitted by the MTC server. The SGSN/MME can terminate the SM-BO timer in the UE as described in 3GPP TS 23.401 Section 4.3.7.4.2.2. This means that the SGSN/MME intitiates (E)SM procedure towards the UE. When the UE receives an (E)SM request message from the SGSN/MME, the UE terminates the SM-BO timer.

The "non-conservative" approach is beneficial for multiple DT-related APNs when the MME cannot detect which APN exactly would be triggered when the UE receives the DT request message.

In accordance with another embodiment of the present invention, the MTC-IWF or SGSN/MME resolves the DT-related APN based on the source of the DT request.

In the above description, several approaches were provided as to how the SGSN/MME may resolve the target APN. The approaches were essentially based on internal processing in the SGSN/MME (which is particularly applicable for a single subscribed or DT-related APN) or explicit indication received from the UE. In this embodiment, yet another approach is provided based on the source of the DT request message. This approach is different from the other approaches, because here the resolution of the target APN can be performed in the MTC-IWF or with the help of the MTC-IWF and not necessarily at the serving network node (MME/SGSN).

One main assumption for this approach is that most probably, the DT request messages sourced from one MTC server or application would result in data connections from the UEs to a one particular APN. Therefore, this approach provides a solution where the MTC-IWF or the SGSN/MME can resolve the target APN based on the source (originating node) or sender of the DT request message. It is a general understanding that the DT request message over the Tsp interface would contain an informational element or parameter indicating the ID of the source or sending entity. With other words, the DT request message over the Tsp interface would contain a sort of "MTC server ID" parameter. So, this "MTC server ID" is known at least at the MTC-IWF. There are proposals that the "MTC server ID" is also carried over the T4 interface, so that the SM-SC entity can store this parameter—The storing of the "MTC server ID" in the SM-SC and MTC-IWF can be used for various purposes. For example one purpose can be charging (when the charging is performed per sender, i.e. per MTC server) and another one can be to generate and send back DT delivery reports.

This embodiment proposes to maintain a relation between "MTC server ID" and the target APN in some of the 3GPP network entities. Several options are possible:

The relation between "MTC server ID" and target APN is maintained in the subscription repository (HSS or HLR). When the MTC-IWF receives a DT request message, the MTC-IWF contacts the HSS/HLR to resolve the UE internal ID and the MME or SGSN where the UE is registered. The new proposal is that the HSS/HLR can report the related target APN (additionally to the UE network internal ID) to the MTC-IWF.

The relation between "MTC server ID" and target APN is maintained in the MTC-IWF. For that purpose the MTC-IWF should be configured with this information.

The relation between "MTC server ID" and target APN is created in or performed by the SGSN/MME. However, the SGSN/MME does not know the source of the DT request. So, extensions to the T5 interface protocol is needed to carry the "MTC server ID" from MTC-IWF to the SGSN/MME. One problem to overcome is when MT-SMS is used for device triggering because then the "MTC server ID" needs to be carried in the SMS header to SGSN/MME and the SMS header has a limited size. Therefore this option is easily applicable for device triggering over T5 interface. Once the SGSN/MME obtains the "MTC server ID", the SGSN/MME can either query the HSS/HLR for the resolution of the target APN, or the SGSN/MME maintains it's own database with the relation between "MTC server ID" and target APN. Please note that this is related to the first option above where the HSS/HLR stores the relation between "MTC server ID" and target APN and the SGSN/MME queries the HSS/HLR using the "MTC server ID" instead of MTC-IWF. One benefit of this option is that the SGSN/MME needs only to perform the query if there is APN-based CC activated and this APN one of the subscribed APNs of the target UE.

After the MTC-IWF resolves the target APN for the given DT request message, the MTC-IWF can report the target APN as additional parameter to the SGSN/MME over e.g. the T5 interface. In the SGSN/MME, after receiving the DT request message and target APN as described above, the SGSN/MME process the DT request as described in other embodiments. For example the SGSN/MME would decide whether to transmit or reject the DT request message based on the APN congestion situation in the network and optionally whether the PDN/PDP context to this APN is available.

Another possibility is that the SGSN/MME reports to the MTC-IWF the activated APN-based congestion control. Then the MTC-IWF applies filtering or rejecting of DT request messages that target an UE, which registered at the given MME, and the target APN has been reported from the given MME to be under APN based congestion control. With other words the MTC-IWF doesn't forward the DT request message to the SGSN/MME if the MTC-IWF knows that the target APN is under congestion control.

Summarizing, in order to determine an identity of an external network under congestion, a network entity maintains the association between the triggering server identity (MTC server) and the target external network (APN) to which the terminal connects for reporting the data upon being triggered. This association enables determining of the external network by the entity. Alternatively, the entity may transmit the association or the detected congested external networks to another entity. In particular, the network entity may be MTC-IWF, SGSN/MME (serving network node) or MS-SC.

It is noted that the present invention is not limited to the session-management congestion control, but rather also applicable to the Mobility Management Congestion Control (MM CC).

The major part of the invention describes the APN based SM CC as the main considered scenario. However, especially in the case where the DT request message is encapsulated in an MT-SMS, the decision in the SGSN/MME whether to transmit or reject the MT-SMS can be based not only depending on the APN SM CC, but also depending on the APN-based and general MM CC. The reason for this interaction between MT-SMS transmission and MM CC is the behaviour in the UE that when paged for mobile terminated (MT) services the UE should terminate the MM BO timer. Usually in 3G (i.e. UMTS) when a MT-SMS is to be transmitted the UE is paged with a special cause indicating signalling connection establishment. However in case of LTE or in case of PS-only subscription it is not clear whether the UE is paged with mobile terminate (MT) paging cause in order to transmit the MT-SMS. Also, it is not clear whether the UE would treat the paging as reason to stop the running MM BO timer. Anyway, the SGSN/MME may not wish to page the UE at all because even the establishment of signalling connection between the UE and SGSN/MME would lead to undesirable MM signalling.

In case of APN based MM CC the UE is not registered in the SGSN/MME and the kind of triggering is so called Offline device triggering. In the case of Offline device triggering the SGSN/MME may broadcast the DT request message in order to reach the UEs that are not registered. The problem is that many UEs may attempt to attach to the network after receiving the DT request message and if the APN based MM CC is activated for those UEs, the many attach attempts are not desirable because the MM CC situation would be worsen. In order to avoid the broadcasting/transmission of the DT request message, the SGSN/MME may process the DT trigger message to determine whether APN based MM CC is activated in the network before the transmission of the DT request message. The processing may be complicated due to the fact the SGSN/MME may not have NAS MM context for the targeted UEs, as they are not registered or attached to the network. If the SGSN/MME has NAS MM context, then the processing is described below.

In the following the focus is brought to the general MM CC. In this case the UE under general MM CC may have NAS MM context in the SGSN/MME. The general solution in this case may be that the SGSN/MME after receiving the DT request message performs a check whether the target UE is under MM CC, i.e. whether the SGSN/MME stores MM BO timer for this UE. Even if there is not stored MM BO timer for this UE, the SGSN/MME may also perform a check whether the priority of the UE or the group of the UE or some other parameter is used for a currently ongoing MM CC. One example is that the UE is configured for "low priority" and currently the SGSN/MME applies MM CC to all low priority UEs. So, even if the UE doesn't have an activated MM BO timer, there is a probability that after paging the UE's NAS MM signalling would worsen the MM CC situation. The following conditions are described in the processing in the SGSN/MME:

if the UE is under general MM CC and the MM CC situation in the network is still ongoing, the SGSN/MME may decide to NOT page the UE and reject the MT-SMS used for DT purposes. The SGSN/MME, as described in other embodiments, may include the MM BO timer value in the rejected DT request delivery message to SM-SC. The SM-SC may decide whether to store the MT-SMS or to forward the unsuccessful DT delivery to the MTC server/application based on the values f SMS validity time and MM BO timer signalled in the DT delivery report from the SGSN/MME (similar to the processing described in one of the embodiments above)

if the UE is under general MM CC and the MM CC in the network does not exist anymore (i.e. the MM CC is over), the SGSN/MME may decide to page the UE. The SGSN/MME should choose the proper paging cause so that the UE can stop the running MM BO timer.

Please note that the described functionality above is for MT-SMS used for DT purposes which would mean that after receiving the MT-SMS the UE probably would initiate additional NAS MM and/or SM signalling in order to establish or reconfigure data connections. If however the MT-SMS is "normal" (non-DT purposes) the SGSN/MME may conclude that the NAS MM/SM signalling would be in the most cases for the MT-SMS transmission, i.e. without additional NAS MM or SM signalling, so that the SGSN/MME may treat such a "normal" UE differently. For example, the SGSN/MME may decide to transmit the "normal" MT-SMS whereas the MT-SMS used for DT purposes would be rejected. Therefore the way for determining a MT-SMS used for DT purposes as described above, especially the solution in the sixth possibility (extracting the information from the header of the MT-SMS in which the device trigger request is sent), may be helpful for the SGSN/MME. Optionally, the SGSN/MME may include different failure causes in the delivery report back to the SM-SC entity when the MT-SMS is a "normal" SMS or DT-related SMS. For example the SGSN/MME may decide whether to include or not the retransmission suppression timer in the delivery report. Further the SGSN/MME may decide to include the "message waiting flag", which indicates to the SM-SC that an indication from the HSS/HLR will come when the UE becomes reachable, only in case of "normal" SMS. In contrary, for DT-related SMSs such an "message waiting flag" may be avoided as the MME may use the retransmission suppression timer in the delivery report.

Another variant of the solution is described in the following embodiment. After the UE determines that the UL data will be outdated (as described above with reference to FIGS. 8 and 9, point "2)" in the UE), the UE can decide, instead of sending the UL data delivery/validity (SM-BO timer) indication to the SGSN/MME or to the MTC server, to send the UL data (e.g. as SMS or small data) over the C-plane. This is possible as the SMS is sent over the C-plane connection and no Session Management signaling for new PDP/PDN connection is needed. The UE should be able to generate and transmit the report/indication to a network entity (but finally destined to the MTC server) over the C-plane.

One problem of this alternative embodiment is that the MTC server may not be able to receive the UL data as an SMS. This is possible as the SMS is sent over the C-plane connection and no Session Management signaling for new PDP/PDN connection is needed. Several solutions can be applied to solve the problem:

the UE encapsulates the UL IP data into MO-SMS payload (or concatenated SMSs) and sends it to the MTC server the MTC-IWF extracts the UL IP data from the SMS (concatenated SMSs). Then the MTC-IWF forwards the UL IP data to the MTC server. In this case the MTC-IWF acts as IP router when forwarding the UL IP data.

the UE sends the UL data as MO-SMS payload (or concatenated SMSs) to the MTC-IWF. The MTC-IWF translates the payload of the SMS (or concatenated SMSs) data into an IP data. For that purpose the MTC-IWF generates an IP packet(s). The MTC-IWF forwards the IP packets to the MTC server.

It is noted that the MTC-IWF needs to spoof the source IP address, so that the MTC server realizes that the IP packets are sent from the UE. For that purpose the UE informs the MTC-IWF about its IP address. Optionally the MTC-IWF can act as a Home Agent for the UE in order to avoid the IP address spoofing (please refer to Mobile IP specifications RFC 3775 and RFC 5944).

In accordance with an embodiment of the present invention, the terminal may report to the server an IP address after receiving the triggering request. The Device Triggering is generally used to trigger the UE to establish communication to the MTC server. The general assumption here is that the UE sends UL data (immediately or with a certain delay due to gathering/measurement of data) after receiving the Device Triggering. However, it is also possible that the Device Triggering is used as a request sent from the MTC server for the UE's IP address. The MTC server uses the UE's IP address to communicate with the UE. With other words, the Device Trigger request may contain a command to the UE (in the network-opaque data) or to the network to establish a PDP/PDN connection and report the IP address back to the MTC server. In case the requested PDP/PDN connection already exists, the UE or the network would report the IP address. This embodiment describes a possible solution for this scenario. Two cases are treated below:

The PDP/PDN connection is already established/existing when the Device Triggering is performed, and The PDP/PDN connection doesn't exist when the Device Triggering is performed.

In the case when the PDP/PDN connection is already established/existing when the Device Triggering is performed, the UE has an IP address configured for this PDP/PDN connection. This IP address is known by the UE and by the network. If the Device Triggering requires the UE to report its IP address, then the UE sends in indication message containing the IP address either via the C-plane or via the U-plane. If the Device Triggering requires the network to report the UE's IP address, then the network (possibly the MTC-IWF) learns the IP address either from the serving CN node (SGSN/MME) or from a network node on the U-plane (e.g. SGW, PGW or GGSN). Afterwards, the network (SGSN/MME and/or MTC-IWF) informs the MTC server about the UE's IP address.

On the other hand, in the case, when the PDP/PDN connection doesn't exist when the Device Triggering is performed, the UE doesn't have an IP address configured for the requested PDP/PDN connection. The following two sub-cases are considered:

If the Device Triggering targets the UE, i.e. the trigger request is contained in the network-opaque Device Trigger data, the UE initiates the establishment of PDP/PDN connection. Since there is SM CC applied in the network, the UE is not able to establish the PDP/PDN connection, so that the UE is not able to configure the IP address. As a result, the UE can report to the MTC over the C-plane that the PDP/PDN connection, and respectively the IP address, cannot be established. With other words, the UE needs to report an error cause to the MTC server. Additionally the UE reports the SM-BO timer value, if available, to the MTC server. The UE may be able to generate and transmit the report/indication to the MTC server over the C-plane.

If the Device Triggering targets the network, i.e. the network should report the UE's IP address to the MTC server, the network performs the network-initiated PDP/PDN connection establishment procedure. In case of GPRS/UMTS network-initiated PDP connection establishment procedure is standardized. In case of EPS, the network-initiated PDN connection establishment procedure may not be specified. Anyway, the network (particularly the Session Management sub-layer in the NAS layer of the serving CN node or some other entity) shall evaluate whether to perform the network-initiated SM request for PDP/PDN connection establishment, since the network (SGSN/MME) knows if there is SM CC applied for the requested/targeted APN. If the network (SGSN/MME) decides to initiate the network-triggered SM request for PDP/PDN connection establishment, e.g. due to the high level Device Trigger request, then there is no problem related to the SM CC, as the SM CC would not be applied to corresponding UE's SM reply. Consequently the network (SGSN/MME and/or MTC-IWF) informs the MTC server about the UE's IP address after the successful PDP/PDN connection establishment. Otherwise if the network (SGSN/MME) decides to NOT initiate the network-triggered SM request for PDP/PDN connection establishment, the network (SGSN/MME and/or MTC-IWF) informs the MTC server about the error cause, and optionally about the delay (SM-BO timer value) for which the SM CC is to be applied.

Summarizing, at the terminal side, the transmission unit may be further configured to transit the network address (such as IP address) of the terminal to the server. In particular, the receiving unit of the terminal may provide the trigger request to the evaluation unit which then decides to report to the server the network address of the terminal. Alternatively, the network node may report the network address to the server. Accordingly, the transmission unit of the network node for transmitting data to the server (cf. the second transmission unit above) may be further configured to provide the terminal network address within the delivery delay indication or separately therefrom.

Figure 10:
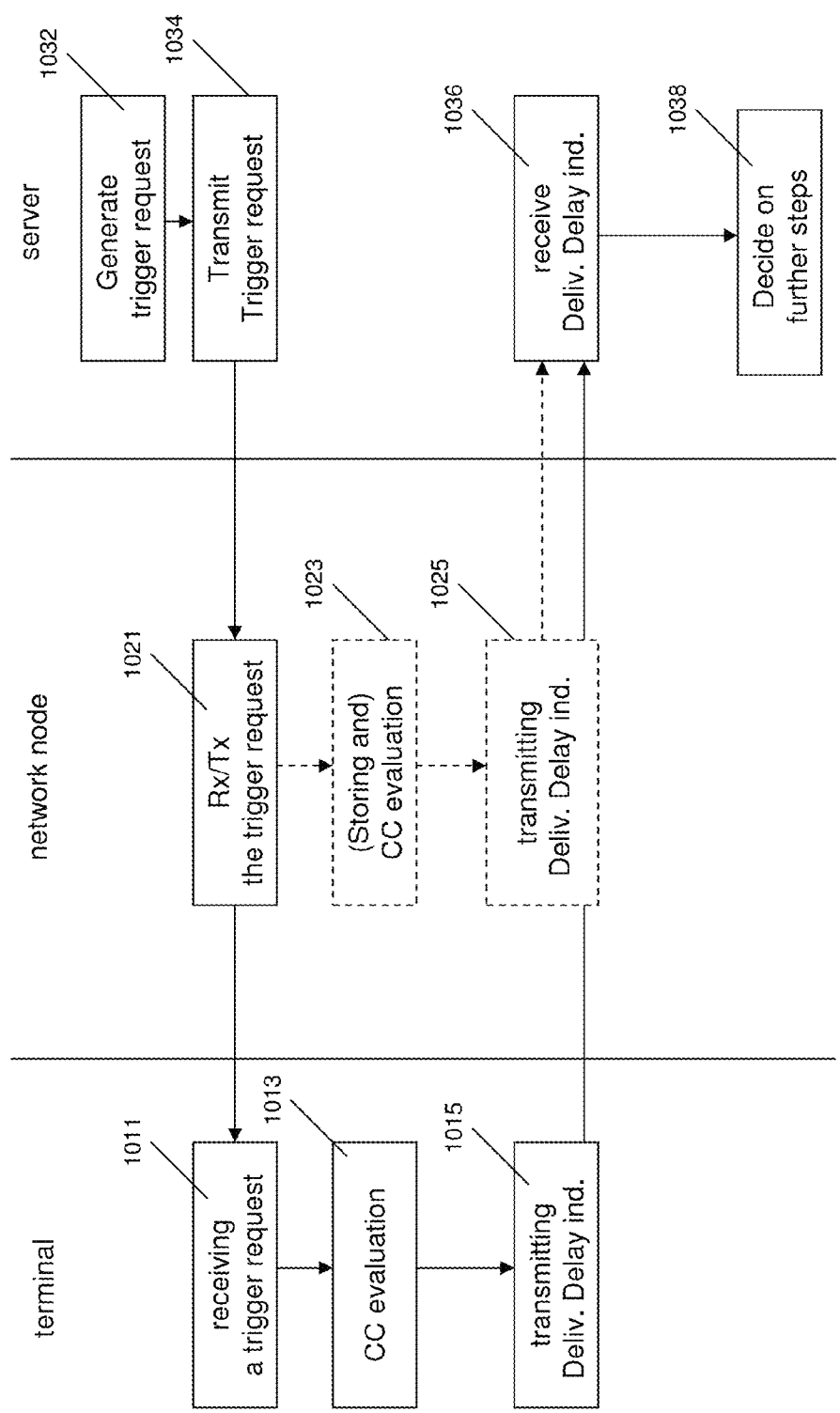
FIG. 10 is a flow diagram illustrating an example of a method according to an embodiment of the present invention.

FIG. 10 illustrates the steps of a method to be performed at the terminal, a method to be performed at a network node and a method to be performed at the server for implementing above described embodiments of the present invention. In particular, at the server a trigger request is generated 1032. The generated trigger request is transmitted 1034 to the terminal over a network including the network node. The network node may store and evaluate the trigger request in one embodiment, or in another embodiment, the trigger request may be sent transparently for the network node directly to the terminal. According to an embodiment, the terminal receives the trigger request 1011 and performs an evaluation 1013 about whether a connection to the network can be established or not, which may include determining whether the network is congested and/or whether the data to be transmitted are ready. After the evaluation and in particular in the case in which congestion is detected or the data are not ready, a delivery delay indicator is transmitted 1015 back to the server for indicating at least one of the impossibility of establishing the connection to the server after the trigger or a data transmission delay in accordance with the evaluation results, which may be due to the congestion situation or the unavailability of the data. It is noted that the evaluation step 1013 may also include determining of the validity of the data based on a back-off timer in the terminal and/or trigger validity time which may be signaled to the terminal together with the trigger request signaling 1021 from the network node or in a separated way. Alternatively to this embodiment, the network node may inform the server about a delivery delay or non-delivery of the data. This is illustrated at the side of the network node in FIG. 10 in which step of receiving the trigger request 1021 from the server is followed by a possible storing of the trigger request and evaluating whether the connection can be established from the terminal to the server or not, including determining whether the network is congested and/or whether a back-off timer is running in the UE and/or the remaining time of the back-off timer at the terminal. The storing step may beneficially be performed for storing a state of the trigger request including at least the terminal ID and/or the ID of the server and/or any other transaction ID. This may enable identifying the network over which the terminal is to transmit the data in order to enable the network node to assess the possibility of data delivery and/or the delay thereof. After the evaluation and possibly the storing step 1023, the delivery delay indication is transmitted 1025 by the network node to the server. At the server side, the delivery delay indication is received 1036 either from the terminal or from the network node for the two above described embodiments respectively. The server may then use the delivery delay indication to decide on further steps 1038 as described above.

Figure 11:
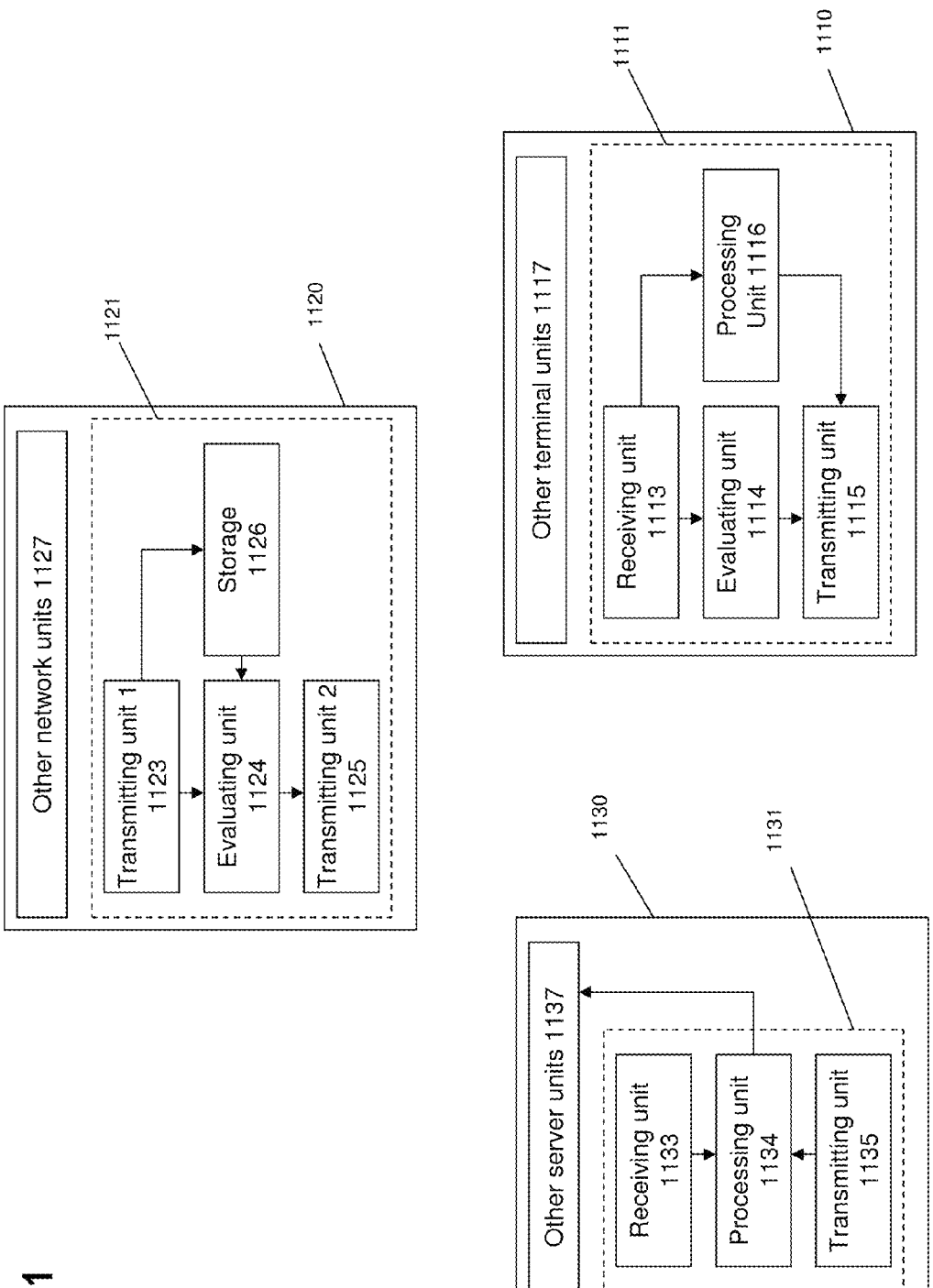
FIG. 11 is a block diagram illustrating examples of a logical structure of apparatuses in accordance with an embodiment of the present invention.

FIG. 11 illustrates functional blocks of a terminal 1110, a network node 1120 and a server 1130 in accordance with an embodiment of the present invention. In particular, the terminal 1110 includes the usual functional blocks 1117 for performing the terminal functions and further includes a receiving unit 1113 for receiving a trigger request from the server, an evaluation unit 1114 for evaluating whether the connection can be established or not and/or whether the data to be transmitted are ready and/or whether the data can be transmitted. The terminal 1110 further includes transmitting unit 1115 for transmitting a delivery delay indicator to the server based on the evaluation results of the evaluation unit 1114. The terminal 1110 may further include processing unit 1116 (also called validity checking unit) for determining the valid data validity time. These units are included in the device triggering portion 1111 of the terminal including functional blocks for providing the ability of device triggering.

A network node 1120 also includes units corresponding to typical functionality of a network node 1127 and units 1121 related to the capability of device triggering procedure. In particular, transmitting unit 1123 is configured to transmit a trigger request to the terminal. The evaluating unit 1124 is configured to evaluate whether the connection can be established and/or whether the data can be transmitted from the terminal based on an evaluation of network congestion and/or back-off timer running at the terminal. The second transmitting unit 1125 is configured to transmit a delivery delay indicator to the server in accordance with the input from the evaluation unit. The network node may further be provided with a storage means 1126 for storing a trigger request related information such as identification of the terminal and/or of the node the trigger request originates from and/or the server.

Finally, the server 1130 includes means for providing typical I functions of a server 1137 and means 1131 related to the capability of device triggering. In particular, the server includes a transmitting unit 1135 for transmitting the triggering request, a receiving unit 1133 for receiving delivery delay indication from the network or from the terminal, and a processing unit 1134 for deciding, based on the received indicator and the trigger request sent, how to further proceed.

The explanations given in the Technical Background section above are intended to better understand the specific exemplary embodiments described herein and should not be understood as limiting the invention to the described specific implementations of processes and functions in the mobile communication network such as a network compliant with the 3GPP standards. Nevertheless, the improvements proposed herein may be readily applied in the architectures/systems described in the Technological Background section and may in some embodiments of the invention also make use of standard and improved procedures of theses architectures/systems. It would be appreciated by a person skilled in the art that numerous variations and/or modifications may be made to the present invention as shown in the specific embodiments without departing from the spirit or scope of the invention as broadly described.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

In the following, the embodiments related to the invention are summarized.

In accordance with a first aspect of the present invention, a method is provided for triggering a terminal in a communication network. The method is for being executed at the terminal and comprises the steps described in the following. The step of receiving a trigger request is for triggering establishment of a connection (and/or data transmission) from the terminal to the server. The trigger request is assumed to be sent by the server over the communication network to the terminal. The step of evaluating whether the connection can be established and/or the data can be transmitted includes determining whether the network is congested and/or whether data to be transmitted are ready. Finally, the step of transmitting a delivery delay indicator to the server is provided for indicating at least one of impossibility of establishing the connection to the server after the trigger or a data transmission delay in accordance with the evaluation results due to the congestion situation.

Correspondingly to the first aspect of the present invention, in accordance with another aspect of the present invention, a method is provided for triggering a terminal in a communication network including a network node, wherein the method is for being executed at a triggering server. The method includes the step of transmitting over the communication network to the terminal a trigger request for triggering connection establishment or transmission of data from the terminal to the server and the step of receiving from the network node or the terminal a delivery delay message for indicating at least one of impossibility of transmitting the data after the trigger or a triggering delay.

However, the present invention may also be employed by a network node rather than by the UE. Thus, in accordance with another aspect of the present invention, a method is provided for triggering a terminal in a communication network including a network node, the method being for executing at the network node and comprising the step of transmitting the trigger request to the terminal for triggering transmission of data or establishment of a connection from the terminal to the server, evaluating whether the connection can be established (or data can be transmitted) from the terminal to the server, which includes determining whether the network is congested and/or whether a back-off timer is running and/or the remaining time of the back-off timer at the terminal, and the step of transmitting a delivery delay message to the server for indicating at least one of impossibility of establishing the connection to the server and/or transmitting the data after the trigger or a data transmission delay.

In particular, the step of transmission may be performed over the control plane.

The method for performing at the terminal advantageously further comprises the step of receiving from the network node a congestion indicator, which includes at least one of: a command for the terminal to immediately set-up a user plane connection to the network; and/or a device trigger validity time indicating how long the network tries to deliver same device trigger request to the terminal.

This provides an advantage of enabling the terminal to assess the situation, i.e. determine whether congestion occurs, and to estimate the validity of the data to be sent accordingly.

The method preferably further comprises the steps of determining, after the trigger request has been received, a data validity time as either a time period necessary for gathering the data to be transmitted over the network to the server or as a device trigger validity time indicating how long the network tries to deliver same device trigger request to the terminal and, in case a back-off timer is running at the terminal and the data validity time is smaller than the remaining back-off time, the step of indicating to the server the delivery delay message indicating that the data will be outdated and/or that no data shall be sent in response to the trigger request.

Determining of the validity of the data and transmitting it to the server provides the advantage of enabling the server to efficiently decide about the further action.

The method to be performed at the network node advantageously further comprises the step of storing a state of a trigger request including the terminal ID and/or the ID of the device which sent the triggering request message, and the step of transmitting a delivery delay message wherein the message includes the terminal ID and/or the ID of the device which sent the triggering request message.

Storing of the trigger request state and the terminal identification provides the benefit of enabling the network to provide the server with the indication of delivery delay in certain scenarios.

The evaluation step (at the terminal or the network node side) may further include evaluating of the back-off timer running at the terminal side and/or evaluating validity period of the data to be transmitted by the terminal in order to determine whether the data shall be transmitted from the terminal to the server and/or to determine delay of the transmission of the data from the terminal to the server.

In accordance with another aspect of the present invention a terminal is provided for a communication network, the terminal comprising: a receiving unit for receiving a trigger request for triggering establishment of a connection from the terminal to a server, the trigger request being sent by the server over the communication network to the terminal; an evaluation unit for evaluating whether the connection can be established or not including determining whether the network is congested and/or whether data to be transmitted are ready; and a transmission unit for transmitting a delivery delay indicator to the server for indicating at least one of impossibility of establishing the connection to the server after the trigger or a data transmission delay in accordance with the evaluation results due to the congestion situation.

The receiving unit may further be configured to receive from the network node a congestion indicator including at least one of a command for the terminal to immediately set-up a user plane connection to the network; or a device trigger validity time indicating how long the network tries to deliver same device trigger request to the terminal.

The terminal may further comprise a validity-checking unit for determining, after the trigger request has been received, a data validity time as either a time period necessary for gathering the data to be transmitted over the network to the server or as a device trigger validity time indicating how long the network tries to deliver same device trigger request to the terminal. In case a back-off timer is running at the terminal and the data validity time is smaller than the remaining back-off time, the transmitting unit may be further configured to indicate to the server the delivery delay message indicating that the data will be outdated and/or that no data shall be sent in response to the trigger request.

In accordance with still another aspect of the present invention, a network node is provided for triggering a terminal in a communication network, a part of which is the network node. The network node comprises: a first transmitting unit for transmitting a trigger request to the terminal for triggering establishment of a connection from the terminal to the server; an evaluation unit for evaluating whether the connection can be established from the terminal to the server or not including determining whether the network is congested and/or whether a back-off timer is running and/or the remaining time of the back-off timer at the terminal; and a second transmitting unit for transmitting a delivery delay message to the server for indicating at least one of impossibility of establishing the connection to the server after the trigger or a data transmission delay.

Advantageously, the network node may further comprise a storing means for storing a state of a trigger request including the terminal ID and/or the ID of the device which sent the triggering request message. The second transmission unit may further be configured to transmit a delivery delay message wherein the message includes the terminal ID and/or the ID of the device which sent the triggering request message.

The evaluation unit of the terminal and/or the network node is preferably configured to evaluate of the back-off timer running at the terminal side and/or to evaluate validity period of the data to be transmitted by the terminal in order to determine whether the data shall be transmitted from the terminal to the server and/or to determine delay of the transmission of the data from the terminal to the server.

In accordance with another aspect of the present invention, a server is provided for triggering a terminal in a communication network including a network node. The server comprises: a transmission unit for transmitting over the communication network to the terminal a trigger request for triggering connection establishment or transmission of data from the terminal to the server and a receiving unit for receiving from the network node or the terminal a delivery delay message for indicating at least one of impossibility of transmitting the data after the trigger or a triggering delay. The server may further include a processing unit for processing the delivery delay indicator to determine whether to retransmit the trigger request at later point, or to retransmit the trigger request with higher priority or to omit a transmission of trigger request for the same network to another terminal. The method may further include a step of processing the delivery delay indicator to determine whether to retransmit the trigger request at later point, or to retransmit the trigger request with higher priority or to omit transmission of the trigger request for the same network to another terminal.

Summarizing, the present invention relates to device triggering in case of a congestion control. A triggering server transmits a device trigger request to a terminal over a communication network including a serving network node. The serving network node receives the device trigger request encapsulated in a message and transparent. In order to determine, whether the received message relates to device triggering, the serving network node determines device-triggering capabilities of the terminal and decides, based thereon, whether to forward or not the message to the terminal depending on the applied congestion control. This approach reduces signaling traffic in the congestion case since the terminal is prevented from trying to establish connection and transmit the data in response to the device triggering.

The invention claimed is:

1. A method, comprising:
obtaining, by a network node of a communication network, device triggering information of a terminal from a message received from the terminal during one of an attach procedure, a tracking area update (TAU) procedure and a routing area update (RAU) procedure;
evaluating, by the network node, whether a connection can be established from the terminal to a server based on the obtained device triggering information, the evaluating including determining at least one of whether the network is congested, whether a back-off timer is running, and a remaining time of the back-off timer; and
transmitting, by the network node, a delivery delay indication to a device triggering control server, the delivery delay indication indicating at least one of impossibility of establishing the connection to the server after the trigger and a data transmission delay,
wherein the device triggering information of the terminal includes an indication of whether device triggering is currently configured.

2. The method according to claim 1, comprising transmitting the trigger request to the terminal for triggering at least one of establishment of a connection and transmission of data from the terminal to the server.

3. The method according to claim 1, comprising:
storing a state of a trigger request including at least one of the terminal identifier, the identifier of the device which sent the triggering request, and other transaction identifier; and
generating and transmitting a delivery delay indication wherein the indication includes at least one of the terminal identifier and the identifier of the device which sent the triggering request message.

4. The method according to claim 1, wherein the evaluating includes at least one of:
evaluating of a back-off timer running at the terminal; and
evaluating a validity period of data to be transmitted by the terminal in order to determine whether the data shall be transmitted from the terminal to the server, and to determine delay of the transmission of the data from the terminal to the server.

5. A method, comprising:
obtaining, by a serving network node of a communication network, device triggering information of a terminal of the communication network from a message received from the terminal during one of an attach procedure, a tracking area update (TAU) procedure and a routing area update (RAU) procedure;
receiving a trigger request for triggering establishment of a connection from the terminal to a server in the communication network, the trigger request being sent by the server over the communication network to the terminal;
determining, based on the device triggering information of the terminal and based on a current congestion state, whether to transmit the trigger request to the terminal; and
transmitting the trigger request to the terminal according to the result of the determining,
wherein the device triggering information of the terminal includes an indication of whether device triggering is currently configured.

6. The method according to claim 5, wherein the device triggering information of the terminal includes at least one of:
a priority or service quality of the terminal indicated by a radio resource control protocol of a radio access network in which the terminal is located;
whether a message is received over a defined interface or a defined network entity;
a capability determined from a message received from a subscriber server;
a port number determined from a message, wherein a determined port number is used for device triggering;
a protocol discriminator determined from a header of a message carrying the trigger request, the protocol discriminator indicating a content type of the payload;
terminal device triggering capability or status determined from a message received from the terminal; and
whether a message is a device triggering message determined from a trigger request message header.

7. The method according to claim 5, comprising:
determining an external network to which the terminal may establish a connection when receiving the trigger request message;
storing the determined external network for the terminal in the serving network node; and determining according to the current congestion state whether said external network is congested.

8. The method according to claim 7, wherein the external network is determined by at least one of:
- determining an external network to which the terminal is subscribed from a message received from a subscriber server;
- determining an external network to which the terminal may establish connection after being triggered from a message received from the subscriber server;
- determining an external network to which the terminal may establish connection after being triggered from a message received from the terminal;
- determining whether the serving network node has a bearer context established for the terminal;
- determining whether a bearer context is for a bearer to a congested network;
- determining a maximum number of bearers allowed for a congested network;
- determining connection types allowed for a congested external network; and
- determining an external network to which the terminal may establish a connection based on an identity of the server which initiated the terminal triggering.

9. The method according to claim 7, comprising transmitting to a selected server a message including a report regarding the delivery of the device trigger request and a time-period in which the selected server should not transmit or retransmit a trigger request to the terminal.

10. The method according to claim 7, wherein the determining whether to transmit the device trigger request to the terminal comprises:
- transmitting to the terminal information indicating at least one of a congestion condition of the external network and a back-off timer;
- upon transmitting to the terminal the information indicating at least one of whether the external network is congested and a back-off timer, setting in a serving network entity a timer during which the serving network entity does not transmit a delivery report regarding a device trigger response from the terminal; and
- receiving from the terminal information indicating at least one of:
  - that the terminal is unable to establish a data connection to an external network and an identity of the external network;
  - remaining time of the back-off timer; and
  - an identity of a device trigger response which could not be transmitted.

11. A serving network node, comprising:
- a receiver, which, in operation, receives messages on a communication network;
- a transmitter, which, in operation, transmits messages on the communication network; and
- circuitry, coupled to the receiver and the transmitter, wherein the circuitry, in operation:
  - obtains device triggering information of a terminal of the communication network from a message received by the receiver from the terminal during one of an attach procedure, a tracking area update (TAU) procedure, and routing area update (RAU) procedure;
  - receives, from the receiver, a trigger request for triggering establishment of a connection from the terminal to a server of the communication network, the trigger request being sent by the server over the communication network to the terminal;
  - determines, based on the device triggering information of the terminal and based on a current congestion state, whether to transmit the trigger request to the terminal; and
  - transmits the trigger request to the terminal according to the determination,
- wherein the device triggering information of the terminal includes an indication of whether device triggering is currently configured.

* * * * *